United States Patent
Nakao et al.

(10) Patent No.: US 8,741,985 B2
(45) Date of Patent: Jun. 3, 2014

(54) RESIN EMULSION FOR SEALER

(75) Inventors: Kanji Nakao, Suita (JP); Keiichi Nakamoto, Suita (JP)

(73) Assignee: Nippon Shokubai Co., Ltd., Osaka-shi (JP)

( * ) Notice: Subject to any disclaimer, the term of this patent is extended or adjusted under 35 U.S.C. 154(b) by 272 days.

(21) Appl. No.: 12/998,726

(22) PCT Filed: Nov. 25, 2009

(86) PCT No.: PCT/JP2009/006341
§ 371 (c)(1),
(2), (4) Date: May 25, 2011

(87) PCT Pub. No.: WO2010/061586
PCT Pub. Date: Jun. 3, 2010

(65) Prior Publication Data
US 2011/0224352 A1      Sep. 15, 2011

(30) Foreign Application Priority Data

Nov. 26, 2008  (JP) .................................. 2008-300988
Jan. 8, 2009  (JP) .................................. 2009-002112
Jan. 16, 2009  (JP) .................................. 2009-008222
Feb. 4, 2009  (JP) .................................. 2009-023240

(51) Int. Cl.
*C09D 201/00*   (2006.01)
*C09D 5/02*   (2006.01)
*C08F 257/02*   (2006.01)

(52) U.S. Cl.
USPC ............................ 523/201; 524/457; 525/902

(58) Field of Classification Search
USPC ............................ 524/457; 523/201; 525/902
See application file for complete search history.

(56) References Cited

U.S. PATENT DOCUMENTS 5,021,469 A * 6/1991 Langerbeins et al. ........ 523/201

FOREIGN PATENT DOCUMENTS

| CN | 1405246 A | 3/2003 |
|----|-----------|--------|
| CN | 101092467 A | 12/2007 |
| CN | 101121771 A | 2/2008 |
| JP | 04-323271 A | 11/1992 |
| JP | 07-278463 A | 10/1995 |
| JP | 8-295826 A | 11/1996 |
| JP | 11--124533 A | 5/1999 |
| JP | 2000-160097 A | 6/2000 |
| JP | 2001-335735 A | 4/2001 |
| JP | 2001-181605 A | 7/2001 |
| JP | 2001-262053 A | 9/2001 |
| JP | 2002-012816 A | 1/2002 |
| JP | 2003-119456 A | 4/2003 |
| JP | 2004-176040 A | 6/2004 |
| JP | 2004-210919 A | 7/2004 |
| JP | 2004-323558 A | 11/2004 |
| JP | 2005-8862 A | 1/2005 |
| JP | 2008-110589 A | 5/2008 |
| JP | 2008-150401 A | 7/2008 |

OTHER PUBLICATIONS

Yin, Zaiqiu et al., "Styrene-Acrylic Copolymer Emulsion for exterior architectural coatings", Paint & Coatings Industry, vol. 34, No. 7, p. 14-16, Jul. 2004, w/ partial English translation; cited in Chinese Office Action dated Feb. 5, 2013.

* cited by examiner

*Primary Examiner* — Kelechi Egwim
(74) *Attorney, Agent, or Firm* — Westerman, Hattori, Daniels & Adrian, LLP

(57) ABSTRACT

A resin composition for sealers as well as a resin composition for sealers and a paint composition for sealers that contains the resin composition for sealers are useful for sealers to be used with such inorganic building materials as ceramic-based building materials. The resin emulsion for sealers is a resin emulsion which contains emulsion particles having an inner layer and an outer layer. The inner layer is formed with a polymer which is formulated by means of emulsion polymerization of a monomer component containing styrene and a monomer other than the styrene, and the outer layer is formed with a polymer which is formulated by means of emulsion polymerization of a monomer component containing a carboxyl-group-containing monomer and a monomer other than the carboxyl-group-containing monomer.

7 Claims, No Drawings

RESIN EMULSION FOR SEALER

TECHNICAL FIELD

The first aspect of the present invention relates to a resin emulsion for a sealer, a resin composition for a sealer which contains the resin emulsion for a sealer, and a coating composition for a sealer which contains the resin emulsion for a sealer. More particularly, the first aspect of the present invention relates to a resin emulsion for a sealer, a resin composition for a sealer which contains the resin emulsion for a sealer, and a coating composition for a sealer which contains the resin emulsion for a sealer, those of which are useful for a sealer being used in, for example, an inorganic building material such as a ceramic-based building material. The resin emulsion for a sealer, the resin composition for a sealer, and the coating composition for a sealer according to the first aspect of the present invention can be suitably used, for example, in coating in a factory, that is, in coating to a building material on the manufacturing line in a factory.

The second aspect of the present invention relates to a resin emulsion for a sealer, a resin composition for a sealer which contains the resin emulsion for a sealer, and a coating composition for a sealer which contains the resin emulsion for a sealer. More particularly, the second aspect of the present invention relates to a resin emulsion for a sealer, a resin composition for a sealer which contains the resin emulsion for a sealer, and a coating composition for a sealer which contains the resin emulsion for a sealer, those of which are useful, for example, for a sealer which is used on the exterior of a building and a sealer having a microelasticity. The resin emulsion for a sealer, the resin composition for a sealer, and the coating composition for a sealer according to the second aspect of the present invention can be suitably used, for example, in coating the outer wall of a building.

BACKGROUND ART

In recent years, there have been proposed an aqueous coating composition for undercoating, which contains an emulsion resin (for example, refer to Patent Document 1) and a 2-liquid type aqueous coating composition for undercoating (for example, refer to Patent Document 2) from the viewpoint of environmental protection. According to these coating compositions for undercoating, a film is formed by the fusion of resin particles. Therefore, the coating compositions necessitate the use of a film-forming aid in a large amount when its resin has a high glass transition temperature. However, the use of the film-forming aid in a large amount is not favorable from the viewpoint of environmental protection, and moreover, there arises a defect such that frost damage resistance is not sufficiently imparted to the coating composition.

As an aqueous coating composition having improved frost damage resistance and improved blocking resistance, there has been proposed an aqueous resin composition in which particles having a multilayer structure are dispersed (for example, refer to Patent Document 3). However, there is a necessity in this aqueous coating composition to increase the glass transition temperature of the shell of the particles in order to impart blocking resistance to the aqueous coating composition. Therefore, the aqueous coating composition has some defects such as low film-forming property and low water permeability resistance of a coated film.

In order to improve blocking resistance, it has been proposed to use a water-soluble polymer having a high glass transition temperature and a low molecular weight, or to increase the content of a pigment in the composition. However, when the water-soluble polymer having a high glass transition temperature and a low molecular weight is used, there arises a defect such as lowering of frost damage resistance. When the content of a pigment in the composition is increased, there arises a defect such as lowering of water permeability resistance of a coated film.

PRIOR ART DOCUMENTS

Patent Documents

Patent Document 1: Japanese Unexamined Patent Publication 2001-335735
Patent Document 2: Japanese Unexamined Patent Publication 2001-262053
Patent Document 3: Japanese Unexamined Patent Publication 2002-012816

SUMMARY OF THE INVENTION

Problems to be Solved by the Invention

The present invention has been accomplished in view of the above-mentioned prior arts. An object of the present invention is to provide a resin emulsion for a sealer which is excellent in blocking resistance and film-forming property, a resin composition for a sealer which contains the resin emulsion for a sealer, and a coating composition for a sealer which contains the resin emulsion for a sealer. Another object of the present invention is to provide a resin emulsion for a sealer, which is excellent in frost damage resistance, water permeability resistance of a coated film and strength of a coated film, a resin composition for a sealer which contains the resin emulsion for a sealer, and a coating composition for a sealer which contains the resin emulsion for a sealer.

Further objects, characteristics and advantages of the preset invention will be apparent from the following descriptions.

Means for Solving the Problems

The first aspect of the present invention relates to a resin emulsion for a sealer, a resin composition for a sealer which contains the resin emulsion for a sealer, and a coating composition for a sealer which contains the resin emulsion for a sealer, which are useful for a sealer for used in inorganic building materials such as ceramic-based building materials.

More specifically, in the first aspect of the present invention, as to the resin emulsion for a sealer, the present invention relates to (1) a resin emulsion for a sealer containing emulsion particles having an inner layer and an outer layer, in which the above-mentioned inner layer is formed from a polymer (I) which is prepared by emulsion polymerization of a monomer component A containing 85 to 100% by weight of styrene and 0 to 15% by weight of a monomer other than the styrene, and the outer layer is formed from a polymer (II) having a glass transition temperature of not more than 40° C., which is prepared by emulsion polymerization of a monomer component B containing 6 to 25% by weight of a carboxyl group-containing monomer and 75 to 94% by weight of a monomer other than the carboxyl group-containing monomer, the weight ratio of the polymer (I) to the polymer (II) [polymer (I)/polymer (II)] is 25/75 to 75/25, and the total content of the polymer (I) and the polymer (II) in the emulsion particles is 50 to 100% by weight;

(2) the resin emulsion for a sealer according to the above item (1), in which the content of styrene is 70 to 85% by weight, and the content of the monomer other than the styrene is 15 to 30% by weight in the total monomer components which are used as a raw material for a polymer constituting the emulsion particles;

(3) the resin emulsion for a sealer according to the above item (1) or (2), in which the monomer other than the styrene is at least one monomer selected from the group consisting of an aromatic monomer other than styrene, an alkyl (meth)acrylate, a carboxyl group-containing monomer, an oxo group-containing monomer, a fluorine atom-containing monomer, a nitrogen atom-containing monomer and an epoxy group-containing monomer;

(4) the resin emulsion for a sealer according to any one of the above items (1) to (3), in which the monomer other than the carboxyl group-containing monomer is at least one monomer selected from the group consisting of an aromatic monomer, an alkyl (meth)acrylate, a hydroxyl group-containing (meth)acrylate, an oxo group-containing monomer, a fluorine atom-containing monomer, a nitrogen atom-containing monomer and an epoxy group-containing monomer;

(5) the resin emulsion for a sealer according to any one of the above items (1) to (4), in which the resin emulsion has a minimum film-forming temperature of −5° to 70° C.;

(6) the resin emulsion for a sealer according to any one of the above items (1) to (5), in which the use of the resin emulsion is a ceramic-based building material; and (7) a process for producing a resin emulsion for a sealer containing emulsion particles having an inner layer and an outer layer, comprising carrying out an emulsion polymerization of a monomer component A containing 85 to 100% by weight of styrene and 0 to 15% by weight of a monomer other than the styrene, to form an inner layer comprising the resulting polymer (I), and thereafter carrying out an emulsion polymerization of a monomer component B containing 6 to 25% by weight of a carboxyl group-containing monomer and 75 to 94% by weight of a monomer other than the carboxyl group-containing monomer on the surface of the inner layer, to form an outer layer comprising the resulting polymer (II) having a glass transition temperature of not more than 40° C., in which the weight ratio of the polymer (I) to the polymer (II) [polymer (I)/polymer (II)] is controlled to 25/75 to 75/25, and the total content of the polymer (I) and the polymer (II) in the emulsion particles is controlled to 50 to 100% by weight.

In addition, in the first aspect of the present invention, as to the resin composition for a sealer, the present invention relates to (1) a resin composition for a sealer comprising a resin emulsion containing emulsion particles having plural resin layers obtained by multistep emulsion polymerization of a monomer component and a glass transition temperature of 0° to 60° C., and a pigment, in which the amount of the pigment is 190 to 400 parts by weight per 100 parts by weight of the nonvolatile components of the resin emulsion;

(2) the resin composition for a sealer according to the above item (1), in which the content of the aromatic monomer is 70 to 85% by weight, and the content of the monomer other than the aromatic monomer is 15 to 30% by weight in the total monomer components used as a raw material of the resin emulsion;

(3) the resin composition for a sealer according to the above item (1) or (2), in which a resin layer prepared by emulsion polymerization of a monomer component containing 80 to 100% by weight of an aromatic monomer and 0 to 20% by weight of a monomer other than the aromatic monomer is included in any one of the plural resin layers;

(4) the resin composition for a sealer according the above item (2) or (3), in which the monomer other than the aromatic monomer is at least one monomer selected from the group consisting of an alkyl (meth)acrylate, a hydroxyl group-containing (meth)acrylate, a carboxyl group-containing monomer, an oxo group-containing monomer, a fluorine atom-containing monomer, a nitrogen atom-containing monomer and an epoxy group-containing monomers;

(5) the resin composition for a sealer according to any one of the above items (1) to (4), in which a resin layer prepared by emulsion polymerization of a monomer component containing 10 to 25% by weight of a carboxyl group-containing monomer and 75 to 90% by weight of a monomer other than the carboxyl group-containing monomer is contained in any one of the plural resin layers;

(6) the resin composition for a sealer according to the above item (5), in which the monomer other than the carboxyl group-containing monomer is at least one monomer selected from the group consisting of an alkyl (meth)acrylate, a hydroxyl group-containing (meth)acrylate, an oxo group-containing monomer, a fluorine atom-containing monomer, a nitrogen atom-containing monomer and an epoxy group-containing monomer;

(7) the resin composition for a sealer according to any one of the above items (1) to (6), in which a resin layer comprising a polymer having a glass transition temperature of 75° to 120° C. is included in any one of the plural resin layers;

(8) the resin composition for a sealer according to any one of the above items (1) to (7), in which the use of the resin composition is a inorganic building material; and (9) an inorganic building material coated with the resin composition for a sealer according to any one of the above items (1) to (8).

In addition, in the first aspect of the present invention, as to the coating composition for a sealer, the present invention relates to (1) a coating composition for a sealer comprising a resin emulsion containing emulsion particles having a glass transition temperature of 0° to 60° C., a pigment and a rheology control agent, in which the amount of the pigment is 100 to 400 parts by weight, and the amount of the rheology control agent is 0.1 to 10 parts by weight per 100 parts by weight of the nonvolatile components of the resin emulsion;

(2) the coating composition for a sealer according to the above item (1), in which the rheology control agent is at least one member selected from the group consisting of an alkali-soluble rheology control agent and a urethane-associated rheology control agent;

(3) the coating composition for a sealer according to the above item (1) or (2), in which the emulsion particle has plural resin layers prepared by multistep emulsion polymerization of a monomer component;

(4) the coating composition for a sealer according to any one of the above items (1) to (3), in which the content of the aromatic monomer is 70 to 85% by weight, and the content of the monomer other than the aromatic monomer is 15 to 30% by weight in the total monomer components used as a raw material of the resin emulsion;

(5) the coating composition for a sealer according to the above item (3) or (4), in which a resin layer prepared by emulsion polymerization of a monomer component containing 80 to 100% by weight of an aromatic monomer and 0 to 20% by weight of a monomer other than the aromatic monomer is included in any one of the plural resin layers;

(6) the coating composition for a sealer according the above item (4) or (5), in which the monomer other than the aromatic monomer is at least one monomer selected from the group consisting of an alkyl (meth)acrylate, a hydroxyl group-containing (meth)acrylate, a carboxyl group-containing monomer, an oxo group-containing monomer, a fluorine atom-containing monomer, a nitrogen atom-containing monomer and an epoxy group-containing monomer;

(7) the coating composition for a sealer according to any one of the above items (3) to (6), in which a resin layer, which is prepared by emulsion polymerization of a monomer component containing 10 to 25% by weight of a carboxyl group-containing monomer and 75 to 90% by weight of a monomer other than the carboxyl group-containing monomer, is contained in any one of the plural resin layers;

(8) the coating composition for a sealer according to the above item (7), in which the monomer other than the carboxyl group-containing monomer is at least one monomer selected from the group consisting of an aromatic monomer, an alkyl (meth)acrylate, a hydroxyl group-containing (meth)acrylate, an oxo group-containing monomer, a fluorine atom-containing monomer, a nitrogen atom-containing monomer and an epoxy group-containing monomer;

(9) the coating composition for a sealer according to any one of the above items (3) to (8), in which a resin layer comprising a polymer having a glass transition temperature of 75° to 120° C. is included in any one of the plural resin layers;

(10) the coating composition for a sealer according to any one of the above items (1) to (9), in which the use of the coating composition is an inorganic building material; and

(11) an inorganic building material coated with the coating composition for a sealer according to any one of the above items (1) to (10).

The second aspect of the present invention relates to a resin emulsion for a sealer, a resin composition for a sealer which contains the resin emulsion for a sealer, and a coating composition for a sealer which contains the resin emulsion for a sealer, those of which are useful, for example, for a sealer being used for the exterior of a building, a filler having a microelasticity, and the like.

More specifically, in the second aspect of the present invention, as to the resin emulsion for a sealer, the present invention relates to (1) a resin emulsion for a sealer containing emulsion particles having an inner layer and an outer layer, in which the above-mentioned inner layer is constituted by a polymer which is prepared by emulsion polymerization of a monomer component containing 85 to 100% by weight of an aromatic monomer and 0 to 15% by weight of an ethylenically unsaturated monomer; the weight ratio of the polymer which constitutes the inner layer to the polymer which constitutes the outer layer [the polymer which constitutes the inner layer/the polymer which constitutes the outer layer] is 10/90 to 60/40; the total content of the polymer which constitutes the inner layer and the polymer which constitutes the outer layer in the emulsion particle is 40 to 100% by weight; the content of styrene is 5 to 40% by weight, and the content of the monomer other than the styrene is 60 to 95% by weight in the total monomer components used as a raw material of the emulsion particles; the content of the carboxyl group-containing monomer is 1 to 10% by weight, and the content of the monomer other than the carboxyl group-containing monomer is 90 to 99% by weight in the total monomer components used as a raw material of the outer layer; and the glass transition temperature of the emulsion particle is −70° to 10° C.;

(2) the resin emulsion for a sealer according to the above item (1), in which the monomer other than the styrene in the total monomer components used as a raw material of the emulsion particles comprises at least one monomer selected from the group consisting of an aromatic monomer other than styrene and an ethylenically unsaturated monomer;

(3) the resin emulsion for a sealer according to the above item (2), in which the aromatic monomer other than styrene is at least one monomer selected from the group consisting of α-methylstyrene, p-methylstyrene, tert-methylstyrene, chlorostyrene, vinyl toluene and an aralkyl (meth)acrylate;

(4) the resin emulsion for a sealer according to any one of the above items (1) to (3), in which the monomer other than the carboxyl group-containing monomer in the monomer component used as a raw material of the outer layer is at least one monomer selected from the group consisting of an aromatic monomer and an ethylenically unsaturated monomer other than the carboxyl group-containing monomer; and (5) the resin emulsion for a sealer according to the above item (4), in which the ethylenically unsaturated monomer other than the carboxyl group-containing monomer is at least one monomer selected from the group consisting of an alkyl (meth)acrylate, a hydroxyl group-containing (meth)acrylate, an oxo group-containing monomer, a fluorine atom-containing monomer, a nitrogen atom-containing monomer and an epoxy group-containing monomer.

In addition, in the second aspect of the present invention, as to the resin composition for a sealer, the present invention relates to (1) a resin composition for a sealer having plural resin layers prepared by multistep emulsion polymerization of a monomer component, and comprising a resin emulsion containing emulsion particles having a glass transition temperature of −70° to 10° C. and a pigment, in which the amount of the pigment is 185 to 900 parts by weight per 100 parts by weight of the nonvolatile components of the resin emulsion;

(2) the resin composition for a sealer according to the above item (1), in which the content of the styrene is 5 to 40% by weight, and the content of the monomer other than styrene is 60 to 95% by weight in the total monomer components used as a raw material of the resin emulsion;

(3) the resin composition for a sealer according to the above item (2), in which the monomer other than styrene is at least one monomer selected from the group consisting of an aromatic monomer other than styrene, an alkyl (meth)acrylate, a hydroxyl group-containing (meth)acrylate, a carboxyl group-containing monomer, an oxo group-containing monomer, a fluorine atom-containing monomer, a nitrogen atom-containing monomer and an epoxy group-containing monomer;

(4) the resin composition for a sealer according any one of the above items (1) to (3), in which a resin layer prepared by emulsion polymerization of a monomer component containing 85 to 100% by weight of an aromatic monomer and 0 to 15% by weight of a monomer other than the aromatic monomer is included in any one of the plural resin layers;

(5) the resin composition for a sealer according to the above item (4), in which the monomer other than the aromatic monomer is at least one monomer selected from the group consisting of an alkyl (meth)acrylate, a hydroxyl group-containing (meth)acrylate, a carboxyl group-containing monomer, an oxo group-containing monomer, a fluorine atom-containing monomer, a nitrogen atom-containing monomer and an epoxy group-containing monomer;

(6) the resin composition for a sealer according any one of the above items (1) to (5), in which a resin layer prepared by emulsion polymerization of a monomer component containing 1 to 10% by weight of a carboxyl group-containing monomer and 90 to 99% by weight of a monomer other than the carboxyl group-containing monomer is included in any one of the plural resin layers;

(7) the resin composition for a sealer according to the above item (6), in which the monomer other than the carboxyl group-containing monomer is at least one monomer selected from the group consisting of an aromatic monomer, an alkyl (meth)acrylate, a hydroxyl group-containing (meth)acrylate, an oxo group-containing monomer, a fluorine atom-containing monomer, a nitrogen atom-containing monomer and an epoxy group-containing monomer;
(8) the resin composition for a sealer according to any one of the above items (1) to (7), in which a resin layer comprising a polymer having a glass transition temperature of 75° to 120° C. is included in any one of the plural resin layers; and
(9) the resin composition for a sealer according to any one of the above items (1) to (8), in which the use of the resin composition is the exterior of a building.

In addition, in the second aspect of the present invention, as to the coating composition for a sealer, the present invention relates to
(1) a coating composition for a sealer comprising a resin emulsion containing emulsion particles having a glass transition temperature of −70° to 10° C., a pigment and a rheology control agent, in which the amount of the pigment is 185 to 900 parts by weight, and the amount of an active ingredient of the rheology control agent is 0.01 to 5 parts by weight per 100 parts by weight of the nonvolatile components of the resin emulsion;
(2) the coating composition for a sealer according to the above item (1), in which the rheology control agent is at least one member selected from the group consisting of a cellulose derivative-based rheology control agent and a urethane-associated rheology control agent;
(3) the coating composition for a sealer according to the above item (1) or (2), in which the emulsion particle has plural resin layers prepared by multistep emulsion polymerization of a monomer component;
(4) the coating composition for a sealer according to any one of the above items (1) to (3), in which the content of styrene is 5 to 40% by weight, and the content of the monomer other than styrene is 60 to 95% by weight in the total monomer components used as a raw material of the resin emulsion;
(5) the coating composition for a sealer according to the above item (4), in which the monomer other than styrene is at least one monomer selected from the group consisting of an aromatic monomer other than styrene, an alkyl (meth)acrylate, a hydroxyl group-containing (meth)acrylate, a carboxyl group-containing monomer, an oxo group-containing monomer, a fluorine atom-containing monomer, a nitrogen atom-containing monomer and an epoxy group-containing monomer;
(6) the coating composition for a sealer according to any one of the above items (3) to (5), in which a resin layer prepared by emulsion polymerization of a monomer component containing 85 to 100% by weight of an aromatic monomer and 0 to 15% by weight of a monomer other than the aromatic monomer is included in any one of the plural resin layers;
(7) the coating composition for a sealer according the above item (6), in which the monomer other than the aromatic monomer is at least one monomer selected from the group consisting of an alkyl (meth)acrylate, a hydroxyl group-containing (meth)acrylate, a carboxyl group-containing monomer, an oxo group-containing monomer, a fluorine atom-containing monomer, a nitrogen atom-containing monomer and an epoxy group-containing monomer;
(8) the coating composition for a sealer according to any one of the above items (3) to (7), in which a resin layer, which is prepared by emulsion polymerization of a monomer component containing 1 to 10% by weight of a carboxyl group-containing monomer and 90 to 99% by weight of a monomer other than the carboxyl group-containing monomer, is contained in any one of the plural resin layers;
(9) the coating composition for a sealer according to the above item (8), in which the monomer other than the carboxyl group-containing monomer is at least one monomer selected from the group consisting of an aromatic monomer, an alkyl (meth)acrylate, a hydroxyl group-containing (meth)acrylate, an oxo group-containing monomer, a fluorine atom-containing monomer, a nitrogen atom-containing monomer and an epoxy group-containing monomer; and
(10) the coating composition for a sealer according to any one of the above items (1) to (9), in which a resin layer comprising a polymer having a glass transition temperature of 75° to 120° C. is included in any one of the plural resin layers, are provided.

Effects of the Invention

According to the present invention, a resin emulsion for a sealer, a resin composition for a sealer and a coating composition for a sealer, which are excellent in blocking resistance and film-forming property, are provided. In addition, according to the present invention, there are provided a resin emulsion for a sealer, a resin composition for a sealer and a coating composition for a sealer, which are excellent in frost damage resistance, water permeability resistance of a coated film and strength of a coated film.

MODES FOR CARRYING OUT THE INVENTION

First Aspect of the Invention

The first aspect of the present invention is described below. The first aspect of the present invention includes a resin emulsion for a sealer, which is useful for a sealer being used in, for example, an inorganic building material such as a ceramic-based building material, and a resin composition for a sealer which contains the resin emulsion for a sealer, and a coating composition for a sealer which contains the resin emulsion for a sealer as described above.

(1) Resin Emulsion for a Sealer

The resin emulsion for a sealer of the present invention is a resin emulsion containing emulsion particles which have an inner layer and an outer layer as described above.

In the resin emulsion for a sealer of the present invention, the inner layer is formed from a polymer (I) prepared by emulsion polymerization of a monomer component A containing 85 to 100% by weight of styrene and 0 to 15% by weight of a monomer other than the styrene, and the outer layer is formed from a copolymer prepared by emulsion polymerization of a monomer component B comprising 6 to 25% by weight of a carboxyl group-containing monomer and 75 to 94% by weight of a monomer other than the carboxyl group-containing monomer. The weight ratio of the polymer (I) to the polymer (II) [polymer (I)/polymer (II)] is 25/75 to 75/25. The total content of the polymer (I) and the polymer (II) in the emulsion particles is 50 to 100% by weight.

Incidentally, in the present invention, as long as an object of the present invention is not hindered, a layer other than the inner layer and the outer layer may be formed in the emulsion particle.

The polymer (I) which forms the inner layer is obtained by emulsion polymerization of a monomer component A containing 85 to 100% by weight of styrene and 0 to 15% by weight of a monomer other than the styrene.

The content of styrene in the monomer component A is 85 to 100% by weight from the viewpoint of improvement in blocking resistance and water permeability resistance of a coated film. Therefore, the monomer component A may be composed only of styrene. Also, a monomer other than styrene may be contained in the monomer component A within a range of 0 to 15% by weight from the viewpoint of improvement in blocking resistance and water permeability resistance of a coated film.

The monomer other than styrene include, for example, an aromatic monomer other than styrene, an ethylenically unsaturated monomer, and the like, and these monomers may be used alone, respectively, or at least 2 kinds thereof may be used jointly.

The aromatic monomer other than styrene includes, for example, α-methylstyrene, p-methylstyrene, tert-methylstyrene, chlorostyrene, vinyl toluene, an aralkyl (meth)acrylate, and the like, and the present invention is not limited only to those exemplified ones. The aralkyl (meth)acrylate includes, for example, aralkyl (meth)acrylates having an aralkyl group of 7 to 18 carbon atoms, such as benzyl (meth)acrylate, phenylethyl (meth)acrylate, methylbenzyl (meth)acrylate and naphthylmethyl (meth)acrylate, and the like, and the present invention is not limited only to those exemplified ones. These aromatic monomers other than styrene may be used alone, respectively, or at least 2 kinds thereof may be used jointly.

The ethylenically unsaturated monomer includes, for example, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer, and the like, and the present invention is not limited only to those exemplified ones. These monomers may be used alone, respectively, or at least 2 kinds thereof may be used jointly.

The alkyl (meth)acrylate includes, for example, alkyl (meth)acrylates having an ester group of 1 to 18 carbon atoms, such as methyl (meth)acrylate, ethyl (meth)acrylate, n-butyl (meth)acrylate, isobutyl (meth)acrylate, tert-butyl (meth)acrylate, sec-butyl (meth)acrylate, 2-ethylhexyl (meth)acrylate, tridecyl (meth)acrylate, cyclohexyl (meth)acrylate, n-octyl (meth)acrylate, n-lauryl (meth)acrylate and 2-(acetoacetoxy)ethyl (meth)acrylate, and the like, and the present invention is not limited only to those exemplified ones. These monomers may be used alone, respectively, or at least 2 kinds thereof may be used jointly.

The hydroxyl group-containing (meth)acrylate includes, for example, hydroxyl group-containing (meth)acrylates having an ester group of 1 to 18 carbon atoms, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, and the like, and the present invention is not limited only to those exemplified ones. These monomers may be used alone, respectively, or at least 2 kinds thereof may be used jointly.

The carboxyl group-containing monomer includes, for example, aliphatic monomers containing a carboxyl group, such as (meth)acrylic acid, maleic acid, fumaric acid, crotonic acid, itaconic acid and maleic anhydride, and the like, and the present invention is not limited only to those exemplified ones. These monomers may be used alone, respectively, or at least 2 kinds thereof may be used jointly. Among these carboxyl group-containing monomers, acrylic acid, methacrylic acid and itaconic acid are preferred, and acrylic acid and methacrylic acid are more preferred from the viewpoint of improvement in dispersion stability of emulsion particles.

The oxo group-containing monomer includes, for example, (di)ethylene glycol (methoxy) (meth)acrylates such as ethylene glycol (meth)acrylate, ethylene glycol methoxy (meth)acrylate, diethylene glycol (meth)acrylate and diethylene glycol methoxy (meth)acrylate, and the like, and the present invention is not limited only to those exemplified ones. These monomers may be used alone, respectively, or at least 2 kinds thereof may be used jointly.

The fluorine atom-containing monomer, includes, for example, fluorine atom-containing alkyl (meth)acrylates having an ester group of 2 to 6 carbon atoms, such as trifluoroethyl (meth)acrylate, tetrafluoropropyl (meth)acrylate and octafluoropentyl (meth)acrylate, and the like, and the present invention is not limited only to those exemplified ones. These monomers may be used alone, respectively, or at least 2 kinds thereof may be used jointly.

The nitrogen atom-containing monomer includes, for example, acrylamide compounds such as (meth)acrylamide, N,N-dimethylaminopropyl acrylamide and diacetone acrylamide, nitrogen atom-containing (meth)acrylate compounds such as dimethylaminoethyl (meth)acrylate and diethylaminoethyl (meth)acrylate, N-vinylpyrrolidone, and the like, and the present invention is not limited only to those exemplified ones. These monomers may be used alone, respectively, or at least 2 kinds thereof may be used jointly.

The epoxy group-containing monomer includes, for example, epoxy group-containing (meth)acrylates such as glycidyl (meth)acrylate, and the like, and the present invention is not limited only to those exemplified ones. These monomers may be used alone, respectively, or at least 2 kinds thereof may be used jointly.

Therefore, the monomer other than styrene includes, for example, an aromatic monomer other than styrene, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer, and the like, and these monomers may be used alone, respectively, or at least 2 kinds thereof may be used jointly.

Among the monomers other than styrene, from the viewpoint of improvement in water permeability resistance of a coated film, ethylenically unsaturated monomers such as an alkyl (meth)acrylate, an aralkyl (meth)acrylate and glycidyl (meth)acrylate are preferred, (meth)acrylic monomers are more preferred, and tert-butyl (meth)acrylate, 2-ethylhexyl (meth)acrylate, cyclohexyl (meth)acrylate, benzyl (meth)acrylate and glycidyl (meth)acrylate are still more preferred.

Here, the term "(meth)acrylate" means "acrylate" and/or "methacrylate", and the term "(meth)acrylic" means "acrylic" and/or "methacrylic" in the present specification.

A method for carrying out the emulsion polymerization of the monomer component A includes, for example, a method comprising dissolving an emulsifier in a medium such as an aqueous medium containing water and a water-soluble organic solvent such as a lower alcohol represented by methanol, or water, and adding dropwise thereto a monomer component A and a polymerization initiator with stirring, a method comprising previously emulsifying a monomer component with an emulsifier and water, and adding dropwise the emulsified monomer component to water or an aqueous medium, and the like, and the present invention is not limited only to these methods. Incidentally, the amount of the medium can be appropriately controlled in consideration of the amount of nonvolatile components contained in the resulting resin emulsion.

The emulsifier includes an anionic emulsifier, a nonionic emulsifier, a cationic emulsifier, an amphoteric emulsifier, a macromolecular emulsifier, and the like, and these emulsifiers may be used alone, respectively, or at least 2 kinds thereof may be used jointly.

The anionic emulsifier includes, for example, alkyl sulfate salts such as ammonium dodecyl sulfate and sodium dodecyl sulfate; alkyl sulfonate salts such as ammonium dodecyl sulfonate and sodium dodecyl sulfonate; alkyl aryl sulfonate salts such as ammonium dodecylbenzene sulfonate and sodium dodecylnaphthalene sulfonate; a polyoxyethylene alkyl sulfate salt; a polyoxyethylene alkyl aryl sulfate salt; a dialkyl sulfosuccinate salt; an aryl sulfonic acid-formalin condensate; fatty acid salts such as ammonium lauriate and sodium stearate, and the like, and the present invention is not limited only to those exemplified ones.

The nonionic emulsifier includes, for example, a polyoxyethylene alkyl ether, a polyoxyethylene alkyl aryl ether, a condensate of a polyethylene glycol and a polypropylene glycol, a sorbitan fatty acid ester, a polyoxyethylene sorbitan fatty acid ester, fatty acid monoglyceride, a condensation product of ethylene oxide and an aliphatic amine, and the like, and the present invention is not limited only to those exemplified ones.

The cationic emulsifier includes, for example, alkyl ammonium salts such as dodecyl ammonium chloride, and the like, and the present invention is not limited only to those exemplified ones.

The amphoteric emulsifier includes, for example, a betaine ester emulsifier, and the like, and the present invention is not limited only to those exemplified ones.

The macromolecular emulsifier includes, for example, poly(meth)acrylic acid salts such as sodium polyacrylate; polyvinyl alcohol; polyvinylpyrrolidone; polyhydroxyalkyl (meth)acrylates such as polyhydroxyethyl acrylate; a copolymer prepared from copolymerizable components containing at least one monomer which is used as a monomer for constituting these polymers, and the present invention is not limited only to those exemplified ones.

It is preferred that the emulsifier is an emulsifier having a polymerizable group, that is, so-called reactive emulsifier from the viewpoint of improvement in water permeability resistance of a coated film, or a non-nonylphenyl type emulsifier from the viewpoint of environmental protection.

The reactive emulsifier includes, for example, a propenyl-alkyl sulfosuccinate salt, a (meth)acrylic acid polyoxyethylene sulfonate salt, a (meth)acrylic acid polyoxyethylene phosphonate salt [for example, commercially available from Sanyo Chemical Industries, Ltd. under the trade name of Eleminol RS-30, and the like], a polyoxyethylene alkyl propenylphenyl ether sulfonate salt [for example, commercially available from Dai-Ichi Kogyo Seiyaku Co., Ltd. under the trade name of Aqualon HS-10, and the like], a sulfonate salt of an allyloxymethylalkyloxy polyoxyethylene [for example, commercially available from Dai-Ichi Kogyo Seiyaku Co., Ltd. under the trade name of Aqualon KH-10, and the like], a sulfonate salt of an allyloxymethyl nonylphenoxyethyl hydroxypolyoxyethylene [for example, commercially available from ADEKA CORPORATION under the trade name of ADEKA REASOAP SE-10, and the like], an allyloxymethyl alkoxyethyl hydroxypolyoxyethylene sulfuric ester salt [for example, commercially available from ADEKA CORPORATION under the trade name of ADEKA REASOAP SR-10, SR-30, and the like], a bis(polyoxyethylene polycyclic phenyl ether) methacrylated sulfonate salt [for example, commercially available from Nippon Nyukazai Co., Ltd. under the trade name of Antox MS-60, and the like], an allyloxymethyl alkoxyethyl hydroxypolyoxyethylene [for example, commercially available from ADEKA CORPORATION under the trade name of ADEKA REASOAP ER-20, and the like], a polyoxyethylene alkyl propenylphenyl ether [for example, commercially available from Dai-Ichi Kogyo Seiyaku Co., Ltd. under the trade name of Aqualon RN-20, and the like], an allyloxymethyl nonylphenoxyethyl hydroxypolyoxyethylene [for example, commercially available from ADEKA CORPORATION under the trade name of ADEKA REASOAP NE-10, and the like], and the like, and the present invention is not limited only to those exemplified ones.

The amount of the emulsifier per 100 parts by weight of the monomer component A is preferably not less than 0.5 parts by weight, more preferably not less than 1 part by weight, still more preferably not less than 2 parts by weight, particularly preferably not less than 3 parts by weight from the viewpoint of improvement in polymerization stability, and the amount of the emulsifier is preferably not more than 10 parts by weight, more preferably not more than 6 parts by weight, still more preferably not more than 5 parts by weight, most preferably not more than 4 parts by weight from the viewpoint of improvement in water permeability resistance of a coated film.

The polymerization initiator includes, for example, azo compounds such as azobisisobutyronitrile, 2,2-azobis(2-methylbutyronitrile), 2,2-azobis(2,4-dimethylvaleronitrile), 2,2-azobis(2-diaminopropane) hydrochloride, 4,4-azobis(4-cyanovaleric acid) and 2,2-azobis(2-methylpropionamidin); persulfates such as potassium persulfate; peroxides such as hydrogen peroxide, benzoyl peroxide, parachlorobenzoyl peroxide, lauroyl peroxide and ammonium peroxide; and the like, and the present invention is not limited only to those exemplified ones. These polymerization initiators may be used alone, respectively, or at least 2 kinds thereof may be used jointly.

The amount of the polymerization initiator per 100 parts by weight of the monomer component A is preferably not less than 0.05 parts by weight, more preferably not less than 0.1 parts by weight from the viewpoint of increase in rate of polymerization and reduction of the residual amount of unreacted monomer component A, and the amount of the polymerization initiator is preferably not more than 1 part by weight, more preferably not more than 0.5 parts by weight from the viewpoint of improvement in water permeability resistance of a coated film being formed.

A method for adding a polymerization initiator is not particularly limited. The method for adding a polymerization initiator includes, for example, adding at a time, adding separately, continuously adding dropwise, and the like. Incidentally, a part of the polymerization initiator may be added to a reaction system before or after the completion of the addition of the monomer component A to the mixture, from the viewpoint of acceleration of the termination of the polymerization reaction.

Incidentally, in order to accelerate the decomposition of a polymerization initiator, for example, a reducing agent such as sodium hydrogensulfite, or a decomposition agent of a polymerization initiator such as ferrous sulfate may be added to the mixture in an appropriate amount.

An additive agent, for example, a chain transfer agent such as a compound having a thiol group, such as tert-dodecyl mercaptan, a pH buffering agent, a chelating agent, or an auxiliary agent for film-forming may be added to the mixture as occasion demands. The amount of the additive agent cannot be absolutely determined since the amount changes depending on its kind, but the amount per 100 parts by weight of the monomer component A is usually preferably 0.1 to 5 parts by weight, and more preferably 0.01 to 3 parts by weight.

The atmosphere at the time of carrying out the emulsion polymerization of the monomer component A is not particularly limited, but the atmosphere is preferably an inert gas such as nitrogen gas from the viewpoint of increase in efficiency of a polymerization initiator. The polymerization temperature at the time of carrying out the emulsion polymerization of the monomer component A is not particularly limited, but the polymerization temperature is usually preferably 50° to 100° C., more preferably 60° to 95° C. The polymerization temperature may be constant or changed in the course of the polymerization reaction. The polymerization time for carrying out the emulsion polymerization of the monomer component A is not particularly limited, and can be appropriately controlled in accordance with the progressing state of a polymerization reaction. The polymerization temperature is usually about 2 to about 9 hours.

A polymer (I) which forms an inner layer is obtained in the form of an emulsion particle by carrying out the emulsion polymerization of the monomer component A as mentioned above.

The polymer (I) may have a cross-linking structure. The weight-average molecular weight of the polymer (I) is preferably not less than 100000, more preferably not less than 300000, still more preferably not less than 550000, particularly preferably not less than 600000 from the viewpoint of improvement in water permeability resistance of a coated film in any case of the case where the polymer (I) has a cross-linking structure and the case where the polymer (I) does not have a cross-linking structure. When the polymer has a cross-linking structure, the upper limit of the weight-average molecular weight of the polymer (I) is not particularly limited since it is difficult to determine the weight-average molecular weight of the polymer (I). When the polymer does not have a cross-linking structure, the upper limit of the weight-average molecular weight is preferably not more than 5000000 from the viewpoint of improvement in film-forming property.

Incidentally, the weight-average molecular weight as described in the present specification means a weight-average molecular weight (polystyrene conversion) which is determined by using a gel permeation chromatography commercially available from Tosoh Corporation under the product number of HLC-8120GPC, in which a column of TSKgel G-5000HXL and a column of TSKgel GMHXL-L are used so that these columns are connected with each other in series.

After an inner layer comprising the polymer (I) is formed, an outer layer comprising a polymer (II) having a glass transition temperature of not more than 40° C. is formed on the surface of the inner layer, in which the polymer (II) is prepared by carrying out the emulsion polymerization of a monomer component B containing 6 to 25% by weight of a carboxyl group-containing monomer and 75 to 94% by weight of a monomer other than the carboxyl group-containing monomer.

When the emulsion polymerization of the monomer component B is carried out, it is preferred that the emulsion polymerization of the monomer component B is carried out after the rate of a polymerization reaction of the polymer (I) attains to not less than 90%, preferably not less than 95% from the viewpoint of the formation of a phase separation structure in the emulsion particle.

Incidentally, after the formation of the inner layer comprising the polymer (I) and before the formation of the outer layer comprising the polymer (II), a layer comprising the other polymer may be formed on the inner layer within a range which does not hinder an object of the present invention as occasion demands. Accordingly, in the method for producing a resin emulsion for a sealer of the present invention, a process for producing a layer comprising the other polymer may be included after the formation of the inner layer comprising the polymer (I) and before the formation of the outer layer comprising the polymer (II) within a range which does not hinder an object of the present invention as occasion demands.

The carboxyl group-containing monomer used in the monomer component B includes, for example, carboxyl group-containing aliphatic monomers such as (meth)acrylic acid, maleic acid, fumaric acid, crotonic acid, itaconic acid and maleic anhydride, and the like, and the present invention is not limited only to those exemplified ones. These carboxyl group-containing monomers may be used alone, respectively, or at least 2 kinds thereof may be used jointly. Among these carboxyl group-containing monomers, acrylic acid, methacrylic acid and itaconic acid are preferred, and acrylic acid and methacrylic acid are more preferred from the viewpoint of improvement in dispersion stability of emulsion particles.

The content of the carboxyl group-containing monomer in the monomer component B is not less than 6% by weight, preferably not less than 10% by weight from the viewpoint of improvement in adhesion and prevention of wrinkle of a coated film caused by shrinkage, and the content of the carboxyl group-containing monomer in the monomer component B is not more than 25% by weight from the viewpoint of improvement in water permeability resistance and frost damage resistance of a coated film.

Examples of the monomer other than the carboxyl group-containing monomer used in the monomer component B include, an aromatic monomer and an ethylenically unsaturated monomer other than the carboxyl group-containing monomer, which are exemplified as the monomers other than styrene used in the above-mentioned monomer component A, and the like.

The aromatic monomer includes, for example, styrene, α-methylstyrene, p-methylstyrene, tert-methylstyrene, chlorostyrene, vinyl toluene, an aralkyl (meth)acrylate and the like, and the present invention is not limited only to those exemplified ones. The aralkyl (meth)acrylate includes, for example, aralkyl (meth)acrylates having an aralkyl group of 7 to 18 carbon atoms, such as benzyl (meth)acrylate, phenylethyl (meth)acrylate, methylbenzyl (meth)acrylate and naphthylmethyl (meth)acrylate, and the like, and the present invention is not limited only to those exemplified ones. These aromatic monomers other than styrene may be used alone, respectively, or at least 2 kinds thereof may be used jointly.

The ethylenically unsaturated monomer other than the carboxyl group-containing monomer includes the above-mentioned alkyl (meth)acrylate, the above-mentioned hydroxyl group-containing (meth)acrylate, the above-mentioned oxo group-containing monomer, the above-mentioned fluorine atom-containing monomer, the above-mentioned nitrogen atom-containing monomer, the above-mentioned epoxy group-containing monomer and the like, and these monomers may be used alone, respectively, or at least 2 kinds thereof may be used jointly.

Among the monomers other than the carboxyl group-containing monomer, tert-butyl (meth)acrylate, 2-ethylhexyl (meth)acrylate, cyclohexyl (meth)acrylate, benzyl (meth)acrylate and glycidyl (meth)acrylate are preferred from the viewpoint of improvement in water permeability resistance of a coated film.

The content of the monomer other than the carboxyl group-containing monomer in the monomer component B is not less than 75% by weight from the viewpoint of improvement in water permeability resistance of a coated film and frost damage resistance, and not more than 94% by weight, preferably not more than 90% by weight from the viewpoint of prevention of wrinkle of a coated film caused by shrinkage.

A method for carrying out an emulsion polymerization of the monomer component B and its polymerization conditions can be the same as the method and its polymerization conditions which are used for the above-mentioned monomer A.

By carrying out the emulsion polymerization of the monomer component B as mentioned above, emulsion particles in which the polymer (II) for forming the outer surface is formed on the surface of the above-mentioned inner layer. Incidentally, as long as an object of the present invention is not hindered, a surface layer comprising the other polymer may be formed on the surface of the outer layer comprising the polymer (II) as occasion demands.

The polymer (II) may have a cross-linking structure. The weight-average molecular weight of the polymer (II) is preferably not less than 100000, more preferably not less than 300000, still more preferably not less than 550000, and particularly preferably not less than 600000 from the viewpoint of improvement in water permeability resistance of a coated film in any case of the case where the polymer (II) has a cross-linking structure and the case where the polymer (II) does not have a cross-linking structure. When the polymer (II) has a cross-linking structure, the upper limit of the weight-average molecular weight is not particularly limited since it is difficult to determine the weight-average molecular weight of the polymer (II). When the polymer (II) does not have a cross-linking structure, the upper limit of the weight-average molecular weight of the polymer (II) is preferably not more than 5000000 from the viewpoint of improvement in film-forming property.

The glass transition temperature of the polymer (II) is not more than 40° C., preferably not more than 30° C. from the viewpoint of improvement in film-forming property. In addition, the glass transition temperature of the polymer (II) is preferably not less than −20° C., more preferably not less than 0° C. from the viewpoint of improvement in blocking resistance. The glass transition temperature of the polymer (II) can be easily controlled by adjusting the composition of monomers used in the monomer component.

Incidentally, the glass transition temperature of a polymer described in the present specification means a temperature which is obtained by using a glass transition temperature of a homopolymer made of a monomer used in the monomer component for constituting the polymer and determining the glass transition temperature on the basis of Fox's equation represented by the equation:

$$1/Tg = \Sigma(Wm/Tgm)/100$$

wherein Wm is a content (% by weight) of a monomer "m" in the monomer component for constituting a polymer, and Tgm is a glass transition temperature (absolute temperature: K) of a homopolymer made of the monomer "m".

As to the glass transition temperature of a polymer, for example, the glass transition temperature of styrene homopolymer is 100° C., the glass transition temperature of 2-ethylhexyl acrylate homopolymer is −70° C., the glass transition temperature of acrylic acid homopolymer is 95° C., the glass transition temperature of methyl methacrylate homopolymer is 105° C., the glass transition temperature of butyl acrylate homopolymer is −56° C., the glass transition temperature of methacrylic acid homopolymer is 130° C., the glass transition temperature of hydroxyethyl methacrylate homopolymer is 55° C., and the glass transition temperature of gamma-methacryloxypropyltrimethoxysilane (TMSMA) homopolymer is 70° C.

The glass transition temperature of a polymer is a value determined by the above-mentioned Fox's equation. It is preferred that the found value of the glass transition temperature of a polymer is the same as the value determined by the above-mentioned Fox's equation. The found value of the glass transition temperature of a polymer can be determined by, for example, measuring its differential scanning calory.

The measuring device of the differential scanning calory includes, for example, a measuring device commercially available from Seiko Instruments, Inc. under the item number of DSC220C, and the like. In addition, when the differential scanning calory is measured, there is no limitation in a method for drawing the curve of a differential scanning calory (DSC), a method for obtaining a first differential curve from the curve of a differential scanning calory (DSC), a method for carrying out a smoothing processing, a method for determining a target peak temperature, and the like. For example, when the above-mentioned measuring device is used, a chart can be drawn from the data obtained by using the measuring device. In this case, analysis software which can perform mathematical processing can be used. The analysis software includes, for example, analysis software commercially available from Seiko Instruments, Inc. under the item number of EXSTAR6000, and the like, and the present invention is not limited only to those exemplified ones. Incidentally, the peak temperature as measured by the above method may include an error of plus or minus 5° C. or so, which is derived from drawing.

The glass transition temperature of the emulsion particle itself is preferably not less than 0° C., more preferably not less than 10° C., still more preferably not less than 20° C. from the viewpoint of increase in hardness of a coated film, and the glass transition temperature of the emulsion particle is preferably not more than 65° C., more preferably not more than 60° C., still more preferably not more than 55° C. from the viewpoint of improvement in film-forming property.

It is preferred that the solubility parameter (hereinafter referred to as SP value) of the polymer (II) is higher than the SP value of the polymer (I) from the viewpoint of the formation of a layer separation structure in the emulsion particle. It is preferred that the difference between the SP value of the polymer (I) and the SP value of the polymer (II) is larger from the viewpoint of the formation of a layer separation structure in the emulsion particle. In the present invention, since the emulsion particle comprises the polymer (I) in which styrene having a low SP value is used and the polymer (II) in which the carboxyl group-containing monomer having a high SP value is used, the emulsion particle has an ideal structure where the inner layer is clearly separated from the outer layer.

The SP value is a value as defined by the regular solution theory introduced by Hildebrand, and has also become a rule of thumb of the solubility of a solution containing 2 components. Generally, substances having a closer SP value with each other tend to be easily miscible with each other. Therefore, the SP value also becomes a rule of thumb for evaluating the miscibility of a solute with a solvent.

The weight ratio of the polymer (I) to the polymer (II) [the polymer (I)/the polymer (II)] is not less than 25/75, preferably not less than 35/65 from the viewpoint of improvement in blocking resistance and water permeability resistance of a coated film, and the weight ratio of the polymer (I) to the polymer (II) is not more than 75/25, preferably not more than 65/35 from the viewpoint of improvement in frost damage resistance.

The total content of the polymer (I) and the polymer (II) in an emulsion particle is not less than 50% by weight, preferably not less than 65% by weight from the viewpoint of improvement in blocking resistance, water permeability resistance of a coated film, frost damage resistance and adhesion. It is preferred that the total content of the polymer (I) and the polymer (II) in an emulsion particle is higher, and its upper limit is 100% by weight.

In the present invention, the content of styrene in the total monomer components used as a raw material of a polymer for constituting an emulsion particle is preferably not less than 70% by weight from the viewpoint of improvement in water permeability resistance of a coated film, and the content of styrene in the total monomer components is preferably not more than 85% by weight from the viewpoint of improvement in film-forming property. Therefore, the content of monomers other than styrene in the total monomer components used as a raw material of a polymer for constituting an emulsion particle is preferably not less than 15% by weight from the viewpoint of improvement in film-forming property, and the content of monomers other than styrene in the total monomer components is preferably not more than 30% by weight from the viewpoint of improvement in water permeability resistance of a coated film.

The average particle diameter of emulsion particles is preferably not less than 30 nm, more preferably not less than 50 nm, still more preferably not less than 70 nm from the viewpoint of improvement in storage stability of emulsion particles, and the average particle diameter of emulsion particles is preferably not more than 250 nm, more preferably not more than 200 nm from the viewpoint of improvement in water permeability resistance of a coated film.

Incidentally, the average particle diameter of emulsion particles means a volume average particle diameter which is determined by using a particle size distribution measuring instrument commercially available from Particle Sizing Systems under the trade name of NICOMP Model 380, which employs a dynamic light scattering.

The content of a nonvolatile component in the resin emulsion for a sealer of the present invention is preferably not less than 30% by weight, more preferably not less than 40% by weight from the viewpoint of improvement in productivity, and the content of a nonvolatile component in the resin emulsion for a sealer is preferably not more than 70% by weight, more preferably not more than 60% by weight from the viewpoint of improvement in handling.

The content of the nonvolatile component in the resin emulsion for a sealer in the present specification means a value which is determined by weighing 1 g of a resin emulsion, drying the resin emulsion at 110° C. for 1 hour by means of a hot air drying equipment, and calculating the content of the resulting residue which is a nonvolatile component based on the equation:

[Content of nonvolatile component in the resin emulsion(% by mass)]=([Mass of residue]÷[1 g of the resin emulsion])×100.

The minimum film-forming temperature of the resin emulsion for a sealer of the present invention is preferably not less than −5° C., more preferably not less than 5° C., still more preferably not less than 20° C. from the viewpoint of increase in hardness of a coated film, and preferably not more than 70° C., more preferably not more than 65° C., still more preferably not more than 60° C. from the viewpoint of improvement in film-forming property.

Incidentally, the minimum film-forming temperature of the resin emulsion for a sealer in the present specification is determined by placing a glass plate on a thermal gradient tester, applying a resin emulsion onto the glass plate to form a film having a thickness of 0.2 mm by means of an applicator, drying the film, and measuring a temperature of the film when a crack is generated in the film, and the temperature is regarded as a minimum film-forming temperature.

The resin emulsion for a sealer of the present invention obtained as described above is excellent in blocking resistance and film-forming property. Therefore, the resin emulsion is useful in, for example, a sealer for inorganic building materials such as a ceramic building material.

The inorganic building material includes, for example, a ceramic substrate, a metallic substrate, and the like. The ceramic substrate is used for the uses, for example, a tile, an outer wall material, and the like. The ceramic substrate is obtained by adding an inorganic filler, a fibrous material or the like to a hydraulic adhesion material which is used as a raw material for an inorganic hardened body, molding the resulting mixture, and maturing the resulting molded product to harden the molded product. The inorganic building material includes, for example, a flexible board, a calcium silicate board, a gypsum-slag perlite board, a cement wood chip board, a precast concrete board, an ALC panel, plasterboard, and the like. Since water is generally easily permeated into the inorganic building material, the inorganic building material has a property such that the inorganic building material easily deteriorates. Therefore, an undercoat material, which is currently called as a sealer, is applied to the surface and the back surface of an inorganic building material. In order to give a desired design, a top coat is usually applied to the surface of the inorganic building material. Among them, the resin emulsion for a sealer of the present invention can be suitably used for an undercoat material.

(2) Resin Composition for a Sealer

The resin composition for a sealer contains a resin emulsion containing emulsion particles having plural resin layers obtained by multistep emulsion polymerization of a monomer component and a glass transition temperature of 0 to 60° C., and a pigment as described above. The emulsion particle has plural resin layers. The number of the resin layers which constitute the emulsion particle is not particularly limited, and is preferably 2 to 5, more preferably 2 to 4, still more preferably 2 or 3.

The resin emulsion is obtained by carrying out the multistep emulsion polymerization of a monomer component. In the total monomer components used as a raw material of a resin emulsion, it is preferred that the content of an aromatic monomer is not less than 70% by weight, and the content of a monomer other than the aromatic monomer is not more than 30% by weight from the viewpoint of improvement in water permeability resistance of a coated film, and it is preferred that the content of the aromatic monomer is not more than 85% by weight, and the content of a monomer other than the aromatic monomer is not less than 15% by weight from the viewpoint of improvement in film-forming property.

The aromatic monomer includes, for example, styrene, an aralkyl (meth)acrylate, α-methylstyrene, p-methylstyrene, tert-methylstyrene, chlorostyrene, vinyl toluene and the like, and the present invention is not limited only to those exemplified ones. The aralkyl (meth)acrylate includes, for example, aralkyl (meth)acrylates having an aralkyl group of 7 to 18 carbon atoms, such as benzyl (meth)acrylate, phenylethyl (meth)acrylate, methylbenzyl (meth)acrylate and naphthylmethyl (meth)acrylate, and the like, and the present invention is not limited only to those exemplified ones. These aromatic monomers may be used alone, respectively, or at least 2 kinds thereof may be used jointly. Among these aromatic monomers, styrene is preferred from the viewpoint of improvement in water permeability resistance of a coated film.

The monomer other than the aromatic monomer includes, for example, an ethylenically unsaturated monomer, and the like. The ethylenically unsaturated monomer include, for example, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones.

The alkyl (meth)acrylate includes, for example, alkyl (meth)acrylates having an ester group of 1 to 18 carbon atoms, such as methyl (meth)acrylate, ethyl (meth)acrylate, n-butyl (meth)acrylate, isobutyl (meth)acrylate, tert-butyl (meth)acrylate, sec-butyl (meth)acrylate, 2-ethylhexyl (meth)acrylate, tridecyl (meth)acrylate, cyclohexyl (meth)acrylate, n-octyl (meth)acrylate, n-lauryl (meth)acrylate and 2-(acetoacetoxy)ethyl (meth)acrylate, and the like, and the present invention is not limited only to those exemplified ones. These monomers may be used alone, respectively, or at least 2 kinds thereof may be used jointly.

The hydroxyl group-containing (meth)acrylate includes, for example, hydroxyl group-containing (meth)acrylates having an ester group of 1 to 18 carbon atoms, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, and the like, and the present invention is not limited only to those exemplified ones. These monomers may be used alone, respectively, or at least 2 kinds thereof may be used jointly.

The carboxyl group-containing monomer includes, for example, aliphatic monomers containing a carboxyl group, such as (meth)acrylic acid, maleic acid, fumaric acid, crotonic acid, itaconic acid and maleic anhydride, and the like, and the present invention is not limited only to those exemplified ones. These monomers may be used alone, respectively, or at least 2 kinds thereof may be used jointly. Among these carboxyl group-containing monomers, acrylic acid, methacrylic acid and itaconic acid are preferred, and acrylic acid and methacrylic acid are more preferred from the viewpoint of improvement in dispersion stability of emulsion particles.

The oxo group-containing monomer includes, for example, (di)ethylene glycol (methoxy) (meth)acrylates such as ethylene glycol (meth)acrylate, ethylene glycol methoxy (meth)acrylate, diethylene glycol (meth)acrylate and diethylene glycol methoxy (meth)acrylate, and the like, and the present invention is not limited only to those exemplified ones. These monomers may be used alone, respectively, or at least 2 kinds thereof may be used jointly.

The fluorine atom-containing monomer includes, for example, fluorine atom-containing alkyl (meth)acrylates having an ester group of 2 to 6 carbon atoms, such as trifluoroethyl (meth)acrylate, tetrafluoropropyl (meth)acrylate and octafluoropentyl (meth)acrylate, and the like, and the present invention is not limited only to those exemplified ones. These monomers may be used alone, respectively, or at least 2 kinds thereof may be used jointly.

The nitrogen atom-containing monomer includes, for example, acrylamide compounds such as (meth)acrylamide, N,N-dimethylaminopropyl acrylamide and diacetone acrylamide, nitrogen atom-containing (meth)acrylate compounds such as dimethylaminoethyl (meth)acrylate and diethylaminoethyl (meth)acrylate, N-vinylpyrrolidone, and the like, and the present invention is not limited only to those exemplified ones. These monomers may be used alone, respectively, or at least 2 kinds thereof may be used jointly.

The epoxy group-containing monomer includes, for example, epoxy group-containing (meth)acrylates such as glycidyl (meth)acrylate, and the like, and the present invention is not limited only to those exemplified ones. These monomers may be used alone, respectively, or at least 2 kinds thereof may be used jointly.

Among the ethylenically unsaturated monomers, from the viewpoint of improvement in water permeability resistance of a coated film, (meth)acrylic monomers such as an alkyl (meth)acrylate, an aralkyl (meth)acrylate and glycidyl (meth)acrylate are preferred, and tert-butyl (meth)acrylate, 2-ethylhexyl (meth)acrylate, cyclohexyl (meth)acrylate, benzyl (meth)acrylate and glycidyl (meth)acrylate are more preferred.

The emulsion particle has plural resin layers. It is desired that a resin layer obtained by emulsion polymerization of a monomer component containing 80 to 100% by weight, preferably 85 to 100% by weight, more preferably 90 to 100% by weight of an aromatic monomer and 0 to 20% by weight, preferably 0 to 15% by weight, more preferably 0 to 10% by weight of a monomer other than the aromatic monomer is included in any one of the plural resin layers from the viewpoint of improvement in water permeability resistance of a coated film. This resin layer may be included in any one of the plural resin layers, and it is preferred that this resin layer exists as an inner layer of the emulsion particle from the viewpoint of improvement in film-forming property. The monomer other than the aromatic monomer includes, for example, the above-mentioned ethylenically unsaturated monomer, and the like. The above-mentioned ethylenically unsaturated monomer can be suitably used in the present invention. Concrete examples of the monomer other than the aromatic monomer include an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer, and the like, and the present invention is not limited only to those exemplified ones. These monomers may be used alone, respectively, or at least 2 kinds thereof may be used jointly.

It is preferred that a resin layer obtained by emulsion polymerization of a monomer component containing 10 to 25% by weight of a carboxyl group-containing monomer and 75 to 90% by weight of a monomer other than the carboxyl group-containing monomer is contained in any one of the plural resin layers which constitute the emulsion particle from the viewpoint of improvement in film-forming property and water permeability resistance of a coated film. In this case, it is preferred that the content of the carboxyl group-containing monomer is not less than 10% by weight and the content of the monomer other than the carboxyl group-containing monomer is not more than 90% by weight in this monomer component from the viewpoint of improvement in film-forming property. Also, it is desired that the content of the carboxyl group-containing monomer is not more than 25% by weight, preferably not more than 20% by weight, more preferably not more than 15% by weight, and the content of the monomer other than the carboxyl group-containing monomer is not less than 75% by weight, preferably not less than 80% by weight, more preferably not less than 85% by weight in this monomer component from the viewpoint of improvement in water permeability resistance of a coated film. This resin layer may be included in any one of the above-mentioned plural resin layers, and it is preferred that this resin layer exists as an outer layer of the emulsion particle from the viewpoint of improvement in film-forming property.

As the carboxyl group-containing monomer, there can be cited the carboxyl group-containing monomer which is exemplified in the above-mentioned ethylenically unsaturated monomer. Also, as the monomer other than the carboxyl group-containing monomer, there can be cited, for example, the above-mentioned aromatic monomer, the above-mentioned ethylenically unsaturated monomer other than the carboxyl group-containing monomer, and the like. Concrete examples of the monomer other than the carboxyl group-containing monomer include the above-mentioned aromatic monomer, the above-mentioned alkyl (meth)acrylate, the above-mentioned hydroxyl group-containing (meth)acrylate, the above-mentioned oxo group-containing monomer, the above-mentioned fluorine atom-containing monomer, the above-mentioned nitrogen atom-containing monomer, the above-mentioned epoxy group-containing monomer, and the like, and the present invention is not limited only to those exemplified ones. These monomers may be used alone, respectively, or at least 2 kinds thereof may be used jointly.

As a preferred resin emulsion, there can be cited a resin emulsion containing emulsion particles having an inner layer comprising a polymer (I) obtained by emulsion polymerization of a monomer component A containing 80 to 100% by weight of an aromatic monomer and 0 to 20% by weight of a monomer other than the aromatic monomer, and an outer layer comprising a polymer (II) obtained by emulsion polymerization of a monomer component B containing 10 to 25% by weight of a carboxyl group-containing monomer and 75 to 90% by weight of a monomer other than the carboxyl group-containing monomer.

Incidentally, in the present invention, a layer other than the above-mentioned inner layer and the above-mentioned outer layer may be formed in the emulsion particle within a range which does not hinder an object of the present invention.

The polymer (I) which forms the above-mentioned inner layer is obtained by, for example, emulsion polymerization of a monomer component A containing 80 to 100% by weight of an aromatic monomer and 0 to 20% by weight of a monomer other than the aromatic monomer.

The content of the aromatic monomer in the monomer component A is preferably 80 to 100% by weight, more preferably 85 to 100% by weight from the viewpoint of improvement in blocking resistance and water permeability resistance of a coated film. Therefore, the component A may be composed only of the aromatic monomer. Among the aromatic monomers, styrene is preferred from the viewpoint of improvement in water permeability resistance of a coated film, as mentioned above. In addition, the monomer component A may contain a monomer other than the aromatic monomer in a content of preferably 0 to 20% by weight, more preferably 0 to 15% by weight. As the monomer other than the aromatic monomer, those exemplified in the above can be cited.

A method for carrying out the emulsion polymerization of the monomer component A includes, for example, a method comprising dissolving an emulsifier in a medium such as an aqueous medium containing water and a water-soluble organic solvent such as a lower alcohol represented by methanol, or water, and adding dropwise thereto a monomer component A and a polymerization initiator with stirring, a method comprising previously emulsifying a monomer component A with an emulsifier and water, and adding the emulsified monomer component A dropwise to water or an aqueous medium, and the like, and the present invention is not limited only to these methods. Incidentally, the amount of the medium can be controlled in consideration of the amount of a nonvolatile component contained in the resulting resin emulsion.

The kind and amount of the emulsifier, the kind, amount and adding method of the polymerization initiator, addition of a decomposition agent of a polymerization initiator, the kind and amount of the additive, and the like can be the same as mentioned above.

The atmosphere at the time of carrying out the emulsion polymerization of the monomer component A is not particularly limited, but the atmosphere is preferably an inert gas such as nitrogen gas from the viewpoint of increase in efficiency of a polymerization initiator. The polymerization temperature at the time of carrying out the emulsion polymerization of the monomer component A is not particularly limited, but the polymerization temperature is usually preferably 50° to 100° C., more preferably 60° to 95° C. The polymerization temperature may be constant or changed in the course of the polymerization reaction. The polymerization time for carrying out the emulsion polymerization of the monomer component A is not particularly limited, and can be appropriately controlled in accordance with the progressing state of a polymerization reaction. The polymerization temperature is usually about 2 to about 9 hours.

A polymer (I) for forming an inner layer is obtained in the form of an emulsion particle by carrying out the emulsion polymerization of the monomer component A as mentioned above.

The polymer (I) may have a cross-linking structure. The weight-average molecular weight of the polymer (I) is preferably not less than 100000, more preferably not less than 300000, still more preferably not less than 550000, and particularly preferably not less than 600000 from the viewpoint of improvement in water permeability resistance of a coated film in any case of the case where the polymer (I) has a cross-linking structure and the case where the polymer (I) does not have a cross-linking structure. When the polymer (I) has a cross-linking structure, the upper limit of the weight-average molecular weight of the polymer (I) is not particularly limited since it is difficult to determine the weight-average molecular weight of the polymer (I). When the polymer (I) does not have a cross-linking structure, the upper limit of the weight-average molecular weight of the polymer (I) is preferably not more than 5000000 from the viewpoint of improvement in film-forming property.

Next, after an inner layer comprising the polymer (I) is formed, an outer layer comprising a polymer (II) is formed thereon by carrying out the emulsion polymerization of a monomer component B containing 10 to 25% by weight of a carboxyl group-containing monomer and 75 to 90% by weight of a monomer other than the carboxyl group-containing monomer.

It is preferred that the content of the carboxyl group-containing monomer is not less than 10% by weight, and the content of the monomer other than the carboxyl group-containing monomer is not more than 90% by weight in the monomer component B from the viewpoint of improvement in adhesion and prevention of wrinkle of a coated film caused by shrinkage, and that the content of the carboxyl group-containing monomer is not more than 25% by weight, and the content of the monomer other than the carboxyl group-containing monomer is not less than 75% by weight in the monomer component B from the viewpoint of improvement in water permeability resistance of a coated film and frost damage resistance.

When the emulsion polymerization of the monomer component B is carried out, it is preferred that the emulsion polymerization of the monomer component B is carried out after the rate of a polymerization reaction of the polymer (I) attains to not less than 90%, preferably not less than 95% from the viewpoint of the formation of a phase separation structure in the emulsion particle.

Incidentally, after the formation of the inner layer comprising the polymer (I) and before the formation of the outer layer comprising the polymer (II), a layer comprising the other polymer may be formed on the inner layer within a range which does not hinder an object of the present invention as occasion demands. Accordingly, in the method for producing a resin emulsion for a sealer of the present invention, a process for producing a layer comprising the other polymer may be included after the formation of the inner layer comprising the polymer (I) and before the formation of the outer layer comprising the polymer (II) within a range which does not hinder an object of the present invention as occasion demands.

A method for carrying out an emulsion polymerization of the monomer component B and its polymerization conditions can be the same as the method and its polymerization conditions which are used for the above-mentioned monomer A.

By carrying out the emulsion polymerization of the monomer component B as mentioned above, there can be obtained emulsion particles in which the polymer (II) for forming the outer surface is formed on the surface of the above-mentioned inner layer. Incidentally, a surface layer comprising the other polymer may be formed on the surface of the outer layer comprising the polymer (II) within a range which does not hinder an object of the present invention as occasion demands.

The polymer (II) may have a cross-linking structure. The weight-average molecular weight of the polymer (II) is preferably not less than 100000, more preferably not less than 300000, still more preferably not less than 550000, and particularly preferably not less than 600000 from the viewpoint of improvement in water permeability resistance of a coated film in any case of the case where the polymer (II) has a cross-linking structure and the case where the polymer (II) does not have a cross-linking structure. When the polymer (II) has a cross-linking structure, the upper limit of the weight-average molecular weight of the polymer (II) is not particularly limited since it is difficult to determine the weight-average molecular weight of the polymer (II). When the polymer (II) does not have a cross-linking structure, the upper limit of the weight-average molecular weight of the polymer (II) is preferably not more than 5000000 from the viewpoint of improvement in film-forming property.

The glass transition temperature of the polymer (II) is preferably not more than 40° C., more preferably not more than 30° C. from the viewpoint of improvement in film-forming property. In addition, the glass transition temperature of the polymer (II) is preferably not less than −20° C., more preferably not less than 0° C. from the viewpoint of improvement in blocking resistance. The glass transition temperature of the polymer (II) can be easily controlled by adjusting the composition of monomers used in the monomer component.

As to the glass transition temperature of a polymer, the glass transition temperature of styrene homopolymer is 100° C., the glass transition temperature of methyl methacrylate homopolymer is 105° C., the glass transition temperature of 2-ethylhexyl acrylate homopolymer is −70° C., the glass transition temperature of butyl acrylate homopolymer is −56° C., the glass transition temperature of acrylic acid homopolymer is 95° C., and the glass transition temperature of methacrylic acid homopolymer is 130° C.

The glass transition temperature of a polymer is determined by the above-mentioned Fox's equation. It is preferred that the found value of the glass transition temperature of a polymer is the same as the value determined by the above-mentioned Fox's equation. The found value of the glass transition temperature of a polymer can be determined by, for example, measuring its differential scanning calory. The apparatus for determining the differential scanning calory and its method for determining can be the same as described above.

It is preferred that a resin layer comprising a polymer having a glass transition temperature of 75° to 120° C. is included in any one of the plural resin layers which constitute an emulsion particle from the viewpoint of increase in hardness of a coated film and from the viewpoint of improvement in film-forming property. The glass transition temperature of this polymer is preferably not less than 75° C., more preferably not less than 80° C., still more preferably not less than 90° C., particularly preferably not less than 95° C. from the viewpoint of increase in hardness of a coated film, and the glass transition temperature of this polymer is preferably not more than 120° C., more preferably not more than 115° C. from the viewpoint of improvement in film-forming property. It is preferred that this resin layer is formed as an inner layer of an emulsion particle from the viewpoint of improvement in both film-forming property and hardness of a coated film.

The glass transition temperature of the emulsion particle itself is not less than 0° C., preferably not less than 10° C., more preferably not less than 20° C., still more preferably not less than 30° C. from the viewpoint of increase in hardness of a coated film, and the glass transition temperature of the emulsion particle is not more than 60° C., preferably not more than 55° C., more preferably not more than 50° C. from the viewpoint of improvement in film-forming property.

It is preferred that the solubility parameter (hereinafter referred to as SP value) of the polymer (II) is higher than the SP value of the polymer (I) from the viewpoint of the formation of a layer separation structure in the emulsion particle. It is preferred that the difference between the SP value of the polymer (I) and the SP value of the polymer (II) is larger from the viewpoint of the formation of a layer separation structure in the emulsion particle. It is preferred that the emulsion particle comprises the polymer (I) in which styrene having a low SP value is used in a large amount and the polymer (II) in which the carboxyl group-containing monomer having a high SP value is used in a large amount, since the emulsion particle has an ideal structure where the inner layer is clearly separated from the outer layer.

The SP value is a value as defined by the regular solution theory introduced by Hildebrand, and has also become a rule of thumb of the solubility of a solution containing 2 components. Generally, substances having a closer SP value with each other tend to be easily miscible with each other. Therefore, the SP value also becomes a rule of thumb for evaluating the miscibility of a solute with a solvent.

The weight ratio of the polymer (I) to the polymer (II) [the polymer (I)/the polymer (II)] is not less than 25/75, preferably not less than 35/65 from the viewpoint of improvement in blocking resistance and water permeability resistance of a coated film, and the weight ratio of the polymer (I) to the polymer (II) is not more than 75/25, preferably not more than 65/35 from the viewpoint of improvement in frost damage resistance.

The total content of the polymer (I) and the polymer (II) in an emulsion particle is not less than 50% by weight, preferably not less than 65% by weight from the viewpoint of improvement in blocking resistance, water permeability resistance of a coated film, frost damage resistance and adhesion. It is desired that the total content of the polymer (I) and the polymer (II) in an emulsion particle is higher, and its upper limit is 100% by weight.

In the present invention, the content of styrene in the total monomer components used as a raw material of a polymer for constituting an emulsion particle is preferably not less than 70% by weight from the viewpoint of improvement in water permeability resistance of a coated film, and the content of styrene in the total monomer components is preferably not more than 85% by weight from the viewpoint of improvement in film-forming property.

The average particle diameter of emulsion particles is preferably not less than 30 nm, more preferably not less than 50 nm, still more preferably not less than 70 nm, particularly preferably not less than 100 nm from the viewpoint of improvement in storage stability of emulsion particles, and the average particle diameter of emulsion particles is preferably not more than 400 nm, more preferably not more than 300 nm, still more preferably not more than 250 nm, particularly preferably not more than 200 nm from the viewpoint of improvement in water permeability resistance of a coated film.

The content of a nonvolatile component in the resin emulsion is preferably not less than 30% by weight, more preferably not less than 40% by weight from the viewpoint of improvement in productivity, and the content of the nonvolatile component in the resin emulsion is preferably not more than 70% by weight, more preferably not more than 60% by weight from the viewpoint of improvement in handling.

The minimum film-forming temperature of the resin emulsion for a sealer, which is used in the resin composition for a sealer of the present invention is preferably not less than $-10°$ C., more preferably not less than $5°$ C., still more preferably not less than $20°$ C. from the viewpoint of increase in hardness of a coated film, and the minimum film-forming temperature of the resin emulsion for a sealer is preferably not more than $70°$ C., more preferably not more than $65°$ C., still more preferably not more than $60°$ C. from the viewpoint of improvement in film-forming property.

The content of a nonvolatile component of the resin emulsion in the resin composition for a sealer of the present invention is preferably not less than 20% by weight from the viewpoint of improvement in film-forming property, water permeability resistance of a coated film and frost damage resistance, and the content of the nonvolatile component of the resin emulsion in the resin composition for a sealer is preferably not more than 34% by weight, more preferably not more than 28% by weight from the viewpoint of blocking resistance.

The pigments used in the resin composition for a sealer of the present invention include an organic pigment and an inorganic pigment, and these pigments may be used alone, respectively, or at least 2 kinds thereof may be used jointly.

The organic pigment includes, for example, azo pigments, azomethine pigments, methine pigments, anthraquinone pigments, phthalocyanine pigments, perinone pigment, perylene pigments, diketo-pyrrolo-pyrrole pigments, thioindigo pigments, iminoisoindoline pigments, imino-isoindolinone pigments, quinacridone pigments such as quinacridone red and quinacridone violet, flavanthrone pigments, indanthrone pigments, anthrapyrimidine pigments, carbazole pigments, monoarylide yellow, diarylide yellow, benzimidazolone yellow, tolyl orange, naphthol orange, quinophthalone pigments, and the like, and the present invention is not limited only to those exemplified ones. These organic pigments may be used alone, respectively, or at least 2 kinds thereof may be used jointly.

The inorganic pigment includes, for example, titanium dioxide, red iron oxide, black iron oxide, iron oxide, chrome oxide green, carbon black, ferric ferrocyanide (Prussian blue), ultramarine, lead chromate, and the like, and further includes, pigments having a squamous shape, such as mica, clay, aluminum powder, talc and aluminum silicate, extender pigments such as calcium carbonate, magnesium hydroxide, aluminum hydroxide, barium sulfate and magnesium carbonate, and the like, and the present invention is not limited only to those exemplified ones. These inorganic pigments may be used alone, respectively, or at least 2 kinds thereof may be used jointly.

Among the pigments, the extender pigment is preferred, and calcium carbonate is more preferred from the viewpoint of economical efficiency.

The amount of the pigment per 100 parts by weight of the nonvolatile component of the resin emulsion is not less than 190 parts by weight, preferably not less than 260 parts by weight from the viewpoint of improvement in blocking resistance and increase in economical efficiency, and the amount of the pigment per 100 parts by weight of the nonvolatile component of the resin emulsion is not more than 400 parts by weight from the viewpoint of improvement in film-forming property, water permeability resistance of a coated film and frost damage resistance.

The resin composition for a sealer of present invention can be easily prepared by mixing a resin emulsion with a pigment.

The resin composition for a sealer of the present invention obtained as above is excellent in blocking resistance and film-forming property. Therefore, the resin composition is useful in, for example, a sealer for an inorganic building material such as a ceramic building material. The inorganic building material includes those exemplified ones described in the above. Since water is generally easily permeated into the inorganic building material, the inorganic building material has a property such that the inorganic building material easily deteriorates. Therefore, an undercoat material, which is currently called as a sealer, is applied to the surface and the back surface of an inorganic building material. In order to give a desired design, a top coat is usually applied to the surface of the inorganic building material. Among them, the resin composition for a sealer of the present invention can be suitably used for an undercoat material. The inorganic building material of the present invention is one which has been coated with the above-mentioned resin composition for a sealer.

(3) Coating Composition for a Sealer

The coating composition for a sealer of the present invention, as mentioned above, comprises a resin emulsion containing emulsion particles having a glass transition temperature of $0°$ to $60°$ C., a pigment and a rheology control agent, in which the amount of the pigment is 100 to 400 parts by weight, and the amount of the rheology control agent is 0.1 to 10 parts by weight per 100 parts by weight of a nonvolatile component of the resin emulsion. The resin emulsion can be prepared by carrying out the emulsion polymerization of a monomer component.

It is preferred that the content of the aromatic monomer is not less than 70% by weight, and the content of the monomer other than the aromatic monomer is not more than 30% by weight in the total monomer components used as a raw material of a resin emulsion from the viewpoint of improvement in water permeability resistance of a coated film. It is preferred that the content of the aromatic monomer is not more than 85% by weight, and the content of the monomer other than the aromatic monomer is not less than 15% by weight in the total monomer components used as a raw material of a resin emulsion from the viewpoint of improvement in film-forming property.

The aromatic monomer includes, for example, styrene, α-methylstyrene, p-methylstyrene, tert-methylstyrene, chlorostyrene, an aralkyl (meth)acrylate, vinyl toluene and the like, and the present invention is not limited only to those exemplified ones. The aralkyl (meth)acrylate include, for example, aralkyl (meth)acrylates having an aralkyl group of 7 to 18 carbon atoms, such as benzyl (meth)acrylate, phenylethyl (meth)acrylate, methylbenzyl (meth)acrylate, naphthylmethyl (meth)acrylate, and the like, and the present invention is not limited only to those exemplified ones. These aromatic monomers may be used alone, respectively, or at least 2 kinds thereof may be used jointly. Among these aromatic monomers, styrene is preferred from the viewpoint of improvement in water permeability resistance of a coated film.

The monomer other than the aromatic monomer includes, for example, an ethylenically unsaturated monomer, and the like. The ethylenically unsaturated monomer includes, for example, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones. These monomers may be used alone, respectively, or at least 2 kinds thereof may be used jointly.

The alkyl (meth)acrylate includes, for example, alkyl (meth)acrylates having an ester group of 1 to 18 carbon atoms, such as methyl (meth)acrylate, ethyl (meth)acrylate, n-butyl (meth)acrylate, isobutyl (meth)acrylate, tert-butyl (meth)acrylate, sec-butyl (meth)acrylate, 2-ethylhexyl (meth)acrylate, tridecyl (meth)acrylate, cyclohexyl (meth)acrylate, n-octyl (meth)acrylate, n-lauryl (meth)acrylate and 2-(acetoacetoxy)ethyl (meth)acrylate, and the like, and the present invention is not limited only to those exemplified ones. These monomers may be used alone, respectively, or at least 2 kinds thereof may be used jointly.

The hydroxyl group-containing (meth)acrylate includes, for example, hydroxyl group-containing (meth)acrylates having an ester group of 1 to 18 carbon atoms, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, and the like, and the present invention is not limited only to those exemplified ones. These monomers may be used alone, respectively, or at least 2 kinds thereof may be used jointly.

The carboxyl group-containing monomer includes, for example, aliphatic monomers containing a carboxyl group, such as (meth)acrylic acid, maleic acid, fumaric acid, crotonic acid, itaconic acid and maleic anhydride, and the like, and the present invention is not limited only to those exemplified ones. These monomers may be used alone, respectively, or at least 2 kinds thereof may be used jointly. Among these carboxyl group-containing monomers, acrylic acid, methacrylic acid and itaconic acid are preferred, and acrylic acid and methacrylic acid are more preferred from the viewpoint of improvement in dispersion stability of emulsion particles.

The oxo group-containing monomer includes, for example, (di)ethylene glycol (methoxy) (meth)acrylates such as ethylene glycol (meth)acrylate, ethylene glycol methoxy (meth)acrylate, diethylene glycol (meth)acrylate and diethylene glycol methoxy (meth)acrylate, and the like, and the present invention is not limited only to those exemplified ones. These monomers may be used alone, respectively, or at least 2 kinds thereof may be used jointly.

The fluorine atom-containing monomer, includes, for example, fluorine atom-containing alkyl (meth)acrylates having an ester group of 2 to 6 carbon atoms, such as trifluoroethyl (meth)acrylate, tetrafluoropropyl (meth)acrylate and octafluoropentyl (meth)acrylate, and the like, and the present invention is not limited only to those exemplified ones. These monomers may be used alone, respectively, or at least 2 kinds thereof may be used jointly.

The nitrogen atom-containing monomer includes, for example, acrylamide compounds such as (meth)acrylamide, N,N-dimethylaminopropyl acrylamide and diacetone acrylamide, nitrogen atom-containing (meth)acrylate compounds such as dimethylaminoethyl (meth)acrylate and diethylaminoethyl (meth)acrylate, N-vinylpyrrolidone, and the like, and the present invention is not limited only to those exemplified ones. These monomers may be used alone, respectively, or at least 2 kinds thereof may be used jointly.

The epoxy group-containing monomer includes, for example, epoxy group-containing (meth)acrylates such as glycidyl (meth)acrylate, and the like, and the present invention is not limited only to those exemplified ones. These monomers may be used alone, respectively, or at least 2 kinds thereof may be used jointly.

Among the ethylenically unsaturated monomers, from the viewpoint of improvement in water permeability resistance of a coated film, the (meth)acrylic monomer is preferred, and tert-butyl (meth)acrylate, 2-ethylhexyl (meth)acrylate, cyclohexyl (meth)acrylate, benzyl (meth)acrylate and glycidyl (meth)acrylate are more preferred.

The emulsion particle contained in the resin emulsion may be composed of only one kind of a resin when the resin is prepared by a one-step emulsion polymerization. However, it is preferred that the emulsion particle has plural resin layers prepared by multistep emulsion polymerization of a monomer component, from the viewpoint of satisfying both of hardness of a coated film and film-forming property, which are contradictory properties to each other. When the emulsion particle has plural resin layers, the number of the resin layers is not particularly limited and is preferably 2 to 5, more preferably 2 to 4, and still more preferably 2 or 3.

When the emulsion particle has plural resin layers, it is desired that a resin layer obtained by emulsion polymerization of a monomer component containing 80 to 100% by weight, preferably 85 to 100% by weight, more preferably 90 to 100% by weight of an aromatic monomer and 0 to 20% by weight, preferably 0 to 15% by weight, more preferably 0 to 10% by weight of a monomer other than the aromatic monomer is included in any one of the plural resin layers from the viewpoint of improvement in water permeability resistance of a coated film. This resin layer may be included in any one of the plural resin layers, and it is preferred that this resin layer exists as an inner layer of the emulsion particle from the viewpoint of improvement in film-forming property. The monomer other than the aromatic monomer includes, for example, the above-mentioned ethylenically unsaturated monomer, and the like. The above-mentioned ethylenically unsaturated monomer can be suitably used in the present invention. Concrete examples of the monomer other than the aromatic monomer include an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones. These monomers may be used alone, respectively, or at least 2 kinds thereof may be used jointly.

It is preferred that a resin layer obtained by emulsion polymerization of a monomer component containing 10 to 25% by weight of a carboxyl group-containing monomer and 75 to 90% by weight of a monomer other than the carboxyl group-containing monomer is contained in any one of the plural resin layers which constitute the emulsion particle from the viewpoint of improvement in film-forming property and water permeability resistance of a coated film. In this case, it is preferred that the content of the carboxyl group-containing monomer is not less than 10% by weight and the content of the monomer other than the carboxyl group-containing monomer is not more than 90% by weight in this monomer component from the viewpoint of improvement in film-forming property. Also, it is desired that the content of the carboxyl group-containing monomer is not more than 25% by weight, preferably not more than 20% by weight, more preferably not more than 15% by weight and the content of the monomer other than the carboxyl group-containing monomer is not less than 75% by weight, preferably not less than 80% by weight, more preferably not less than 85% by weight in this monomer component from the viewpoint of improvement in water permeability resistance of a coated film. This resin layer may be included in any one of the above-mentioned plural resin layers, and it is preferred that this resin layer exists as an outer layer of the emulsion particle from the viewpoint of improvement in film-forming property.

As the carboxyl group-containing monomer, there can be cited the carboxyl group-containing monomer which is exemplified in the above-mentioned ethylenically unsaturated monomer. Also, as the monomer other than the carboxyl group-containing monomer, there can be cited for example, the above-mentioned aromatic monomer, the above-mentioned ethylenically unsaturated monomer other than the carboxyl group-containing monomer, and the like, and the present invention is not limited only to those exemplified ones. Concrete examples of the monomer other than the carboxyl group-containing monomer include an aromatic monomer, an alkyl (meth)acrylate, a hydroxyl group-containing (meth)acrylate, an oxo group-containing monomer, a fluorine atom-containing monomer, a nitrogen atom-containing monomer, an epoxy group-containing monomer, and the like, and the present invention is not limited only to those exemplified ones. These monomers may be used alone, respectively, or at least 2 kinds thereof may be used jointly.

As a preferred resin emulsion, there can be cited a resin emulsion containing emulsion particles having an inner layer comprising a polymer (I) obtained by emulsion polymerization of a monomer component A containing 80 to 100% by weight of an aromatic monomer and 0 to 20% by weight of a monomer other than the aromatic monomer, and an outer layer comprising a polymer (II) obtained by emulsion polymerization of a monomer component B containing 10 to 25% by weight of a carboxyl group-containing monomer and 75 to 90% by weight of a monomer other than the carboxyl group-containing monomer.

Incidentally, in the present invention, a layer other than the above-mentioned inner layer and the above-mentioned outer layer may be formed in the emulsion particle within a range which does not hinder an object of the present invention.

The polymer (I) which forms the above-mentioned inner layer is obtained by, for example, emulsion polymerization of a monomer component A containing 80 to 100% by weight of an aromatic monomer and 0 to 20% by weight of a monomer other than the aromatic monomer.

The content of the aromatic monomer in the monomer component A is preferably 80 to 100% by weight, more preferably 85 to 100% by weight from the viewpoint of improvement in blocking resistance and water permeability resistance of a coated film. Therefore, the component A may be composed only of the aromatic monomer. Among the aromatic monomers, styrene is preferred from the viewpoint of improvement in water permeability resistance of a coated film, as mentioned above. In addition, the monomer component A may contain a monomer other than the aromatic monomer in a content of preferably 0 to 20% by weight, more preferably 0 to 15% by weight. As the monomer other than the aromatic monomer, those exemplified in the above can be cited.

A method for carrying out the emulsion polymerization of the monomer component A includes, for example, a method comprising dissolving an emulsifier in a medium such as an aqueous medium containing water and a water-soluble organic solvent such as a lower alcohol represented by methanol, or water, and adding dropwise thereto a monomer component A and a polymerization initiator with stirring, a method comprising previously emulsifying a monomer component with an emulsifier and water, and adding the emulsified monomer component dropwise to water or an aqueous medium, and the like, and the present invention is not limited only to these methods. Incidentally, the amount of the medium can be controlled in consideration of the amount of a nonvolatile component contained in the resulting resin emulsion.

The kind and amount of the emulsifier, the kind, amount and adding method of the polymerization initiator, addition of a decomposition agent of a polymerization initiator, the kind and amount of the additive, and the like can be the same as mentioned above.

The atmosphere at the time of carrying out the emulsion polymerization of the monomer component A is not particularly limited, but the atmosphere is preferably an inert gas such as nitrogen gas from the viewpoint of increase in efficiency of a polymerization initiator. The polymerization temperature at the time of carrying out the emulsion polymerization of the monomer component A is not particularly limited, but the polymerization temperature is usually preferably 50° to 100° C., more preferably 60° to 95° C. The polymerization temperature may be constant or changed in the course of the polymerization reaction. The polymerization time for carrying out the emulsion polymerization of the monomer component A is not particularly limited, and can be appropriately controlled in accordance with the progressing state of a polymerization reaction. The polymerization temperature is usually about 2 to about 9 hours.

A polymer (I) for forming an inner layer is obtained in the form of an emulsion particle by carrying out the emulsion polymerization of the monomer component A as mentioned above.

The polymer (I) may have a cross-linking structure. The weight-average molecular weight of the polymer (I) is preferably not less than 100000, more preferably not less than 300000, still more preferably not less than 550000, and particularly preferably not less than 600000 from the viewpoint of improvement in water permeability resistance of a coated film in any case of the case where the polymer (I) has a cross-linking structure and the case where the polymer (I) does not have a cross-linking structure. When the polymer (I) has a cross-linking structure, the upper limit of the weight-average molecular weight of the polymer (I) is not particularly limited since it is difficult to determine the weight-average molecular weight of the polymer (I). When the polymer (I) does not have a cross-linking structure, the upper limit of the weight-average molecular weight of the polymer (I) is preferably not more than 5000000 from the viewpoint of improvement in film-forming property.

Next, after an inner layer comprising the polymer (I) is formed, an outer layer comprising a polymer (II) is formed thereon by carrying out the emulsion polymerization of a monomer component B containing 10 to 25% by weight of a carboxyl group-containing monomer and 75 to 90% by weight of a monomer other than the carboxyl group-containing monomer.

It is preferred that the content of the carboxyl group-containing monomer is not less than 10% by weight, and the content of the monomer other than the carboxyl group-containing monomer is not more than 90% by weight in the monomer component B from the viewpoint of improvement in adhesion and prevention of wrinkle of a coated film caused by shrinkage, and that the content of the carboxyl group-containing monomer is not more than 25% by weight, and the content of the monomer other than the carboxyl group-containing monomer is not less than 75% by weight in the monomer component B from the viewpoint of improvement in water permeability resistance of a coated film and frost damage resistance.

The monomer other than the carboxyl group-containing monomer includes, for example, the above-mentioned alkyl (meth)acrylate, the above-mentioned hydroxyl group-containing (meth)acrylate, the above-mentioned oxo group-containing monomer, the above-mentioned fluorine atom-containing monomer, the above-mentioned nitrogen atom-containing monomer, the above-mentioned epoxy group-containing monomer and the like, and the present invention is not limited only to those exemplified ones. These monomers other than the carboxyl group-containing monomer may be used alone, respectively, or at least 2 kinds thereof may be used jointly.

When the emulsion polymerization of the monomer component B is carried out, it is preferred that the emulsion polymerization of the monomer component B is carried out after the rate of a polymerization reaction of the polymer (I) attains to not less than 90%, preferably not less than 95% from the viewpoint of the formation of a phase separation structure in the emulsion particle.

Incidentally, after the formation of the inner layer comprising the polymer (I) and before the formation of the outer layer comprising the polymer (II), a layer comprising the other polymer may be formed on the inner layer within a range which does not hinder an object of the present invention as occasion demands. Accordingly, in the method for producing a coating composition for a sealer of the present invention, a process for producing a layer comprising the other polymer may be included after the formation of the inner layer comprising the polymer (I) and before the formation of the outer layer comprising the polymer (II) within a range which does not hinder an object of the present invention as occasion demands.

A method for carrying out an emulsion polymerization of the monomer component B and its polymerization conditions can be the same as the method and its polymerization conditions which are used for the above-mentioned monomer A.

By carrying out the emulsion polymerization of the monomer component B as mentioned above, there can be obtained emulsion particles in which the polymer (II) for forming the outer surface is formed on the surface of the above-mentioned inner layer. Incidentally, a surface layer comprising the other polymer may be formed on the surface of the outer layer comprising the polymer (II) within a range which does not hinder an object of the present invention as occasion demands.

The polymer (II) may have a cross-linking structure. The weight-average molecular weight of the polymer (II) is preferably not less than 100000, more preferably not less than 300000, still more preferably not less than 550000, and particularly preferably not less than 600000 from the viewpoint of improvement in water permeability resistance of a coated film in any case of the case where the polymer (II) has a cross-linking structure and the case where the polymer (II) does not have a cross-linking structure. When the polymer (II) has a cross-linking structure, the upper limit of the weight-average molecular weight of the polymer (II) is not particularly limited since it is difficult to determine the weight-average molecular weight of the polymer. When the polymer (II) does not have a cross-linking structure, the upper limit of the weight-average molecular weight of the polymer (II) is preferably not more than 5000000 from the viewpoint of improvement in film-forming property.

The glass transition temperature of the polymer (II) is preferably not more than 40° C., more preferably not more than 30° C. from the viewpoint of improvement in film-forming property. In addition, the glass transition temperature of the polymer (II) is preferably not less than –20° C., more preferably not less than 0° C. from the viewpoint of improvement in blocking resistance. The glass transition temperature of the polymer (II) can be easily controlled by adjusting the composition of monomers used in the monomer component.

As to the glass transition temperature of a polymer, the glass transition temperature of styrene homopolymer is 100° C., the glass transition temperature of methyl methacrylate homopolymer is 105° C., the glass transition temperature of 2-ethylhexyl acrylate homopolymer is –70° C., the glass transition temperature of butyl acrylate homopolymer is –56° C., the glass transition temperature of acrylic acid homopolymer is 95° C., and the glass transition temperature of methacrylic acid homopolymer is 130° C.

The glass transition temperature of a polymer is determined by the above-mentioned Fox's equation. It is preferred that the found value of the glass transition temperature of a polymer is the same as the value determined by the above-mentioned Fox's equation. The found value of the glass transition temperature of a polymer can be determined by, for example, measuring its differential scanning calory. The apparatus for determining the differential scanning calory and its method for determining can be the same as described above.

It is preferred that a resin layer comprising a polymer having a glass transition temperature of 75° to 120° C. is included in any one of the plural resin layers which constitute an emulsion particle from the viewpoint of increase in hardness of a coated film and from the viewpoint of improvement in film-forming property. The glass transition temperature of this polymer is preferably not less than 75° C., more preferably not less than 80° C., still more preferably not less than 90° C., particularly preferably not less than 95° C. from the viewpoint of increase in hardness of a coated film, and the glass transition temperature of this polymer is preferably not more than 120° C., more preferably not more than 115° C., still more preferably not more than 110° C. from the viewpoint of improvement in film-forming property. It is preferred that this resin layer is formed as an inner layer of an emulsion particle from the viewpoint of improvement in both film-forming property and hardness of a coated film.

The glass transition temperature of the emulsion particle itself is not less than 0° C., preferably not less than 10° C., more preferably not less than 20° C., still more preferably not less than 30° C. from the viewpoint of increase in hardness of a coated film, and the glass transition temperature of the emulsion particle is not more than 60° C., preferably not more than 55° C., more preferably not more than 50° C. from the viewpoint of improvement in film-forming property.

It is preferred that the solubility parameter (hereinafter referred to as SP value) of the polymer (II) is higher than the SP value of the polymer (I) from the viewpoint of the formation of a layer separation structure in the emulsion particle. It is preferred that the difference between the SP value of the polymer (I) and the SP value of the polymer (II) is larger from the viewpoint of the formation of a layer separation structure in the emulsion particle. It is preferred that the emulsion particle comprises the polymer (I) in which styrene having a low SP value is used in a large amount and the polymer (II) in which the carboxyl group-containing monomer having a high SP value is used in a large amount, since the emulsion particle has an ideal structure where the inner layer is clearly separated from the outer layer.

The SP value is a value as defined by the regular solution theory introduced by Hildebrand, and has also become a rule of thumb of the solubility of a solution containing 2 components. Generally, substances having a closer SP value with each other tend to be easily miscible with each other. Therefore, the SP value also becomes a rule of thumb for evaluating the miscibility of a solute with a solvent.

The weight ratio of the polymer (I) to the polymer (II) [the polymer (I)/the polymer (II)] is not less than 25/75, preferably not less than 35/65 from the viewpoint of improvement in blocking resistance and water permeability resistance of a coated film, and the weight ratio of the polymer (I) to the polymer (II) is not more than 75/25, preferably not more than 65/35 from the viewpoint of improvement in frost damage resistance.

The total content of the polymer (I) and the polymer (II) in an emulsion particle is not less than 50% by weight, preferably not less than 65% by weight from the viewpoint of improvement in blocking resistance, water permeability resistance of a coated film, frost damage resistance and adhesion. It is desired that the total content of the polymer (I) and the polymer (II) in an emulsion particle is higher, and its upper limit is 100% by weight.

In the present invention, the content of styrene in the total monomer components used as a raw material of a polymer for constituting an emulsion particle is preferably not less than 70% by weight from the viewpoint of improvement in water permeability resistance of a coated film, and the content of styrene in the total monomer components is preferably not more than 85% by weight from the viewpoint of improvement in film-forming property.

The average particle diameter of emulsion particles is preferably not less than 30 nm, more preferably not less than 50 nm, still more preferably not less than 70 nm, particularly preferably not less than 100 nm from the viewpoint of improvement in storage stability of emulsion particles, and the average particle diameter of emulsion particles is preferably not more than 400 nm, more preferably not more than 300 nm, still more preferably not more than 250 nm, particularly preferably not more than 200 nm from the viewpoint of improvement in water permeability resistance of a coated film.

The content of a nonvolatile component in the resin emulsion is preferably not less than 30% by weight, more preferably not less than 40% by weight from the viewpoint of improvement in productivity, and the content of the nonvolatile component in the resin emulsion is preferably not more than 70% by weight, more preferably not more than 60% by weight from the viewpoint of improvement in handling.

The minimum film-forming temperature of the resin emulsion for a sealer, which is used in a coating composition for a sealer of the present invention is preferably not less than −10° C., more preferably not less than 5° C., still more preferably not less than 20° C. from the viewpoint of increase in hardness of a coated film, and the minimum film-forming temperature of the resin emulsion for a sealer is preferably not more than 90° C., more preferably not more than 75° C., still more preferably not more than 60° C. from the viewpoint of improvement in film-forming property.

The content of a nonvolatile component of the resin emulsion in the coating composition for a sealer of the present invention is preferably not less than 20% by weight from the viewpoint of improvement in film-forming property, water permeability resistance of a coated film and frost damage resistance, and the content of a nonvolatile component of the resin emulsion in the coating composition for a sealer is preferably not more than 50% by weight, more preferably not more than 50% by weight, still more preferably not more than 34% by weight, particularly preferably not more than 28% by weight from the viewpoint of blocking resistance.

The pigments used in the coating composition for a sealer of the present invention include an organic pigment and an inorganic pigment, and these pigments may be used alone, respectively, or at least 2 kinds thereof may be used jointly.

The organic pigment includes, for example, azo pigments, azomethine pigments, methine pigments, anthraquinone pigments, phthalocyanine pigments, perinone pigments, perylene pigments, diketo-pyrrolo-pyrrole pigments, thioindigo pigments, iminoisoindoline pigments, imino-isoindolinone pigments, quinacridone pigments such as quinacridone red and quinacridone violet, flavanthrone pigments, indanthrone pigments, anthrapyrimidine pigments, carbazole pigments, monoarylide yellow, diarylide yellow, benzimidazolone yellow, tolyl orange, naphthol orange, quinophthalone pigments and the like, and the present invention is not limited only to those exemplified ones. These organic pigments may be used alone, respectively, or at least 2 kinds thereof may be used jointly.

The inorganic pigment includes, for example, titanium dioxide, red iron oxide, black iron oxide, iron oxide, chrome oxide green, carbon black, ferric ferrocyanide (Prussian blue), ultramarine, lead chromate and the like, and further includes, pigments having a squamous shape such as mica, clay, aluminum powder, talc and aluminum silicate, extender pigments such as calcium carbonate, magnesium hydroxide, aluminum hydroxide, barium sulfate and magnesium carbonate, and the like, and the present invention is not limited only to those exemplified ones. These inorganic pigments may be used alone, respectively, or at least 2 kinds thereof may be used jointly.

Among the pigments, the extender pigment is preferred, and calcium carbonate is more preferred from the viewpoint of economical efficiency.

The amount of the pigment per 100 parts by weight of the nonvolatile component of the resin emulsion is not less than 100 parts by weight, preferably not less than 140 parts by weight, more preferably not less than 190 parts by weight, still more preferably not less than 260 parts by weight from the viewpoint of increase in hardness of a coated film, and the amount of the pigment per 100 parts by weight of the nonvolatile component of the resin emulsion is not more than 400 parts by weight from the viewpoint of improvement in film-forming property.

One of the great features of the coating composition for a sealer of the present invention resides in that the coating composition contains a rheology control agent. In the coating composition for a sealer of the present invention, the rheology control agent is used together with a resin emulsion and a high-content pigment, and the interaction between these components is increased. Therefore, a coating composition for a sealer having stable thixotropic viscosity and Newtonian viscosity is obtained.

Accordingly, since the viscosity of this coating composition for a sealer is lowered by a high shearing force when the coating composition is spray-coated to a substrate having a rugged surface, the atomization of the coating composition is accelerated, and the viscosity of the coating composition is recovered after the coating composition is applied to a substrate, so that this coating composition for a sealer is less likely to remain in the recess portion, whereby a coated film having no spots is formed.

In addition, since the rheology control agent imparts Newtonian viscosity to the coating composition for a sealer, when this coating composition is applied to a substrate by roller coating, its coated amount can be secured, and a coated film having a uniform film thickness and being spotless can be formed due to a high leveling property of the coating composition.

Incidentally, the thixotropic viscosity and Newtonian viscosity can be expressed by a ratio of a viscosity at a high shearing force to a viscosity at a low shearing force. The thixotropic viscosity and Newtonian viscosity can be determined by measuring the viscosity of a coating composition for a sealer at 25° C. with a B-type viscometer commercially available from, for example, Tokyo Keiki Inc. When the ratio of a viscosity at a rotational speed of 6 $\min^{-1}$ to a viscosity at a rotational speed of 60 $\min^{-1}$ (a viscosity at a rotational speed of 6 $\min^{-1}$/a viscosity at a rotational speed of 60 $\min^{-1}$) is from 3.5 to 7, the coating composition is said to have a thixotropic viscosity, and when the ratio is from 1 to 2.5, the coating composition is said to have a Newtonian viscosity.

As a rheology control agent, there is used an agent which increases or decreases a viscosity of a system in which the rheology control agent is used. The rheology control agent includes, for example, inorganic rheology control agents such as silicates such as water-soluble aluminum silicate, montmorillonite, an organic montmorillonite and colloidal alumina; cellulose rheology control agents such as carboxylmethyl cellulose, methyl cellulose and hydroxyethyl cellulose; protein rheology control agents such as casein, sodium caseinate and ammonium caseinate; alginic acid rheology control agents such as sodium alginate; polyvinyl rheology control agents such as polyvinyl alcohol, a polyvinylpyrrolidone and a polyvinyl-benzyl ether copolymer; polyacrylic acid rheology control agents, such as sodium polyacrylate and alkali-soluble poly(meth) acrylic acid-(meth)acrylate copolymer; polyether rheology control agents such as pluronic polyether, a polyether dialkyl ester, a polyether dialkyl ether, a polyether-urethane-associated modified product and a polyether-epoxy modified product; maleic anhydride copolymer rheology control agents such as a partial ester of vinyl methyl ether-maleic anhydride copolymer, a half ester of a reaction product of a drying oil fatty acid allyl alcohol ester and maleic anhydride; acetylene glycol, xanthan gum, zantan gum, starch, and the like, and the present invention is not limited only to those exemplified ones. These rheology control agents may be used alone, respectively, or at least 2 kinds thereof may be used jointly.

Among the rheology control agents, the polyacrylic acid rheology control agent is preferred from the viewpoint of imparting thixotropic viscosity to the coating composition for a sealer, and in particular, the alkali-soluble rheology control agent is more preferred from the viewpoint of imparting viscosity to the coating composition for a sealer at the time of spray coating. The alkali-soluble rheology control agent is readily commercially available, and includes, for example, ACRYSET WR-507 and ACRYSET WR-650 which are trade names readily commercially available from NIPPON SHOKUBAI Co., Ltd., and the like, and the present invention is not limited only to those exemplified ones. These rheology control agents may be used alone, respectively, or at least 2 kinds thereof may be used jointly.

Also, among the above-mentioned rheology control agents, the polyether rheology control agent is preferred from the viewpoint of imparting Newtonian viscosity to the coating composition for a sealer, and in particular, the urethane-associated rheology control agent is more preferred from the viewpoint of imparting viscosity to the coating composition for a sealer at the time of coating with a roll coater. The urethane-associated rheology control agent is readily commercially available. The urethane-associated rheology control agent includes, for example, ADEKANOL UH-420, ADEKANOL UH-438 and ADEKANOL UH-450VF, which are trade names commercially available from ADEKA CORPORATION, and the like, and the present invention is not limited only to those exemplified ones. These rheology control agents may be used alone, respectively, or at least 2 kinds thereof may be used jointly.

From the viewpoint as mentioned above, the rheology control agent preferred in the present invention includes the alkali-soluble rheology control agent and the urethane-associated rheology control agent, and these rheology control agents may be used alone, respectively, or at least 2 kinds thereof may be used jointly.

The effective dose of the rheology control agent per 100 parts by weight of the nonvolatile component of the resin emulsion is not less than 0.1 parts by weight, preferably not less than 0.5 parts by weight from the viewpoint of imparting stable thixotropic viscosity and Newtonian viscosity to the coating composition for a sealer, and the effective dose of the rheology control agent per 100 parts by weight of the nonvolatile component of the resin emulsion is not more than 10 parts by weight from the viewpoint of improvement in water permeability resistance of a coated film.

The coating composition for a sealer of the present invention can be easily prepared by mixing the resin emulsion, the pigment and the rheology control agent.

The coating composition for a sealer of the present invention obtained in the above is excellent in blocking resistance and film-forming property. Therefore, the coating composition is useful in, for example, a sealer for an inorganic building material such as a ceramic building material. The inorganic building material includes those exemplified ones described above. Since water is generally easily permeated into the inorganic building material, the inorganic building material has a property such that the inorganic building material easily deteriorates. Therefore, an undercoat material, which is generally called as a sealer, is applied to the surface and the back surface of an inorganic building material. In order to give a desired design, a top coat is usually applied to the surface of the inorganic building material. Among them, the coating composition for a sealer of the present invention can be suitably used for an undercoat material. The inorganic building material of the present invention is one which has been coated with the above-mentioned coating composition for a sealer.

[Second Aspect of the Invention]

The second aspect of the present invention is explained below. The second aspect of the present invention includes a resin emulsion for a sealer, which is useful, for example, for a sealer which is used on the exterior of a building and a filler having a microelasticity, a resin composition for a sealer which contains the resin emulsion for a sealer, and a coating composition for a sealer which contains the resin emulsion for a sealer, as described above.

(1) Resin Emulsion for a Sealer

In the second aspect of the present invention, the resin emulsion for a sealer is a resin emulsion which contains emulsion particles having an inner layer and an outer layer, in which the above-mentioned inner layer is formed from a polymer which is prepared by emulsion polymerization of a monomer component containing 85 to 100% by weight of an aromatic monomer and 0 to 15% by weight of an ethylenically unsaturated monomer; the weight ratio of the polymer which constitutes the inner layer to the polymer which constitutes the outer layer [the polymer which constitutes the inner layer/the polymer which constitutes the outer layer] is 10/90 to 60/40; the total content of the polymer which constitutes the inner layer and the polymer which constitutes the outer layer in the emulsion particle is 40 to 100% by weight; the content of styrene is 5 to 40% by weight and the content of a monomer other than styrene is 60 to 95% by weight in the total monomers used as a raw material of the emulsion particles; the content of the carboxyl group-containing monomer is 1 to 10% by weight, and the content of a monomer other than the carboxyl group-containing monomer is 90 to 99% by weight in the total monomer components used as a raw material of the outer layer; and the glass transition temperature of the emulsion particle is $-70°$ to $10°$ C., as described above. Since the resin emulsion for a sealer of the present invention has the above-mentioned constituents, the resin emulsion for a sealer is excellent in frost damage resistance, water permeability resistance of a coated film and coated film strength.

Incidentally, in the second aspect of the present invention, the frost damage resistance means a durability of a coated film when a test of warming and cooling, which is defined by JIS (Japanese Industrial Standards) A 6909, is carried out repeatedly.

A layer other than the inner layer and the outer layer may be formed in the emulsion particle within a range which does not hinder an object of the present invention.

The resin emulsion for a sealer of the present invention can be produced by carrying out an emulsion polymerization of a monomer component which forms an inner layer, to form an inner layer and thereafter, carrying out an emulsion polymerization of a monomer component which forms an outer layer, to form an outer layer.

The monomer component which forms an inner layer (hereinafter referred to as monomer component A) and the monomer component which forms an outer layer (hereinafter referred to as monomer component B) includes, for example, an aromatic monomer, an ethylenically unsaturated monomer, and the like. Incidentally, the ethylenically unsaturated monomer means an ethylenically unsaturated monomer other than the aromatic monomer.

The aromatic monomer includes, for example, styrene, α-methylstyrene, p-methylstyrene, tert-methylstyrene, chlorostyrene, vinyl toluene, an aralkyl (meth)acrylate and the like, and the present invention is not limited only to those exemplified ones. These aromatic monomers may be used alone, respectively, or at least 2 kinds thereof may be used jointly. The aralkyl (meth)acrylate includes, for example, aralkyl (meth)acrylates having an aralkyl group of 7 to 18 carbon atoms, such as benzyl (meth)acrylate, phenylethyl (meth)acrylate, methylbenzyl (meth)acrylate and naphthylmethyl (meth)acrylate, and the like, and the present invention is not limited only to those exemplified ones. Among these aromatic monomers, styrene is preferred from the viewpoint of improvement in water permeability resistance of a coated film.

The ethylenically unsaturated monomer includes, for example, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones. These ethylenically unsaturated monomers may be used alone, respectively, or at least 2 kinds thereof may be used jointly.

The alkyl (meth)acrylate includes, for example, alkyl meth)acrylates having an ester group of 1 to 18 carbon atoms, such as methyl (meth)acrylate, ethyl (meth)acrylate, n-butyl (meth)acrylate, isobutyl (meth)acrylate, tert-butyl (meth)acrylate, sec-butyl (meth)acrylate, 2-ethylhexyl (meth)acrylate, tridecyl (meth)acrylate, cyclohexyl (meth)acrylate, n-octyl (meth)acrylate, n-lauryl (meth)acrylate and 2-(acetoacetoxy)ethyl (meth)acrylate, and the like, and the present invention is not limited only to those exemplified ones. These monomers may be used alone, respectively, or at least 2 kinds thereof may be used jointly.

The hydroxyl group-containing (meth)acrylate includes, for example, hydroxyl group-containing (meth)acrylates having an ester group of 1 to 18 carbon atoms, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, and the like, and the present invention is not limited only to those exemplified ones. These monomers may be used alone, respectively, or at least 2 kinds thereof may be used jointly.

The carboxyl group-containing monomer includes, for example, aliphatic monomers containing a carboxyl group, such as (meth)acrylic acid, maleic acid, fumaric acid, crotonic acid, itaconic acid and maleic anhydride, and the like, and the present invention is not limited only to those exemplified ones. These monomers may be used alone, respectively, or at least 2 kinds thereof may be used jointly. Among these carboxyl group-containing monomers, acrylic acid, methacrylic acid and itaconic acid are preferred, and acrylic acid and methacrylic acid are more preferred from the viewpoint of improvement in dispersion stability of emulsion particles.

The oxo group-containing monomer includes, for example, (di)ethylene glycol (methoxy) (meth)acrylates such as ethylene glycol (meth)acrylate, ethylene glycol methoxy (meth)acrylate, diethylene glycol (meth)acrylate and diethylene glycol methoxy (meth)acrylate, and the like, and the present invention is not limited only to those exemplified ones. These monomers may be used alone, respectively, or at least 2 kinds thereof may be used jointly.

The fluorine atom-containing monomer, includes, for example, fluorine atom-containing alkyl (meth)acrylates having an ester group of 2 to 6 carbon atoms, such as trifluoroethyl (meth)acrylate, tetrafluoropropyl (meth)acrylate and octafluoropentyl (meth)acrylate, and the like, and the present invention is not limited only to those exemplified ones. These monomers may be used alone, respectively, or at least 2 kinds thereof may be used jointly.

The nitrogen atom-containing monomer includes, for example, acrylamide compounds such as (meth)acrylamide, N,N-dimethylaminopropyl acrylamide and diacetone acrylamide, nitrogen atom-containing (meth)acrylate compounds such as dimethylaminoethyl (meth)acrylate and diethylaminoethyl (meth)acrylate, N-vinylpyrrolidone, and the like, and the present invention is not limited only to those exemplified ones. These monomers may be used alone, respectively, or at least 2 kinds thereof may be used jointly.

The epoxy group-containing monomer includes, for example, epoxy group-containing (meth)acrylates such as glycidyl (meth)acrylate, and the like, and the present invention is not limited only to those exemplified ones. These monomers may be used alone, respectively, or at least 2 kinds thereof may be used jointly.

Among the ethylenically unsaturated monomers, from the viewpoint of improvement in water permeability resistance of a coated film, the (meth)acrylic monomer is preferred, and tert-butyl (meth)acrylate, 2-ethylhexyl (meth)acrylate, cyclohexyl (meth)acrylate and glycidyl (meth)acrylate are more preferred.

The above-mentioned inner layer comprises a polymer obtained by carrying out an emulsion polymerization of a monomer component containing 85 to 100% by weight of the aromatic monomer and 0 to 15% by weight of the ethylenically unsaturated monomer.

The content of the aromatic monomer in the monomer component A is not less than 85% by weight, preferably not less than 90% by weight from the viewpoint of improvement in strength of a coated film and water permeability resistance of a coated film. Among the aromatic monomers, styrene is preferred from the viewpoint of improvement in water permeability resistance of a coated film. As the monomer other than the aromatic monomer in the monomer component A, an ethylenically unsaturated monomer is used. The content of the ethylenically unsaturated monomer in the monomer component A is not more than 15% by weight, preferably not more than 10% by weight from the viewpoint of improvement in strength of a coated film and water permeability resistance of a coated film.

The content of the carboxyl group-containing monomer in the monomer component B is not less than 1% by weight from the viewpoint of improvement in adhesion and film-forming property, and the content of the carboxyl group-containing monomer in the monomer component B is not more than 10% by weight, preferably not more than 5% by weight from the viewpoint of improvement in water permeability resistance of a coated film and frost damage resistance. Therefore, the content of the monomer other than the carboxyl group-containing monomer in the monomer component B is not more than 99% by weight from the viewpoint of improvement in adhesion and film-forming property, and the content of the monomer other than the carboxyl group-containing monomer in the monomer component B is not less than 90% by weight, preferably not more than 95% by weight from the viewpoint of improvement in water permeability resistance of a coated film and frost damage resistance.

The monomer other than the carboxyl group-containing monomer includes, for example, an aromatic monomer, an ethylenically unsaturated monomer other than the carboxyl group-containing monomer, and the like, and the present invention is not limited only to those exemplified ones. These monomers may be used alone, respectively, or at least 2 kinds thereof may be used jointly.

The ethylenically unsaturated monomer other than the carboxyl group-containing monomer includes, an alkyl (meth)acylate, a hydroxyl group-containing (meth)acrylate, an oxo group-containing monomer, a fluorine atom-containing monomer, a nitrogen atom-containing monomer, an epoxy group-containing monomer, and the like, and the present invention is not limited only to those exemplified ones. These monomers may be used alone, respectively, or at least 2 kinds thereof may be used jointly.

The content of styrene in the total monomer components used as a raw material for an emulsion particle is not less than 5% by weight from the viewpoint of improvement in water permeability resistance of a coated film, and the content of styrene in the total monomer components is not more than 40% by weight, preferably not more than 30% by weight, more preferably not more than 25% by weight from the viewpoint of improvement in flexibility of a coated film. Therefore, the content of the monomer other than styrene in the total monomer components used as a raw material for an emulsion particle is not more than 95% by weight from the viewpoint of improvement in water permeability resistance of a coated film, and the content of the monomer other than styrene in the total monomer components is not less than 60% by weight, preferably not less than 70% by weight, more preferably not less than 75% by weight from the viewpoint of improvement in water permeability resistance of a coated film.

The monomer other than styrene includes, for example, an aromatic monomer other than styrene, an ethylenically unsaturated monomer and the like, and the present invention is not limited only to those exemplified ones. These monomers may be used alone, respectively, or at least 2 kinds thereof may be used jointly.

The aromatic monomer other than styrene includes, for example, α-methylstyrene, p-methylstyrene, tert-methylstyrene, chlorostyrene, vinyl toluene, the above-mentioned aralkyl (meth)acrylate, and the like, and the present invention is not limited only to those exemplified ones. These aromatic monomers other than styrene may be used alone, respectively, or at least 2 kinds thereof may be used jointly.

The ethylenically unsaturated monomer includes, for example, those mentioned above. More specifically, the ethylenically unsaturated monomer includes, for example, an alkyl (meth)acylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones. These ethylenically unsaturated monomers may be used alone, respectively, or at least 2 kinds thereof may be used jointly.

Next, after the emulsion polymerization of the monomer component A is carried out to form an inner layer, the emulsion polymerization of the monomer component B is carried out to form an outer layer, and thereby the resin emulsion for a sealer of the present invention is obtained. After the formation of the inner layer by the emulsion polymerization of the monomer component A and before the formation of the outer layer by the emulsion polymerization of the monomer component B, the other layer may be formed within a range which does not hinder an object of the present invention.

A method for carrying out the emulsion polymerization of the monomer component A includes, for example, a method comprising dissolving an emulsifier in a medium such as an aqueous medium containing water and a water-soluble organic solvent such as a lower alcohol represented by methanol, or water, and adding dropwise thereto a monomer component A and a polymerization initiator with stirring, a method comprising previously emulsifying a monomer component with an emulsifier and water, and adding dropwise the emulsified monomer component to water or an aqueous medium, and the like, and the present invention is not limited only to these methods. Incidentally, the amount of the medium can be controlled in consideration of the amount of a nonvolatile component contained in the resulting resin emulsion.

The kind and amount of the emulsifier, the kind, amount and adding method of the polymerization initiator, addition of a decomposition agent of a polymerization initiator, the kind and amount of the additive, and the like can be the same as in the first aspect of the present invention.

The atmosphere at the time of carrying out the emulsion polymerization of the monomer component A is not particularly limited, but the atmosphere is preferably an inert gas such as nitrogen gas from the viewpoint of increase in efficiency of a polymerization initiator. The polymerization temperature at the time of carrying out the emulsion polymerization of the monomer component A is not particularly limited, and the polymerization temperature is usually preferably 50° to 100° C., more preferably 60° to 95° C. The polymerization temperature may be constant or changed in the course of the polymerization reaction. The polymerization time for carrying out the emulsion polymerization of the monomer component A is not particularly limited, and can be appropriately controlled in accordance with the progressing state of a polymerization reaction. The polymerization temperature is usually about 2 to about 9 hours.

An emulsion particle is obtained by carrying out the emulsion polymerization of the monomer component A as mentioned above to constitute an inner layer.

The polymer which constitutes the above-mentioned emulsion particle may have a cross-linking structure. The weight-average molecular weight of the polymer is preferably not less than 100000, more preferably not less than 300000, still more preferably not less than 550000, and particularly preferably not less than 600000 from the viewpoint of improvement in water permeability resistance of a coated film. When the polymer has a cross-linking structure, the upper limit of the weight-average molecular weight of the polymer is not particularly limited since it is difficult to determine the weight-average molecular weight of the polymer. When the polymer does not have a cross-linking structure, the upper limit of the weight-average molecular weight of the polymer is preferably not more than 5000000 from the viewpoint of improvement in film-forming property.

Next, an outer layer is formed by carrying out the emulsion polymerization of the monomer component B in the reaction solution prepared by emulsion polymerization of the monomer component A. When the emulsion polymerization of the monomer component B is carried out, it is preferred that the emulsion polymerization of the monomer component B is carried out after the rate of a polymerization reaction of the resulting polymer attains to not less than 90%, preferably not less than 95% from the viewpoint of the formation of a phase separation structure in the emulsion particle.

Incidentally, after the formation of the inner layer by carrying out the polymerization of the monomer component A and before the formation of the outer layer, a layer comprising the other polymer may be formed within a range which does not hinder an object of the present invention as occasion demands. Accordingly, in the method for producing a resin emulsion for a sealer of the present invention, a process for producing a layer comprising the other polymer may be included after the formation of the inner layer and before the formation of the outer layer as occasion demands.

A method for carrying out the emulsion polymerization of the monomer component B and its polymerization conditions can be the same as the method and its polymerization conditions which are used for the above-mentioned monomer A.

By carrying out the emulsion polymerization of the monomer component B as described above, emulsion particles in which the polymer for forming the outer surface is formed on the surface of the above-mentioned inner layer. Incidentally, a surface layer comprising the other polymer may be further formed on the surface of the outer layer as occasion demands within a range which does not hinder an object of the present invention.

The polymer obtained by emulsion polymerization of the monomer component B may have a cross-linking structure. The weight-average molecular weight of the polymer is preferably not less than 100000, more preferably not less than 300000, still more preferably not less than 550000, and particularly preferably not less than 600000 from the viewpoint of improvement in water permeability resistance of a coated film. When the polymer has a cross-linking structure, the upper limit of the weight-average molecular weight of the polymer is not particularly limited since it is difficult to determine the weight-average molecular weight of the polymer. When the polymer does not have a cross-linking structure, the upper limit of the weight-average molecular weight of the polymer is preferably not more than 5000000 from the viewpoint of improvement in film-forming property.

The glass transition temperature of any one of the polymer for constituting the inner layer and the polymer for constituting the outer layer is preferably not less than 75° C., more preferably not less than 90° C. from the viewpoint of improvement in strength of a coated film, and the glass transition temperature of any one of the polymer for constituting the inner layer and the polymer for constituting the outer layer is preferably not more than 120° C. from the viewpoint of improvement in flexibility of a coated film. The glass transition temperature of this polymer can be easily controlled by adjusting the composition of the monomer component.

As to the glass transition temperature of a polymer, for example, the glass transition temperature of styrene homopolymer is 100° C., the glass transition temperature of methyl methacrylate homopolymer is 105° C., the glass transition temperature of butyl acrylate homopolymer is −56° C., the glass transition temperature of 2-ethylhexyl acrylate homopolymer is −70° C., the glass transition temperature of acrylic acid homopolymer is 95° C., the glass transition temperature of methacrylic acid homopolymer is 130° C., the glass transition temperature of hydroxyethyl methacrylate homopolymer is 55° C., the glass transition temperature of acrylonitrile homopolymer is 96° C., and the glass transition temperature of gamma-methacryloxypropyltrimethoxysilane (TMSMA) homopolymer is 70° C.

The glass transition temperature of a polymer is determined by the above-mentioned Fox's equation. It is preferred that the found value of the glass transition temperature of a polymer is the same as the value determined by the above-mentioned Fox's equation. The found value of the glass transition temperature of a polymer can be determined by, for example, measuring its differential scanning calory. The apparatus for determining the differential scanning calory and its method for determining can be the same as described above.

The glass transition temperature of the above-mentioned emulsion particle having an above-mentioned inner layer and an outer layer itself preferably is not less than −70° C., more preferably not less than −60° C. from the viewpoint of increase in strength of a coated film, and the glass transition temperature of the emulsion particle is preferably not more than 10° C., more preferably not more than 0° C., still more preferably not more than −10° C. from the viewpoint of improvement in flexibility of a coated film and reduction in the amount of a solvent. Incidentally, the glass transition temperature of the emulsion particle itself means a value as determined by using the glass transition temperature of each homopolymer of the total monomers which are used as the raw material for the emulsion particles and evaluating based on the above-mentioned Fox's equation.

Incidentally, it is preferred that the solubility parameter (hereinafter referred to as SP value) of the polymer for constituting the outer layer is higher than the SP value of the polymer for constituting the inner layer from the viewpoint of improvement in flexibility of a coated film and film-forming property. In addition, it is preferred that the difference (absolute value) between the SP value of the polymer for constituting the inner layer and the SP value of the polymer for constituting the outer layer is larger from the viewpoint of the formation of a layer separation structure in the emulsion particle. In the present invention, since the emulsion particle comprises the polymer (I) in which styrene having a low SP value is used in a large amount and the polymer (II) in which the carboxyl group-containing monomer having a high SP value is used in a large amount, the emulsion particle has an ideal structure where the inner layer is clearly separated from the outer layer.

The SP value is a value as defined by the regular solution theory introduced by Hildebrand, and has also become a rule of thumb of the solubility of a solution containing 2 components. Generally, substances having a closer SP value with each other tend to be easily miscible with each other. Therefore, the SP value also becomes a rule of thumb for evaluating the miscibility of a solute with a solvent.

The weight ratio of the polymer for constituting the inner layer to the polymer for constituting the outer layer [the polymer for constituting the inner layer/the polymer for constituting the outer layer] is not less than 10/90, preferably not less than 15/85 from the viewpoint of improvement in strength of a coated film and water permeability resistance of a coated film, and the weight ratio of the polymer for constituting the inner layer to the polymer for constituting the outer layer is not more than 60/40 from the viewpoint of improvement in frost damage resistance.

The total content of the polymer for constituting the inner layer and the polymer for constituting the outer layer in an emulsion particle is not less than 40% by weight from the viewpoint of improvement in strength of a coated film, water permeability resistance of a coated film and frost damage resistance. It is preferred that the total content of the polymer for constituting the inner layer and the polymer for constituting the outer layer in an emulsion particle is higher, and its upper limit is 100% by weight.

The average particle diameter of emulsion particles is preferably not less than 150 nm, more preferably not less than 200 nm from the viewpoint of improvement in mechanical stability of emulsion particles, and the average particle diameter of emulsion particles is preferably not more than 500 nm, more preferably not more than 400 nm from the viewpoint of improvement in water permeability resistance of a coated film.

The content of a nonvolatile component in the resin emulsion for a sealer of the present invention is preferably not less than 30% by weight, more preferably not less than 40% by weight from the viewpoint of improvement in productivity, and the content of the nonvolatile component in the resin emulsion for a sealer is preferably not more than 70% by weight, more preferably not more than 60% by weight from the viewpoint of improvement in handling.

The minimum film-forming temperature of the resin emulsion for a sealer of the present invention is preferably not more than 10° C., more preferably not more than 0° C. from the viewpoint of improvement in film-forming property. The minimum film-forming temperature of the resin emulsion for a sealer of the present invention can be controlled by, for example, adjusting the glass transition temperature of the whole of the emulsion particle or the glass transition temperature of the outermost layer of the emulsion particle.

The resin emulsion for a sealer of the present invention obtained as described above is excellent in frost damage resistance, water permeability resistance of a coated film and strength of a coated film. Therefore, the resin emulsion for a sealer is useful, for example, for a sealer being used for the exterior of a building, a filler having a microelasticity, and the like.

Representative examples of the material which constitutes the exterior of a building include, for example, an inorganic building material. The inorganic building material includes the same ones as exemplified in the above. Since water is generally likely to easily permeate into the internal of an inorganic building material, the inorganic building material has a property such that the inorganic building material easily deteriorates. Therefore, an undercoat material, which is generally called as a sealer, is applied to the surface of an inorganic building material. In order to give a desired design, a top coat is usually applied to the surface of the inorganic building material. Among them, the resin emulsion for a sealer of the present invention can be suitably used for an undercoat material.

(2) Resin Composition for a Sealer

As mentioned above, the resin composition for a sealer according to the second aspect of the present invention has plural resin layers prepared by multistep emulsion polymerization of a monomer component, and comprises a resin emulsion containing emulsion particles having a glass transition temperature of −70° to 10° C. and a pigment, in which the amount of the pigment is 185 to 900 parts by weight per 100 parts by weight of the nonvolatile component of the resin emulsion.

The resin composition for a sealer according to the second aspect of the present invention has the above-mentioned constituents. Therefore, the resin composition is excellent in frost damage resistance, water permeability resistance of a coated film and strength of a coated film.

Incidentally, in the present specification, the frost damage resistance means a durability of a coated film when a test of warming and cooling, which is defined by JIS A 6909, is carried out repeatedly.

The resin emulsion for a sealer used in the resin composition for a sealer of the present invention can be produced by carrying out an emulsion polymerization of a monomer component.

The content of styrene in the total monomer components used as a raw material for an emulsion particle is not less than 5% by weight from the viewpoint of improvement in water permeability resistance of a coated film, and the content of styrene in the total monomer components is not more than 40% by weight, preferably not more than 30% by weight, more preferably not more than 25% by weight from the viewpoint of improvement in flexibility of a coated film. Therefore, the content of the monomers other than styrene in the total monomer components used as a raw material for an emulsion particle is not more than 95% by weight from the viewpoint of improvement in water permeability resistance of a coated film, and the content of the monomers other than styrene in the total monomer components is preferably not less than 60% by weight, preferably not less than 70% by weight, more preferably not less than 75% by weight from the viewpoint of improvement in water permeability resistance of a coated film.

The monomer other than styrene includes, for example, an aromatic monomer other than styrene, an ethylenically unsaturated monomer and the like. These monomers may be used alone, respectively, or at least 2 kinds thereof may be used jointly.

The aromatic monomer other than styrene includes, for example, α-methylstyrene, p-methylstyrene, tert-methylstyrene, chlorostyrene, vinyl toluene, an aralkyl (meth)acrylate and the like, and the present invention is not limited only to those exemplified ones. These aromatic monomers may be used alone, respectively, or at least 2 kinds thereof may be used jointly. The aralkyl (meth)acrylate includes, for example, aralkyl (meth)acrylates having an aralkyl group of 7 to 18 carbon atoms, such as benzyl (meth) acrylate, phenylethyl (meth)acrylate, methylbenzyl (meth)acrylate and naphthylmethyl (meth)acrylate, and the like, and the present invention is not limited only to those exemplified ones. These monomers may be used alone, respectively, or at least 2 kinds thereof may be used jointly.

The ethylenically unsaturated monomer includes, for example, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones. These ethylenically unsaturated monomers may be used alone, respectively, or at least 2 kinds thereof may be used jointly.

Concrete examples of the monomer other than styrene include an aromatic monomer other than styrene, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones. These monomers other than styrene may be used alone, respectively, or at least 2 kinds thereof may be used jointly.

The alkyl (meth)acrylate includes, for example, alkyl (meth)acrylates having an ester group of 1 to 18 carbon atoms, such as methyl (meth)acrylate, ethyl (meth)acrylate, n-butyl (meth)acrylate, isobutyl (meth)acrylate, tert-butyl (meth)acrylate, sec-butyl (meth)acrylate, 2-ethylhexyl (meth)acrylate, tridecyl (meth)acrylate, cyclohexyl (meth)acrylate, n-octyl (meth)acrylate, n-lauryl (meth)acrylate and 2-(acetoacetoxy)ethyl (meth)acrylate, and the like, and the present invention is not limited only to those exemplified ones. These monomers may be used alone, respectively, or at least 2 kinds thereof may be used jointly.

The hydroxyl group-containing (meth)acrylate includes, for example, hydroxyl group-containing (meth)acrylates having an ester group of 1 to 18 carbon atoms, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, and the like, and the present invention is not limited only to those exemplified ones. These monomers may be used alone, respectively, or at least 2 kinds thereof may be used jointly.

The carboxyl group-containing monomer includes, for example, aliphatic monomers containing a carboxyl group, such as (meth)acrylic acid, maleic acid, fumaric acid, crotonic acid, itaconic acid and maleic anhydride, and the like, and the present invention is not limited only to those exemplified ones. These monomers may be used alone, respectively, or at least 2 kinds thereof may be used jointly. Among these carboxyl group-containing monomers, acrylic acid, methacrylic acid and itaconic acid are preferred, and acrylic acid and methacrylic acid are more preferred from the viewpoint of improvement in dispersion stability of emulsion particles.

The oxo group-containing monomer includes, for example, (di)ethylene glycol (methoxy) (meth)acrylates such as ethylene glycol (meth)acrylate, ethylene glycol methoxy (meth)acrylate, diethylene glycol (meth)acrylate and diethylene glycol methoxy (meth)acrylate, and the like, and the present invention is not limited only to those exemplified ones. These monomers may be used alone, respectively, or at least 2 kinds thereof may be used jointly.

The fluorine atom-containing monomer, includes, for example, fluorine atom-containing alkyl (meth)acrylates having an ester group of 2 to 6 carbon atoms, such as trifluoroethyl (meth)acrylate, tetrafluoropropyl (meth)acrylate and octafluoropentyl (meth)acrylate, and the like, and the present invention is not limited only to those exemplified ones. These monomers may be used alone, respectively, or at least 2 kinds thereof may be used jointly.

The nitrogen atom-containing monomer includes, for example, acrylamide compounds such as (meth)acrylamide, N,N-dimethylaminopropyl acrylamide and diacetone acrylamide, nitrogen atom-containing (meth)acrylate compounds such as dimethylaminoethyl (meth)acrylate and diethylaminoethyl (meth)acrylate, N-vinylpyrrolidone, and the like, and the present invention is not limited only to those exemplified ones. These monomers may be used alone, respectively, or at least 2 kinds thereof may be used jointly.

The epoxy group-containing monomer includes, for example, epoxy group-containing (meth)acrylates such as glycidyl (meth)acrylate, and the like, and the present invention is not limited only to those exemplified ones. These monomers may be used alone, respectively, or at least 2 kinds thereof may be used jointly.

Among the ethylenically unsaturated monomers, from the viewpoint of improvement in water permeability resistance of a coated film, the (meth)acrylic monomer is preferred, and tert-butyl (meth)acrylate, 2-ethylhexyl (meth)acrylate, cyclohexyl (meth)acrylate and glycidyl (meth)acrylate are more preferred.

The emulsion particle contained in the resin emulsion has plural resin layers prepared by a multistep emulsion polymerization of a monomer component. Therefore, the emulsion particle satisfies both hardness of a coated film and film-forming property, which are contradictory properties to each other. The number of the resin layers in the emulsion particle is not particularly limited, and is preferably 2 to 5, more preferably 2 to 4, and still more preferably 2 or 3.

It is desired that a resin layer obtained by emulsion polymerization of a monomer component containing 85 to 100% by weight, preferably 90 to 100% by weight of an aromatic monomer and 0 to 15% by weight, preferably 0 to 10% by weight of a monomer other than the aromatic monomer is included in any one of the plural resin layers from the viewpoint of improvement in water permeability resistance of a coated film. This resin layer may be included in any one of the plural resin layers, and it is preferred that this resin layer exists as an inner layer of the emulsion particle from the viewpoint of improvement in film-forming property.

The aromatic monomer includes, for example, styrene, α-methylstyrene, p-methylstyrene, tert-methylstyrene, chlorostyrene, vinyl toluene, an aralkyl (meth)acrylate and the like, and the present invention is not limited only to those exemplified ones. These aromatic monomers may be used alone, respectively, or at least 2 kinds thereof may be used jointly. The aralkyl (meth)acrylate includes, for example, aralkyl (meth)acrylates having an aralkyl group of 7 to 18 carbon atoms, such as benzyl (meth)acrylate, phenylethyl (meth)acrylate, methylbenzyl (meth)acrylate and naphthylmethyl (meth)acrylate, and the like, and the present invention is not limited only to those exemplified ones. Among these aromatic monomers, styrene is preferred from the viewpoint of improvement in water permeability resistance of a coated film.

The monomer other than the aromatic monomer includes, for example, the ethylenically unsaturated monomer as mentioned above, and the like. The above-mentioned ethylenically unsaturated monomer can be suitably used in the present invention. Specifically, the ethylenically unsaturated monomer includes, for example, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones. These ethylenically unsaturated monomers may be used alone, respectively, or at least 2 kinds thereof may be used jointly.

It is preferred that a resin layer obtained by emulsion polymerization of a monomer component containing 1 to 10% by weight of a carboxyl group-containing monomer and 90 to 99% by weight of a monomer other than the carboxyl group-containing monomer is included in any one of the plural resin layers for constituting the emulsion particle from the viewpoint of improvement in film-forming property and water permeability resistance of a coated film. In this case, it is preferred that the content of the carboxyl group-containing monomer is not less than 1% by weight, and the content of the monomer other than the carboxyl group-containing monomer is not more than 99% by weight in the monomer component from the viewpoint of improvement in film-forming property. Also, it is desired that the content of the carboxyl group-containing monomer is not more than 10% by weight, preferably not more than 5% by weight, and the content of the monomer other than the carboxyl group-containing monomer is not less than 90% by weight, preferably not less than 95% by weight in the monomer component from the viewpoint of improvement in water permeability resistance of a coated film and frost damage resistance. This resin layer may be included in any one of the plural resin layers, and it is preferred that this resin layer exists as an inner layer of the emulsion particle from the viewpoint of improvement in film-forming property.

As the carboxyl group-containing monomer, there can be cited the carboxyl group-containing monomer which is exemplified in the above-mentioned ethylenically unsaturated monomer. More specifically, the carboxyl group-containing monomer includes, for example, aliphatic monomers containing a carboxyl group, such as (meth)acrylic acid, maleic acid, fumaric acid, crotonic acid, itaconic acid and maleic anhydride, and the like, and the present invention is not limited only to those exemplified ones. These monomers may be used alone, respectively, or at least 2 kinds thereof may be used jointly. Among these carboxyl group-containing monomers, acrylic acid, methacrylic acid and itaconic acid are preferred, and acrylic acid and methacrylic acid are more preferred from the viewpoint of improvement in dispersion stability of emulsion particles.

The monomer other than the carboxyl group-containing monomer includes, for example, the above-mentioned aromatic monomer, above-mentioned ethylenically unsaturated monomer other than the carboxyl group-containing monomer, and the like. Concrete examples of the monomer other than the carboxyl group-containing monomer includes an aromatic monomer, an alkyl (meth)acrylate, a hydroxyl group-containing (meth)acrylate, an oxo group-containing monomer, a fluorine atom-containing monomer, a nitrogen atom-containing monomer, an epoxy group-containing monomer and the like, and the present invention is not limited only to those exemplified ones. These monomers other than the carboxyl group-containing monomer may be used alone, respectively, or at least 2 kinds thereof may be used jointly.

As a preferred resin emulsion, there can be cited a resin emulsion containing emulsion particles having an inner layer comprising a polymer (I) prepared by emulsion polymerization of a monomer component A containing 85 to 100% by weight of an aromatic monomer and 0 to 15% by weight of a monomer other than the aromatic monomer, and an outer layer comprising a polymer (II) prepared by emulsion polymerization of a monomer component B containing 1 to 10% by weight of a carboxyl group-containing monomer and 90 to 99% by weight of a monomer other than the carboxyl group-containing monomer.

Incidentally, in the present invention, a layer other than the above-mentioned inner layer and the above-mentioned outer layer may be included in the emulsion particle within a range which does not hinder an object of the present invention.

The polymer (I) which forms the above-mentioned inner layer is obtained by, for example, emulsion polymerization of a monomer component A containing 85 to 100% by weight of an aromatic monomer and 0 to 15% by weight of a monomer other than the aromatic monomer.

The content of the aromatic monomer in the monomer component A is preferably 85 to 100% by weight, more preferably 90 to 100% by weight from the viewpoint of improvement in strength of a coated film and water permeability resistance of a coated film. Therefore, the component A may be composed only of the aromatic monomer. Among the aromatic monomers, styrene is preferred from the viewpoint of improvement in water permeability resistance of a coated film, as mentioned above. In addition, the monomer component A may contain a monomer other than the aromatic monomer within a range of preferably 0 to 15% by weight, more preferably 0 to 10% by weight. The monomer other than the aromatic monomer is exemplified by those mentioned above.

A method for carrying out the emulsion polymerization of the monomer component A includes, for example, a method comprising dissolving an emulsifier in a medium such as an aqueous medium containing water and a water-soluble organic solvent such as a lower alcohol represented by methanol, or water, and adding dropwise thereto a monomer component A and a polymerization initiator with stirring, a method comprising previously emulsifying a monomer component A with an emulsifier and water, and adding the emulsified monomer component A dropwise to water or an aqueous medium, and the like, and the present invention is not limited only to these methods. Incidentally, the amount of the medium can be controlled in consideration of the amount of a nonvolatile component contained in the resulting resin emulsion.

The kind and amount of the emulsifier, the kind, amount and adding method of the polymerization initiator, addition of a decomposition agent of a polymerization initiator, the kind and amount of the additive, and the like can be the same as mentioned above.

The atmosphere at the time of carrying out the emulsion polymerization of the monomer component A is not particularly limited, but the atmosphere is preferably an inert gas such as nitrogen gas from the viewpoint of increase in efficiency of a polymerization initiator. The polymerization temperature at the time of carrying out the emulsion polymerization of the monomer component A is not particularly limited, but the polymerization temperature is usually preferably 50° to 100° C., more preferably 60° to 95° C. The polymerization temperature may be constant or changed in the course of the polymerization reaction. The polymerization time for carrying out the emulsion polymerization of the monomer component A is not particularly limited, and can be appropriately controlled in accordance with the progressing state of a polymerization reaction. The polymerization temperature is usually about 2 to about 9 hours.

A polymer (I) is obtained in the form of an emulsion particle by carrying out the emulsion polymerization of the monomer component A as described above.

The polymer (I) may have a cross-linking structure. The weight-average molecular weight of the polymer (I) is preferably not less than 100000, more preferably not less than 300000, still more preferably not less than 550000, and particularly preferably not less than 600000 from the viewpoint of improvement in water permeability resistance of a coated film in any case of the case where the polymer (I) has a cross-linking structure and the case where the polymer (I) does not have a cross-linking structure. When the polymer (I) has a cross-linking structure, the upper limit of the weight-average molecular weight of the polymer (I) is not particularly limited since it is difficult to determine the weight-average molecular weight of the polymer (I). When the polymer (I) does not have a cross-linking structure, the upper limit of the weight-average molecular weight of the polymer (I) is preferably not more than 5000000 from the viewpoint of improvement in film-forming property.

Next, after an inner layer comprising the polymer (I) is formed, an outer layer comprising a polymer (II) is formed thereon by carrying out the emulsion polymerization of a monomer component B containing 1 to 10% by weight of a carboxyl group-containing monomer and 90 to 99% by weight of a monomer other than the carboxyl group-containing monomer.

It is preferred that the content of the carboxyl group-containing monomer is not less than 1% by weight, and the content of the monomer other than the carboxyl group-containing monomer is not more than 99% by weight in the monomer component B from the viewpoint of improvement in adhesion and improvement in film-forming property, and that the content of the carboxyl group-containing monomer is not more than 10% by weight, and the content of the monomer other than the carboxyl group-containing monomer is not less than 90% by weight in the monomer component B from the viewpoint of improvement in water permeability resistance of a coated film and frost damage resistance.

When the emulsion polymerization of the monomer component B is carried out, it is preferred that the emulsion polymerization of the monomer component B is carried out after the rate of a polymerization reaction of the polymer (I) attains to not less than 90%, preferably not less than 95% from the viewpoint of the formation of a phase separation structure in the emulsion particle.

Incidentally, after the formation of the inner layer comprising the polymer (I) and before the formation of the outer layer comprising the polymer (II), a layer comprising the other polymer may be formed on the inner layer within a range which does not hinder an object of the present invention as occasion demands. Accordingly, in the present invention, a process for producing a layer comprising the other polymer may be included after the formation of the inner layer comprising the polymer (I) and before the formation of the outer layer comprising the polymer (II) within a range which does not hinder an object of the present invention as occasion demands.

A method for carrying out the emulsion polymerization of the monomer component B and its polymerization conditions can be the same as the method and its polymerization conditions which are used for the above-mentioned monomer A.

By carrying out the emulsion polymerization of the monomer component B as described above, there can be obtained emulsion particles in which the polymer (II) for forming the outer surface is formed on the surface of the above-mentioned inner layer. Incidentally, a surface layer comprising the other polymer may be formed on the surface of the outer layer comprising the polymer (II) within a range which does not hinder an object of the present invention, as occasion demands.

The polymer (II) may have a cross-linking structure. The weight-average molecular weight of the polymer (II) is preferably not less than 100000, more preferably not less than 300000, still more preferably not less than 550000, and particularly preferably not less than 600000 from the viewpoint of improvement in water permeability resistance of a coated film in any case of the case where the polymer (II) has a cross-linking structure and the case where the polymer (II) does not have a cross-linking structure. When the polymer (II) has a cross-linking structure, the upper limit of the weight-average molecular weight of the polymer (II) is not particularly limited since it is difficult to determine the weight-average molecular weight of the polymer (II). When the polymer (II) does not have a cross-linking structure, the upper limit of the weight-average molecular weight of the polymer (II) is preferably not more than 5000000 from the viewpoint of improvement in film-forming property.

It is preferred that a resin layer comprising a polymer having a glass transition temperature of 75° to 120° C. is included in any one of the plural resin layers from the viewpoint of improvement in strength of a coated film and from the viewpoint of improvement in flexibility of a coated film. The glass transition temperature of this resin layer is preferably not less than 75° C. and more preferably not less than 90° C. from the viewpoint of improvement in strength of a coated film, and the glass transition temperature of this resin layer is preferably not more than 120° C. from the viewpoint of improvement in flexibility of a coated film. It is preferred that this resin layer is formed as an inner layer of the emulsion particle from the viewpoint of improvement in both strength of a coated film and flexibility of a coated film. The glass transition temperature of this polymer can be easily controlled by adjusting the composition of the monomer component.

Incidentally, the glass transition temperature of a polymer described in the present specification means a temperature which is obtained by using a glass transition temperature of a homopolymer made of a monomer used in the monomer component for constituting the polymer and determining the glass transition temperature on the basis of Fox's equation represented by the equation:

$$1/Tg = \Sigma(Wm/Tgm)/100$$

wherein Wm is a content (% by weight) of a monomer "m" in the monomer component for constituting a polymer, and Tgm is a glass transition temperature (absolute temperature: K) of a homopolymer made of the monomer "m".

As to the glass transition temperature of a polymer, for example, the glass transition temperature of styrene homopolymer is 100° C., the glass transition temperature of methyl methacrylate homopolymer is 105° C., the glass transition temperature of acrylic acid homopolymer is 95° C., the glass transition temperature of 2-ethylhexyl acrylate homopolymer is −70° C., the glass transition temperature of butyl acrylate homopolymer is −56° C., the glass transition temperature of methacrylic acid homopolymer is 130° C., the glass transition temperature of hydroxyethyl methacrylate homopolymer is 55° C., the glass transition temperature of acrylonitrile homopolymer is 96° C., and the glass transition temperature of gamma-methacryloxypropyltrimethoxysilane (TMSMA) homopolymer is 70° C.

The glass transition temperature of a polymer is determined by the above-mentioned Fox's equation. It is preferred that the found value of the glass transition temperature of a polymer is the same as the value determined by the above-mentioned Fox's equation. The found value of the glass transition temperature of a polymer can be determined by, for example, measuring its differential scanning calory. The apparatus for determining the differential scanning calory and its method for determining can be the same as described above.

The glass transition temperature of the emulsion particle itself is preferably not less than −70° C., more preferably not less than −60° C. from the viewpoint of increase in strength of a coated film, and the glass transition temperature of the emulsion particle is preferably not more than 10° C., more preferably not more than 0° C., still more preferably not more than −10° C. from the viewpoint of improvement in flexibility of a coated film and reduction in the amount of a solvent. Incidentally, the glass transition temperature of the emulsion particle itself means a value determined by using the glass transition temperature of each homopolymer of the total monomers which are used as the raw materials for the emulsion particles and evaluating based on the above-mentioned Fox's equation.

It is preferred that the solubility parameter (hereinafter referred to as SP value) of the polymer(II) is higher than the SP value of the polymer (I) from the viewpoint of formation of a layer separation structure in the emulsion particle. In addition, it is preferred that the difference between the SP value of the polymer (I) and the SP value of the polymer (II) is larger from the viewpoint of the formation of a layer separation structure in the emulsion particle. It is preferred that the emulsion particle comprises the polymer (I) in which styrene having a low SP value is used in a large amount and the polymer (II) in which the carboxyl group-containing monomer having a high SP value is used in a large amount since the emulsion particle has an ideal structure where the inner layer is clearly separated from the outer layer.

The SP value is a value as defined by the regular solution theory introduced by Hildebrand, and has also become a rule of thumb of the solubility of a solution containing 2 components. Generally, substances having a closer SP value with each other tend to be easily miscible with each other. Therefore, the SP value also becomes a rule of thumb for evaluating the miscibility of a solute with a solvent.

The weight ratio of the polymer (I) to the polymer (II) [the polymer (I)/the polymer (II)] is preferably not less than 10/90, more preferably not less than 15/85 from the viewpoint of improvement in strength of a coated film and water permeability resistance of a coated film, and the weight ratio of the polymer (I) to the polymer (II) is preferably not more than 60/40 from the viewpoint of improvement in frost damage resistance.

The total content of the polymer (I) and the polymer (II) in an emulsion particle is preferably not less than 40% by weight from the viewpoint of improvement in strength of a coated film, water permeability resistance of a coated film, frost damage resistance and adhesion. It is preferred that the total content of the polymer (I) and the polymer (II) in an emulsion particle is higher, and its upper limit is 100% by weight.

The average particle diameter of emulsion particles is preferably not less than 150 nm, more preferably not less than 200 nm from the viewpoint of improvement in storage stability of emulsion particles, and the average particle diameter of emulsion particles is preferably not more than 500 nm, more preferably not more than 400 nm from the viewpoint of improvement in water permeability resistance of a coated film.

The content of a nonvolatile component in the resin emulsion is preferably not less than 30% by weight, more preferably not less than 40% by weight from the viewpoint of improvement in productivity, and the content of a nonvolatile component in the resin emulsion is preferably not more than 70% by weight, more preferably not more than 60% by weight from the viewpoint of improvement in handling.

Incidentally, the content of the nonvolatile component in the resin emulsion for a sealer in the present specification means a value which is determined by weighing 1 g of a resin emulsion, drying the resin emulsion at 110° C. for 1 hour by means of a hot air drying equipment, and calculating the amount of the resulting residue as a nonvolatile component based on the equation:

[Content of nonvolatile component in the resin emulsion(% by mass)]=([Mass of residue]÷[1 g of the resin emulsion])×100.

The minimum film-forming temperature of the resin emulsion is preferably not less than 10° C., more preferably not less than 0° C. from the viewpoint of increase in film-forming property. The minimum film-forming temperature of the resin emulsion can be controlled by, for example, adjusting the glass transition temperature of the whole of the emulsion particles or the glass transition temperature of the outermost layer.

Incidentally, the minimum film-forming temperature of the resin emulsion for a sealer in the present specification is determined by placing a glass plate on a thermal gradient tester, applying a resin emulsion onto the glass plate to form a film having a thickness of 0.2 mm by means of an applicator, drying the film, and measuring a temperature of the film when a crack is generated in the film, and the temperature is regarded as a minimum film-forming temperature.

The content of a nonvolatile component of the resin emulsion in the resin composition for a sealer of the present invention is preferably not less than 10% by weight from the viewpoint of improvement in film-forming property, water permeability resistance of a coated film and frost damage resistance, and the content of the nonvolatile component of the resin emulsion in the resin composition for a sealer is preferably not more than 35% by weight, more preferably not more than 30% by weight, still more preferably not more than 25% by weight, particularly preferably not more than 20% by weight from the viewpoint of improvement in strength of a coated film.

The pigment used in the coating composition for a sealer of the present invention include an organic pigment and an inorganic pigment, and these pigments may be used alone, respectively, or at least 2 kinds thereof may be used jointly.

The organic pigment includes, for example, azo pigments, azomethine pigments, methine pigments, anthraquinone pigments, phthalocyanine pigments, perinone pigments, perylene pigments, diketo-pyrrolo-pyrrole pigments, thioindigo pigments, iminoisoindoline pigments, imino-isoindolinone pigments, quinacridone pigments such as quinacridone red and quinacridone violet, flavanthrone pigments, indanthrone pigments, anthrapyrimidine pigments, carbazole pigments, monoarylide yellow, diarylide yellow, benzimidazolone yellow, tolyl orange, naphthol orange, quinophthalone pigments, and the like, and the present invention is not limited only to those exemplified ones. These organic pigments may be used alone, respectively, or at least 2 kinds thereof may be used jointly.

The inorganic pigment includes, for example, titanium dioxide, red iron oxide, black iron oxide, iron oxide, chrome oxide green, carbon black, ferric ferrocyanide (Prussian blue), ultramarine, lead chromate, and the like, and further includes, pigments having a squamous shape such as mica, clay, aluminum powder, talc and aluminum silicate, extender pigments such as calcium carbonate, magnesium hydroxide, aluminum hydroxide, barium sulfate and magnesium carbonate, and the like, and the present invention is not limited only to those exemplified ones. These inorganic pigments may be used alone, respectively, or at least 2 kinds thereof may be used jointly.

Among the pigments, the extender pigment is preferred, and calcium carbonate is more preferred from the viewpoint of economical efficiency.

The amount of the pigment per 100 parts by weight of the nonvolatile component of the resin emulsion is not less than 185 parts by weight, preferably not less than 233 parts by weight, still more preferably not less than 300 parts by weight, particularly preferably not less than 400 parts by weight from the viewpoint of improvement in strength of a coated film and economical efficiency, and the amount of the pigment per 100 parts by weight of the nonvolatile component of the resin emulsion is not more than 900 parts by weight from the viewpoint of improvement in film-forming property, water permeability resistance of a coated film and frost damage resistance.

The resin composition for a sealer of the present invention can be easily prepared by mixing the resin emulsion with the pigment.

The resin composition for a sealer of the present invention obtained as described above is excellent in frost damage resistance, water permeability resistance of a coated film and strength of a coated film. Therefore, the resin composition is useful in, for example, a sealer for use on the exterior of a building and a filler having a microelasticity, and the like.

Representative examples of the material which constitutes the exterior of a building include an inorganic building material. The inorganic building material includes those exemplified ones mentioned above. Since water is generally easily permeated into the inorganic building material, the inorganic building material has a property such that the inorganic building material easily deteriorates. Therefore, an undercoat material, which is generally called as a sealer, is applied to the surface and the back surface of an inorganic building material. In order to give a desired design, a top coat is usually applied to the surface of the inorganic building material. Among them, the resin composition for a sealer of the present invention can be suitably used for an undercoat material.

(3) Coating Composition for a Sealer

As mentioned above, the coating composition for a sealer according to the second aspect of the present invention comprises a resin emulsion containing emulsion particles having a glass transition temperature of −70° to 10° C., a pigment and a rheology control agent, in which the amount of the pigment is 185 to 900 parts by weight, and the amount of an active ingredient of the rheology control agent is 0.01 to 5 parts by weight per 100 parts by weight of the nonvolatile component of the resin emulsion. Since the coating composition for a sealer of the present invention has the above-mentioned constituents, the coating composition for a sealer is excellent in frost damage resistance, water permeability resistance of a coated film and strength of a coated film.

Incidentally, in the present specification, the frost damage resistance means a durability of a coated film when a test of warming and cooling, which is defined by JIS A 6909, is carried out repeatedly.

The resin emulsion which is used in the coating composition for a sealer according to the second aspect of the present invention can be prepared by carrying out an emulsion polymerization of a monomer component.

The content of the styrene in the total monomer components used as a raw material for an emulsion particle is not less than 5% by weight from the viewpoint of improvement in water permeability resistance of a coated film, and the content of the styrene in the total monomer components is not more than 40% by weight, preferably not more than 30% by weight, more preferably not more than 25% by weight from the viewpoint of improvement in flexibility of a coated film. Therefore, the content of the monomer other than styrene in the total monomer components used as a raw material for an emulsion particle is not more than 95% by weight from the viewpoint of improvement in water permeability resistance of a coated film, and the content of the monomer other than styrene in the total monomer components is not less than 60% by weight, preferably not less than 70% by weight, more preferably not less than 75% by weight from the viewpoint of improvement in water permeability resistance of a coated film.

The monomer other than styrene includes, for example, an aromatic monomer other than styrene, an ethylenically unsaturated monomer and the like, and these monomers may be used alone, respectively, or at least 2 kinds thereof may be used jointly.

The aromatic monomer other than styrene includes, for example, α-methylstyrene, p-methylstyrene, tert-methylstyrene, chlorostyrene, vinyl toluene, an aralkyl (meth)acrylate and the like, and the present invention is not limited only to those exemplified ones. These aromatic monomers may be used alone, respectively, or at least 2 kinds thereof may be used jointly. The aralkyl (meth)acrylate includes, for example, aralkyl (meth)acrylates having an aralkyl group of 7 to 18 carbon atoms, such as benzyl (meth)acrylate, phenylethyl (meth)acrylate, methylbenzyl (meth)acrylate and naphthylmethyl (meth)acrylate, and the like, and the present invention is not limited only to those exemplified ones. These monomers may be used alone, respectively, or at least 2 kinds thereof may be used jointly.

The ethylenically unsaturated monomer includes, for example, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones. These ethylenically unsaturated monomers may be used alone, respectively, or at least 2 kinds thereof may be used jointly.

Concrete examples of the monomer other than styrene include an aromatic monomer other than styrene, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones. These monomers other than styrene may be used alone, respectively, or at least 2 kinds thereof may be used jointly.

The alkyl (meth)acrylate includes, for example, alkyl (meth)acrylates having an ester group of 1 to 18 carbon atoms, such as methyl (meth)acrylate, ethyl (meth)acrylate, n-butyl (meth)acrylate, isobutyl (meth)acrylate, tert-butyl (meth)acrylate, sec-butyl (meth)acrylate, 2-ethylhexyl (meth)acrylate, tridecyl (meth)acrylate, cyclohexyl (meth)acrylate, n-octyl (meth)acrylate, n-lauryl (meth)acrylate and 2-(acetoacetoxy)ethyl (meth)acrylate, and the like, and the present invention is not limited only to those exemplified ones. These monomers may be used alone, respectively, or at least 2 kinds thereof may be used jointly.

The hydroxyl group-containing (meth)acrylate includes, for example, hydroxyl group-containing (meth)acrylates having an ester group of 1 to 18 carbon atoms, such as 2-hydroxyethyl (meth)acrylate, 2-hydroxypropyl (meth)acrylate, 3-hydroxypropyl (meth)acrylate, 2-hydroxybutyl (meth)acrylate and 4-hydroxybutyl (meth)acrylate, and the like, and the present invention is not limited only to those exemplified ones. These monomers may be used alone, respectively, or at least 2 kinds thereof may be used jointly.

The carboxyl group-containing monomer includes, for example, aliphatic monomers containing a carboxyl group, such as (meth)acrylic acid, maleic acid, fumaric acid, crotonic acid, itaconic acid and maleic anhydride, and the like, and the present invention is not limited only to those exemplified ones. These monomers may be used alone, respectively, or at least 2 kinds thereof may be used jointly. Among these carboxyl group-containing monomers, acrylic acid, methacrylic acid and itaconic acid are preferred, and acrylic acid and methacrylic acid are more preferred from the viewpoint of improvement in dispersion stability of emulsion particles.

The oxo group-containing monomer includes, for example, (di)ethylene glycol (methoxy) (meth)acrylates such as ethylene glycol (meth)acrylate, ethylene glycol methoxy (meth)acrylate, diethylene glycol (meth)acrylate and diethylene glycol methoxy (meth)acrylate, and the like, and the present invention is not limited only to those exemplified ones. These monomers may be used alone, respectively, or at least 2 kinds thereof may be used jointly.

The fluorine atom-containing monomer, includes, for example, fluorine atom-containing alkyl (meth)acrylates having an ester group of 2 to 6 carbon atoms, such as trifluoroethyl (meth)acrylate, tetrafluoropropyl (meth)acrylate and octafluoropentyl (meth)acrylate, and the like, and the present invention is not limited only to those exemplified ones. These monomers may be used alone, respectively, or at least 2 kinds thereof may be used jointly.

The nitrogen atom-containing monomer includes, for example, acrylamide compounds such as (meth)acrylamide, N,N-dimethylaminopropyl acrylamide and diacetone acrylamide, nitrogen atom-containing (meth)acrylate compounds such as dimethylaminoethyl (meth)acrylate and diethylaminoethyl (meth)acrylate, N-vinylpyrrolidone, and the like, and the present invention is not limited only to those exemplified ones. These monomers may be used alone, respectively, or at least 2 kinds thereof may be used jointly.

The epoxy group-containing monomer includes, for example, an epoxy group-containing (meth)acrylate such as glycidyl (meth)acrylate, and the like, and the present invention is not limited only to those exemplified ones. These monomers may be used alone, respectively, or at least 2 kinds thereof may be used jointly.

Among the ethylenically unsaturated monomers, the (meth)acrylic monomer is preferred, and tert-butyl (meth)acrylate, 2-ethylhexyl (meth)acrylate, cyclohexyl (meth)acrylate and glycidyl (meth)acrylate are more preferred from the viewpoint of improvement in water permeability resistance of a coated film.

The emulsion particle contained in the resin emulsion may be composed of only one kind of a resin prepared by a one-step emulsion polymerization. It is preferred that the emulsion particle has plural resin layers prepared by a multistep emulsion polymerization of a monomer component from the viewpoint of satisfying both of hardness of a coated film and film-forming property, which are contradictory properties to each other. When the emulsion particle has plural resin layers, the number of the resin layers of the emulsion particle is not particularly limited, and is preferably 2 to 5, more preferably 2 to 4, and still more preferably 2 or 3.

When the emulsion particle has plural resin layers, it is desired that a resin layer obtained by emulsion polymerization of a monomer component containing 85 to 100% by weight, preferably 90 to 100% by weight of an aromatic monomer and 0 to 15% by weight, preferably 0 to 10% by weight of a monomer other than the aromatic monomer is included in any one of the plural resin layers from the viewpoint of improvement in water permeability resistance of a coated film. This resin layer may be included in any one of the plural resin layers, and it is preferred that this resin layer exists as an inner layer of the emulsion particle from the viewpoint of improvement in film-forming property.

The aromatic monomer includes, for example, styrene, α-methylstyrene, p-methylstyrene, tert-methylstyrene, chlorostyrene, vinyl toluene, an aralkyl (meth)acrylate and the like, and the present invention is not limited only to those exemplified ones. These aromatic monomers may be used alone, respectively, or at least 2 kinds thereof may be used jointly. The aralkyl (meth)acrylate includes, for example, aralkyl (meth)acrylate having an aralkyl group of 7 to 18 carbon atoms, such as benzyl (meth)acrylate, phenylethyl (meth)acrylate, methylbenzyl (meth)acrylate and naphthylmethyl (meth)acrylate, and the like, and the present invention is not limited only to those exemplified ones. Among these aromatic monomers, styrene is preferred from the viewpoint of improvement in water permeability resistance of a coated film.

The monomer other than the aromatic monomer includes, for example, the ethylenically unsaturated monomer as mentioned above, and the like. The above-mentioned ethylenically unsaturated monomer can be suitably used in the present invention. Specifically, the ethylenically unsaturated monomer includes, for example, an alkyl (meth)acrylate, a hydroxyl group-containing (meth)acrylate, a carboxyl group-containing monomer, an oxo group-containing monomer, a fluorine atom-containing monomer, a nitrogen atom-containing monomer, an epoxy group-containing monomer and the like, and the present invention is not limited only to those exemplified ones. These ethylenically unsaturated monomers may be used alone, respectively, or at least 2 kinds thereof may be used jointly.

It is preferred that a resin layer obtained by emulsion polymerization of a monomer component containing 1 to 10% by weight of a carboxyl group-containing monomer and 90 to 99% by weight of a monomer other than the carboxyl group-containing monomer is included in any one of the plural resin layers for constituting the emulsion particle from the viewpoint of improvement in film-forming property and water permeability resistance of a coated film. In this case, it is preferred that the content of the carboxyl group-containing monomer is not less than 1% by weight, and the content of the monomer other than the carboxyl group-containing monomer is not more than 99% by weight in the monomer component from the viewpoint of film-forming property. Also, it is desired that the content of the carboxyl group-containing monomer is not more than 10% by weight, preferably not more than 5% by weight, and the content of the monomer other than the carboxyl group-containing monomer is not less than 90% by weight, preferably not less than 95% by weight in the monomer component from the viewpoint of water permeability resistance of a coated film and frost damage resistance. This resin layer may be included in any one of the plural resin layers, and it is preferred that this resin layer exists as an inner layer of the emulsion particle from the viewpoint of improvement in film-forming property.

As the carboxyl group-containing monomer, there can be cited the carboxyl group-containing monomer which is exemplified in the above-mentioned ethylenically unsaturated monomer. More specifically, the carboxyl group-containing monomer includes, for example, (meth)acrylic acid, maleic acid, fumaric acid, crotonic acid, itaconic acid and maleic anhydride, and the like, and the present invention is not limited only to those exemplified ones. These monomers may be used alone, respectively, or at least 2 kinds thereof may be used jointly. Among these carboxyl group-containing monomers, acrylic acid, methacrylic acid and itaconic acid are preferred, and acrylic acid and methacrylic acid are more preferred from the viewpoint of improvement in dispersion stability of emulsion particles.

The monomer other than the carboxyl group-containing monomer includes, for example, the above-mentioned aromatic monomer, above-mentioned ethylenically unsaturated monomer other than the carboxyl group-containing monomer, and the like. Concrete examples of the monomer other than the carboxyl group-containing monomer includes, for example, an aromatic monomer, an alkyl (meth)acrylate, a hydroxyl group-containing (meth)acrylate, an oxo group-containing monomer, a fluorine atom-containing monomer, a nitrogen atom-containing monomer, an epoxy group-containing monomer and the like, and the present invention is not limited only to those exemplified ones. These monomers other than the carboxyl group-containing monomer may be used alone, respectively, or at least 2 kinds thereof may be used jointly.

As a preferred resin emulsion, there can be cited a resin emulsion containing emulsion particles having an inner layer comprising a polymer (I) prepared by emulsion polymerization of a monomer component A containing 85 to 100% by weight of an aromatic monomer and 0 to 15% by weight of a monomer other than the aromatic monomer, and an outer layer comprising a polymer (II) prepared by emulsion polymerization of a monomer component B containing 1 to 10% by weight of a carboxyl group-containing monomer and 90 to 99% by weight of a monomer other than the carboxyl group-containing monomer.

Incidentally, in the present invention, a layer other than the above-mentioned inner layer and the above-mentioned outer layer may be formed in the emulsion particle within a range which does not hinder an object of the present invention.

The polymer (I) which forms the above-mentioned inner layer is obtained by, for example, emulsion polymerization of a monomer component A containing 85 to 100% by weight of an aromatic monomer and 0 to 15% by weight of a monomer other than the aromatic monomer.

The content of the aromatic monomer in the monomer component A is preferably 85 to 100% by weight, more preferably 90 to 100% by weight from the viewpoint of improvement in strength of a coated film and water permeability resistance of a coated film. Therefore, the component A may be composed only of the aromatic monomer. Among the aromatic monomers, styrene is preferred from the viewpoint of improvement in water permeability resistance of a coated film, as mentioned above. In addition, the monomer component A may contain a monomer other than the aromatic monomer within a range of preferably 0 to 15% by weight, more preferably 0 to 10% by weight. The monomer other than the aromatic monomer is exemplified by those mentioned above.

A method for carrying out the emulsion polymerization of the monomer component A includes, for example, a method comprising dissolving an emulsifier in a medium such as an aqueous medium containing water and a water-soluble organic solvent such as a lower alcohol represented by methanol, or water, and adding dropwise thereto a monomer component A and a polymerization initiator with stirring, a method comprising previously emulsifying a monomer component A with an emulsifier and water, and adding the emulsified monomer component A dropwise to water or an aqueous medium, and the like, and the present invention is not limited only to these methods. Incidentally, the amount of the medium can be controlled in consideration of the amount of a nonvolatile component contained in the resulting resin emulsion.

The kind and amount of the emulsifier, the kind, amount and adding method of the polymerization initiator, addition of a decomposition agent of a polymerization initiator, the kind and amount of the additive, and the like can be the same as mentioned above.

The atmosphere at the time of carrying out the emulsion polymerization of the monomer component A is not particularly limited, but the atmosphere is preferably an inert gas such as nitrogen gas from the viewpoint of increase in efficiency of a polymerization initiator. The polymerization temperature at the time of carrying out the emulsion polymerization of the monomer component A is not particularly limited, but the polymerization temperature is usually preferably 50° to 100° C., more preferably 60° to 95° C. The polymerization temperature may be constant or changed in the course of the polymerization reaction. The polymerization time for carrying out the emulsion polymerization of the monomer component A is not particularly limited, and can be appropriately controlled in accordance with the progressing state of a polymerization reaction. The polymerization temperature is usually about 2 to about 9 hours.

A polymer (I) is obtained in the form of an emulsion particle by carrying out the emulsion polymerization of the monomer component A as described above.

The polymer (I) may have a cross-linking structure. The weight-average molecular weight of the polymer (I) is preferably not less than 100000, more preferably not less than 300000, still more preferably not less than 550000, and particularly preferably not less than 600000 from the viewpoint of improvement in water permeability resistance of a coated film in any case of the case where the polymer (I) has a cross-linking structure and the case where the polymer (I) does not have a cross-linking structure. When the polymer has a cross-linking structure, the upper limit of the weight-average molecular weight of the polymer (I) is not particularly limited since it is difficult to determine the weight-average molecular weight of the polymer (I). When the polymer (I) does not have a cross-linking structure, the upper limit of the weight-average molecular weight of the polymer (I) is preferably not more than 5000000 from the viewpoint of improvement in film-forming property.

Next, after an inner layer comprising the polymer (I) is formed, an outer layer comprising a polymer (II) is formed thereon by carrying out the emulsion polymerization of a monomer component B containing 1 to 10% by weight of a carboxyl group-containing monomer and 90 to 99% by weight of a monomer other than the carboxyl group-containing monomer.

It is preferred that the content of the carboxyl group-containing monomer is not less than 1% by weight, and the content of the monomer other than the carboxyl group-containing monomer is not more than 99% by weight in the monomer component B from the viewpoint of improvement in adhesion and improvement in film-forming property, and that the content of the carboxyl group-containing monomer is not more than 10% by weight, and the content of the monomer other than the carboxyl group-containing monomer is not less than 90% by weight in the monomer component B from the viewpoint of improvement in water permeability resistance of a coated film and frost damage resistance.

When the emulsion polymerization of the monomer component B is carried out, it is preferred that the emulsion polymerization of the monomer component B is carried out after the rate of a polymerization reaction of the polymer (I) attains to not less than 90%, preferably not less than 95% from the viewpoint of the formation of a phase separation structure in the emulsion particle.

Incidentally, after the formation of the inner layer comprising the polymer (I) and before the formation of the outer layer comprising the polymer (II), a layer comprising the other polymer may be formed on the inner layer within a range which does not hinder an object of the present invention as occasion demands. Accordingly, in the present invention, a process for producing a layer comprising the other polymer may be included after the formation of the inner layer comprising the polymer (I) and before the formation of the outer layer comprising the polymer (II) within a range which does not hinder an object of the present invention as occasion demands.

A method for carrying out an emulsion polymerization of the monomer component B and its polymerization conditions can be the same as the method and its polymerization conditions which are used for the above-mentioned monomer A.

By carrying out the emulsion polymerization of the monomer component B as described above, there can be obtained emulsion particles in which the polymer (II) for forming the outer surface is formed on the surface of the above-mentioned inner layer. Incidentally, a surface layer comprising the other polymer may be formed on the surface of the outer layer comprising the polymer (II) within a range which does not hinder an object of the present invention as occasion demands.

The polymer (II) may have a cross-linking structure. The weight-average molecular weight of the polymer (II) is preferably not less than 100000, more preferably not less than 300000, still more preferably not less than 550000, and particularly preferably not less than 600000 from the viewpoint of improvement in water permeability resistance of a coated film in any case of the case where the polymer (II) has a cross-linking structure and the case where the polymer (II) does not have a cross-linking structure. When the polymer (II) has a cross-linking structure, the upper limit of the weight-average molecular weight of the polymer (II) is not particularly limited since it is difficult to determine the weight-average molecular weight of the polymer (II). When the polymer (II) does not have a cross-linking structure, the upper limit of the weight-average molecular weight of the polymer (II) is preferably not more than 5000000 from the viewpoint of improvement in film-forming property.

It is preferred that a resin layer comprising a polymer having a glass transition temperature of 75° to 120° C. is included in any one of the plural resin layers from the viewpoint of improvement in strength of a coated film and from the viewpoint of improvement in flexibility of a coated film. The glass transition temperature of this resin layer is preferably not less than 75° C. and more preferably not less than 90° C. from the viewpoint of improvement in strength of a coated film, and the glass transition temperature of this resin layer is preferably not more than 120° C. from the viewpoint of improvement in flexibility of a coated film. It is preferred that this resin layer is formed as an inner layer of the emulsion particle from the viewpoint of improvement in both strength of a coated film and flexibility of a coated film. The glass transition temperature of this polymer can be easily controlled by adjusting the composition of the monomer component.

Incidentally, the glass transition temperature of a polymer described in the present specification means a temperature which is obtained by using a glass transition temperature of a homopolymer made of a monomer used in the monomer component for constituting the polymer and determining the glass transition temperature on the basis of Fox's equation represented by the equation:

$$1/Tg = \Sigma(Wm/Tgm)/100$$

wherein Wm is a content (% by weight) of a monomer "m" in the monomer component for constituting a polymer, and Tgm is a glass transition temperature (absolute temperature: K) of a homopolymer made of the monomer "m".

As to the glass transition temperature of a polymer, for example, the glass transition temperature of styrene homopolymer is 100° C., the glass transition temperature of methyl methacrylate homopolymer is 105° C., the glass transition temperature of acrylic acid homopolymer is 95° C., the glass transition temperature of methacrylic acid homopolymer is 130° C., the glass transition temperature of butyl acrylate homopolymer is −56° C., the glass transition temperature of 2-ethylhexyl acrylate homopolymer is −70° C., and the glass transition temperature of acrylonitrile homopolymer is 96° C.

The glass transition temperature of a polymer is determined by the above-mentioned Fox's equation. It is preferred that the found value of the glass transition temperature of a polymer is the same as the value determined by the above-mentioned Fox's equation. The found value of the glass transition temperature of a polymer can be determined by, for example, measuring its differential scanning calory. The apparatus for determining the differential scanning calory and its method for determining can be the same as described above.

The glass transition temperature of the emulsion particle itself is not less than −70° C., preferably not less than −60° C. from the viewpoint of increase in strength of a coated film, and the glass transition temperature of the emulsion particle is not more than 10° C., preferably not more than 0° C., still more preferably not more than −10° C. from the viewpoint of improvement in flexibility of a coated film and reduction in the amount of a solvent. Incidentally, the glass transition temperature of the emulsion particle itself means a value determined by using the glass transition temperature of each homopolymer of the total monomers which are used as the raw materials for the emulsion particles and evaluating based on the above-mentioned Fox's equation.

It is preferred that the solubility parameter (hereinafter referred to as SP value) of the polymer (II) is higher than the SP value of the polymer (I) from the viewpoint of formation of a layer separation structure in the emulsion particle. In addition, it is preferred that the difference between the SP value of the polymer (I) and the SP value of the polymer (II) is larger from the viewpoint of the formation of a layer separation structure in the emulsion particle. It is preferred that the emulsion particle comprises the polymer (I) in which styrene having a low SP value is used in a large amount and the polymer (II) in which the carboxyl group-containing monomer having a high SP value is used in a large amount since the emulsion particle has an ideal structure where the inner layer is clearly separated from the outer layer.

The SP value is a value as defined by the regular solution theory introduced by Hildebrand, and has also become a rule of thumb of the solubility of a solution containing 2 components. Generally, substances having a closer SP value with each other tend to be easily miscible with each other. Therefore, the SP value also becomes a rule of thumb for evaluating the miscibility of a solute with a solvent.

The weight ratio of the polymer (I) to the polymer (II) [the polymer (I)/the polymer (II)] is preferably not less than 10/90, more preferably not less than 15/85 from the viewpoint of improvement in strength of a coated film and water permeability resistance of a coated film, and the weight ratio of the polymer (I) to the polymer (II) is preferably not more than 60/40 from the viewpoint of improvement in frost damage resistance.

The total content of the polymer (I) and the polymer (II) in an emulsion particle is preferably not less than 40% by weight from the viewpoint of improvement in strength of a coated film, water permeability resistance of a coated film, frost damage resistance and adhesion. It is preferred that the total content of the polymer (I) and the polymer (II) in an emulsion particle is higher, and its upper limit is 100% by weight.

The average particle diameter of emulsion particles is preferably not less than 150 nm, more preferably not less than 200 nm from the viewpoint of improvement in storage stability of emulsion particles, and the average particle diameter of emulsion particles is preferably not more than 500 nm, more preferably not more than 400 nm from the viewpoint of improvement in water permeability resistance of a coated film.

The content of a nonvolatile component in the resin emulsion is preferably not less than 30% by weight, more preferably not less than 40% by weight from the viewpoint of improvement in productivity, and the content the nonvolatile component in the resin emulsion is preferably not more than 70% by weight, more preferably not more than 60% by weight from the viewpoint of improvement in handling.

Incidentally, the content of the nonvolatile component in the resin emulsion for a sealer in the present specification means a value which is determined by weighing 1 g of a resin emulsion, drying the resin emulsion at 110° C. for 1 hour by means of a hot air drying equipment, and calculating the amount of the resulting residue as a nonvolatile component based on the equation:

[Content of nonvolatile component in the resin emulsion(% by mass)]=([Mass of residue]÷[1 g of the resin emulsion])×100.

The minimum film-forming temperature of the resin emulsion is preferably not less than 10° C., more preferably not less than 0° C. from the viewpoint of increase in film-forming property. The minimum film-forming temperature of the resin emulsion can be controlled by, for example, adjusting the glass transition temperature of the whole of the emulsion particles or the glass transition temperature of the outermost layer.

Incidentally, the minimum film-forming temperature of the resin emulsion for a sealer in the present specification is determined by placing a glass plate on a thermal gradient tester, applying a resin emulsion onto the glass plate to form a film having a thickness of 0.2 mm by means of an applicator, drying the film, and measuring a temperature of the film when a crack is generated in the film, and the temperature is regarded as a minimum film-forming temperature.

The content of a nonvolatile component of the resin emulsion in the coating composition for a sealer of the present invention is preferably not less than 10% by weight from the viewpoint of improvement in film-forming property, water permeability resistance of a coated film and frost damage resistance, and the content of the nonvolatile component of the resin emulsion in the coating composition for a sealer is preferably not more than 35% by weight, more preferably not more than 30% by weight, still more preferably not more than 25% by weight, particularly preferably not more than 20% by weight from the viewpoint of improvement in strength of a coated film.

The pigment used in the coating composition for a sealer of the present invention include an organic pigment and an inorganic pigment, and these pigments may be used alone, respectively, or at least 2 kinds thereof may be used jointly.

The organic pigment includes, for example, azo pigments, azomethine pigments, methine pigments, anthraquinone pigments, phthalocyanine pigments, perinone pigments, perylene pigments, diketo-pyrrolo-pyrrole pigments, thioindigo pigments, iminoisoindoline pigments, imino-isoindolinone pigments, quinacridone pigments such as quinacridone red and quinacridone violet, flavanthrone pigments, indanthrone pigments, anthrapyrimidine pigments, carbazole pigments, monoarylide yellow, diarylide yellow, benzimidazolone yellow, tolyl orange, naphthol orange, quinophthalone pigments and the like, and the present invention is not limited only to those exemplified ones. These organic pigments may be used alone, respectively, or at least 2 kinds thereof may be used jointly.

The inorganic pigment includes, for example, titanium dioxide, red iron oxide, black iron oxide, iron oxide, chrome oxide green, carbon black, ferric ferrocyanide (Prussian blue), ultramarine, lead chromate, and the like, and further includes, pigments having a squamous shape such as mica, clay, aluminum powder, talc and aluminum silicate, extender pigments such as calcium carbonate, magnesium hydroxide, aluminum hydroxide, barium sulfate and magnesium carbonate, and the like, and the present invention is not limited only to those exemplified ones. These inorganic pigments may be used alone, respectively, or at least 2 kinds thereof may be used jointly.

Among the pigments, the extender pigment is preferred, and calcium carbonate is more preferred from the viewpoint of economical efficiency.

The amount of the pigment per 100 parts by weight of the nonvolatile component of the resin emulsion is not less than 185 parts by weight, preferably not less than 233 parts by weight, still more preferably not less than 300 parts by weight, particularly preferably not less than 400 parts by weight from the viewpoint of improvement in strength of a coated film and economical efficiency, and the amount of the pigment per 100 parts by weight of the nonvolatile component of the resin emulsion is not more than 900 parts by weight from the viewpoint of improvement in film-forming property, water permeability resistance of a coated film and frost damage resistance.

One of the great features of the coating composition for a sealer of the present invention resides in that the coating composition contains a rheology control agent. In the coating composition for a sealer of the present invention, the rheology control agent is used together with a resin emulsion and a high-content pigment, and the interaction between these components is increased. Therefore, a coating composition for a sealer having stable thixotropic viscosity and Newtonian viscosity is obtained.

Accordingly, since the viscosity of this coating composition for a sealer is lowered by a high shearing force when the coating composition is applied to a substrate having a rugged surface, the coatability of the coating composition is improved, and the viscosity of the coating composition is recovered after the coating composition is applied to a substrate, so that this coating composition for a sealer is less likely to remain in the recess portion, whereby a coated film having no spots is formed.

Incidentally, the thixotropic viscosity and Newtonian viscosity can be expressed by a ratio of a viscosity at a high shearing force to a viscosity at a low shearing force. The thixotropic viscosity and Newtonian viscosity can be determined by measuring the viscosity of a coating composition for a sealer at 25° C. with a B-type viscometer commercially available from, for example, Tokyo Keiki Inc. When the ratio of a viscosity at a rotational speed of 2 $min^{-1}$ to a viscosity at a rotational speed of 20 $min^{-1}$ (a viscosity at a rotational speed of 2 $min^{-1}$/a viscosity at a rotational speed of 20 $min^{-1}$) is from 3.5 to 7, the coating composition is said to have a thixotropic viscosity, and when the ratio is from 1 to 2.5, the coating composition is said to have a Newtonian viscosity.

As a rheology control agent, there can be used an agent which increases or decreases a viscosity of a system in which the rheology control agent is used. The rheology control agent includes, for example, inorganic rheology control agents such as silicates such as water-soluble aluminum silicate, montmorillonite, an organic montmorillonite and colloidal alumina; cellulose rheology control agents such as carboxyl methyl cellulose, methyl cellulose and hydroxyethyl cellulose; protein rheology control agents such as casein, sodium caseinate and ammonium caseinate; alginic acid rheology control agents such as sodium alginate; polyvinyl rheology control agents such as polyvinyl alcohol, a polyvinylpyrrolidone and a polyvinyl-benzyl ether copolymer; polyacrylic acid rheology control agents such as sodium polyacrylate and alkali-soluble poly(meth) acrylic acid-(meth)acrylate copolymer; polyether rheology control agents such as pluronic polyether, polyether dialkyl ester, polyether dialkyl ether, a polyether-urethane-associated modified product and a polyether-epoxy modified product; maleic anhydride copolymer rheology control agents such as a partial ester of vinyl methyl ether-maleic anhydride copolymer, a half ester of a reaction product of a drying oil fatty acid allyl alcohol ester and maleic anhydride; acetylene glycol, xanthan gum, zantan gum, starch, and the like, and the present invention is not limited only to those exemplified ones.

The cellulose rheology control agent is readily commercially available, and includes, for example, SP-800 and SP-850, each of which is a trade name commercially available from DAICEL CHEMICAL INDUSTRIES LTD. and the like, and the present invention is not limited only to those exemplified ones. The alkali-soluble rheology control agent is commercially readily available, and includes, for example, ACRYSET WR-507 and ACRYSET WR-650, each of which is a trade name commercially available from NIPPON SHOKUBAI Co., Ltd., and the like, and the present invention is not limited only to those exemplified ones. The urethane-associated rheology control agent is commercially readily available. The urethane-associated rheology control agent includes, for example, ADEKANOL UH-420, ADEKANOL UH-438 and ADEKANOL UH-450VF, each of which is a trade name commercially available from ADEKA CORPORATION, and the like, and the present invention is not limited only to those exemplified ones. These rheology control agents may be used alone, respectively, or at least 2 kinds thereof may be used jointly.

Among the above-mentioned rheology control agents, the cellulose rheology control agent and the urethane-associated rheology control agent are preferred; the cellulose rheology control agent is more preferred; and hydroxyethyl cellulose is still more preferred from the viewpoint of imparting appropriate viscosity to the coating composition for a sealer and thereby imparting a suitable viscosity at the time of spraying or coating with a mastic roller.

The effective dose of the rheology control agent per 100 parts by weight of the nonvolatile component of the resin emulsion is not less than 0.01 parts by weight from the viewpoint of imparting stable thixotropic viscosity and Newtonian viscosity to the coating composition for a sealer, and the effective dose of the rheology control agent per 100 parts by weight of the nonvolatile component of the resin emulsion is not more than 5 parts by weight, preferably not more than 1 part by weight from the viewpoint of improvement in water permeability resistance of a coated film and frost damage resistance.

The coating composition for a sealer of the present invention can be easily prepared by mixing the resin emulsion, the pigment and the rheology control agent.

The coating composition for a sealer of the present invention obtained above is excellent in frost damage resistance, water permeability resistance of a coated film and strength of a coated film. Therefore, the coating composition is useful in, for example, a sealer for use on the exterior of a building and a filler having a microelasticity, and the like.

Representative examples of the material which constitutes the exterior of a building include an inorganic building material. The inorganic building material includes those exemplified ones mentioned above. Since water is generally easily likely to permeate into an internal of the inorganic building material, the inorganic building material has a property such that the inorganic building material is more likely to deteriorate. Therefore, an undercoat material, which is currently called as a sealer, is applied to the surface and the back surface of an inorganic building material. In order to give a desired design, a top coat is usually applied to the surface of the inorganic building material. Among them, the coating composition for a sealer of the present invention can be suitably used for an undercoat material.

EXAMPLES

Next, the present invention is explained more specifically based on working examples. However, the present invention is not limited only to those examples. Incidentally, in the following examples, the term "part(s)" means "part(s) by weight", and the term "%" means "% by weight" unless otherwise noted.

[The first aspect of the invention]
(1) Examples and Comparative Examples of Resin Emulsions for a Sealer

Example 1

A flask equipped with a dropping funnel, a stirrer, a nitrogen gas inlet pipe, a thermometer and a reflux condenser was charged with 800 parts of deionized water.

The dropping funnel was charged with 145 parts of deionized water, 60 parts of 25% aqueous solution of an emulsifier commercially available from Dai-Ichi Kogyo Seiyaku Co., Ltd. under the trade name of Aqualon HS-10, 50 parts of 2-ethylhexyl acrylate, 440 parts of styrene and 10 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 43 parts of 3.5% aqueous solution of ammonium persulfate and 30 parts of 2.5% aqueous solution of sodium hydrogensulfite were added dropwise to the flask over 120 minutes. After the completion of the dropwise addition, the temperature of the mixture was maintained at 80° C. for 60 minutes.

Thereafter, a second-step pre-emulsion prepared from 145 parts of deionized water, 60 parts of 25% aqueous solution of an emulsifier commercially available from Dai-Ichi Kogyo Seiyaku Co., Ltd. under the trade name of Aqualon HS-10, 160 parts of 2-ethylhexyl acrylate, 125 parts of methyl methacrylate, 160 parts of styrene and 55 parts of acrylic acid, 43 parts of 3.5% aqueous solution of ammonium persulfate and 30 parts of 2.5% aqueous solution of sodium hydrogensulfite were added dropwise to the flask over 120 minutes. After completion of the dropwise addition, the temperature of the mixture was maintained at 80° C. for 120 minutes, and the pH of the mixture in the flask, which was determined at 23° C. by using a pH meter commercially available from HORIBA, Ltd. under the product number of F-23 (hereinafter referred to the same), was controlled to 8 by adding 25% aqueous ammonia to the mixture, to complete the emulsion polymerization reaction. The resulting reaction mixture was cooled to room temperature, and thereafter, filtrated with a 300-mesh (JIS mesh, hereinafter referred to the same) metal screen, to give a resin emulsion for a sealer.

The composition of the monomer component used for the resin emulsion for a sealer and properties of the resin emulsion for a sealer are shown in Table 1 and Table 2, respectively.

Example 2

A flask equipped with a dropping funnel, a stirrer, a nitrogen gas inlet pipe, a thermometer and a reflux condenser was charged with 800 parts of deionized water.

The dropping funnel was charged with 85 parts of deionized water, 40 parts of 25% aqueous solution of an emulsifier commercially available from Dai-Ichi Kogyo Seiyaku Co., Ltd. under the trade name of Aqualon HS-10, 10 parts of 2-ethylhexyl acrylate, 285 parts of styrene and 5 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 29 parts of 3.5% aqueous solution of ammonium persulfate and 20 parts of 2.5% aqueous solution of sodium hydrogensulfite were added dropwise to the flask over 90 minutes. After the completion of the dropwise addition, the temperature of the mixture was maintained at 80° C. for 60 minutes.

Thereafter, a second-step pre-emulsion prepared from 205 parts of deionized water, 80 parts of 25% aqueous solution of an emulsifier commercially available from Dai-Ichi Kogyo Seiyaku Co., Ltd. under the trade name of Aqualon HS-10, 190 parts of 2-ethylhexyl acrylate, 435 parts of styrene, 40 parts of acrylic acid and 35 parts of methacrylic acid, 57 parts of 3.5% aqueous solution of ammonium persulfate and 40 parts of 2.5% aqueous solution of sodium hydrogensulfite were added dropwise to the flask over 150 minutes. After completion of the dropwise addition, the temperature of the mixture was maintained at 80° C. for 120 minutes, and the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 1 and Table 2, respectively.

Example 3

A flask equipped with a dropping funnel, a stirrer, a nitrogen gas inlet pipe, a thermometer and a reflux condenser was charged with 800 parts of deionized water.

The dropping funnel was charged with 205 parts of deionized water, 80 parts of 25% aqueous solution of an emulsifier commercially available from Dai-Ichi Kogyo Seiyaku Co., Ltd. under the trade name of Aqualon HS-10, 20 parts of 2-ethylhexyl acrylate, 665 parts of styrene and 15 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 57 parts of 3.5% aqueous solution of ammonium persulfate and 40 parts of 2.5% aqueous solution of sodium hydrogensulfite were added dropwise to the flask over 150 minutes. After the completion of the dropwise addition, the temperature of the mixture was maintained at 80° C. for 60 minutes.

Thereafter, a second-step pre-emulsion prepared from 85 parts of deionized water, 40 parts of 25% aqueous solution of an emulsifier commercially available from Dai-Ichi Kogyo Seiyaku Co., Ltd. under the trade name of Aqualon HS-10, 150 parts of 2-ethylhexyl acrylate, 110 parts of styrene and 40 parts of acrylic acid, 29 parts of 3.5% aqueous solution of ammonium persulfate and 20 parts of 2.5% aqueous solution of sodium hydrogensulfite were added dropwise to the flask over 90 minutes. After completion of the dropwise addition, the temperature of the mixture was maintained at 80° C. for 120 minutes, and the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 1 and Table 2, respectively.

Examples 4 and 5

Resin emulsions for a sealer were prepared in the same manner as in Example 1, except that the monomer component used in Example 1 was changed to the monomer component as shown in Table 1. The composition of each monomer component used for the resin emulsion for a sealer and properties of each resin emulsion for a sealer are shown in Table 1 and Table 2, respectively.

Example 6

A resin emulsion for a sealer was prepared in the same manner as in Example 3, except that the monomer component used in Example 3 was changed to the monomer component as shown in Table 1. The composition of the monomer component used for the resin emulsion for a sealer and properties of the resin emulsion for a sealer are shown in Table 1 and Table 2, respectively.

Example 7

A flask equipped with a dropping funnel, a stirrer, a nitrogen gas inlet pipe, a thermometer and a reflux condenser was charged with 800 parts of deionized water.

The dropping funnel was charged with 100 parts of deionized water, 40 parts of 25% aqueous solution of an emulsifier commercially available from Dai-Ichi Kogyo Seiyaku Co., Ltd. under the trade name of Aqualon HS-10, 10 parts of 2-ethylhexyl acrylate, 10 parts of methyl methacrylate, 315 parts of styrene and 5 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 29 parts of 3.5% aqueous solution of ammonium persulfate and 20 parts of 2.5% aqueous solution of sodium hydrogensulfite were added dropwise to the flask over 90 minutes. After the completion of the dropwise addition, the temperature of the mixture was maintained at 80° C. for 60 minutes.

Thereafter, a second-step pre-emulsion prepared from 100 parts of deionized water, 40 parts of 25% aqueous solution of an emulsifier commercially available from Dai-Ichi Kogyo Seiyaku Co., Ltd. under the trade name of Aqualon HS-10, 125 parts of 2-ethylhexyl acrylate, 200 parts of styrene and 5 parts of acrylic acid, 29 parts of 3.5% aqueous solution of ammonium persulfate and 20 parts of 2.5% aqueous solution of sodium hydrogensulfite were added dropwise to the flask over 90 minutes. After completion of the dropwise addition, the temperature of the mixture was maintained at 80° C. for 60 minutes.

Next, a third-step pre-emulsion prepared from 100 parts of deionized water, 40 parts of 25% aqueous solution of an emulsifier commercially available from Dai-Ichi Kogyo Seiyaku Co., Ltd. under the trade name of Aqualon HS-10, 100 parts of 2-ethylhexyl acrylate, 190 parts of styrene and 40 parts of acrylic acid, 29 parts of 3.5% aqueous solution of ammonium persulfate and 20 parts of 2.5% aqueous solution of sodium hydrogensulfite were added dropwise to the flask over 90 minutes. After completion of the dropwise addition, the temperature of the mixture was maintained at 80° C. for 120 minutes.

Next, the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 1 and Table 2, respectively.

Examples 8 and 9

Resin emulsions for a sealer were prepared in the same manner as in Example 7, except that the monomer component used in Example 7 was changed to the monomer component as shown in Table 1. The composition of each monomer component used for the resin emulsion for a sealer and properties of each resin emulsion for a sealer are shown in Table 1 and Table 2, respectively.

Example 10

A flask equipped with a dropping funnel, a stirrer, a nitrogen gas inlet pipe, a thermometer and a reflux condenser was charged with 800 parts of deionized water.

The dropping funnel was charged with 70 parts of deionized water, 40 parts of 25% aqueous solution of an emulsifier commercially available from Dai-Ichi Kogyo Seiyaku Co., Ltd. under the trade name of Aqualon HS-10, 245 parts of styrene and 5 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 29 parts of 3.5% aqueous solution of ammonium persulfate and 20 parts of 2.5% aqueous solution of sodium hydrogensulfite were added dropwise to the flask over 60 minutes. After the completion of the dropwise addition, the temperature of the mixture was maintained at 80° C. for 60 minutes.

Thereafter, a second-step pre-emulsion prepared from 140 parts of deionized water, 40 parts of 25% aqueous solution of an emulsifier commercially available from Dai-Ichi Kogyo Seiyaku Co., Ltd. under the trade name of Aqualon HS-10, 145 parts of 2-ethylhexyl acrylate, 300 parts of styrene and 5 parts of acrylic acid, 29 parts of 3.5% aqueous solution of ammonium persulfate and 20 parts of 2.5% aqueous solution of sodium hydrogensulfite were added dropwise to the flask over 120 minutes. After completion of the dropwise addition, the temperature of the mixture was maintained at 80° C. for 60 minutes.

Next, a third-step pre-emulsion prepared from 85 parts of deionized water, 40 parts of 25% aqueous solution of an emulsifier commercially available from Dai-Ichi Kogyo Seiyaku Co., Ltd. under the trade name of Aqualon HS-10, 95 parts of 2-ethylhexyl acrylate, 170 parts of styrene and 35 parts of acrylic acid, 29 parts of 3.5% aqueous solution of ammonium persulfate and 20 parts of 2.5% aqueous solution of sodium hydrogensulfite were added dropwise to the flask over 90 minutes. After completion of the dropwise addition, the temperature of the mixture was maintained at 80° C. for 120 minutes.

Thereafter, the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 1 and Table 2, respectively.

Examples 11 to 18

Resin emulsions for a sealer were prepared in the same manner as in Example 7, except that the monomer component used in Example 7 was changed to the monomer component as shown in Table 1. The composition of each monomer component used for the resin emulsion for a sealer and properties of each resin emulsion for a sealer are shown in Table 1 and Table 2, respectively.

Incidentally, abbreviations listed in the following tables mean the followings:
[Meaning of Abbreviations Listed in the Tables]
St: styrene
2EHA: 2-ethylhexyl acrylate
AA: acrylic acid
MMA: methyl methacrylate
BA: butyl acrylate
MAA: methacrylic acid
HEMA: hydroxyethyl methacrylate
TMSMA: gamma-methacryloxypropyltrimethoxysilane In addition, the terms listed in the tables mean the followings:
[Amount of St in Inner Layer]
Content (%) of styrene in the monomer component A used as a raw material of an inner layer
[Amount of Carboxylic Acid in Outer Layer]
Content (%) of a carboxyl group-containing monomer in the monomer component B used as a raw material of an outer layer
[Ratio of Each Layer]
Weight ratio of the polymer (I) which constitutes the inner layer to the polymer (II) which constitutes the outer layer [polymer (I)/polymer (II)]
[Total Amount of Inner and Outer Layers]
Total content (%) of the polymer (I) and the polymer (II) in the emulsion particle
[Tg of Outer Layer]
Glass transition temperature (° C.) of the polymer (II) which constitutes the outer layer
[Total Amount of St]
Content (%) of styrene in the total monomer components used as a raw material for the polymer which constitutes the emulsion particle
[Total Tg]
Glass transition temperature (° C.) of an emulsion particle
[MFT]
Minimum film-forming temperature (° C.) of a resin emulsion for a sealer
[Amount of Nonvolatile Component]
Content (% by mass) of a nonvolatile component in a resin emulsion
[Average Particle Diameter]
Average particle diameter (nm) of emulsion particles In the following tables, Layer 1 to Layer 5 show a polymerization order. Incidentally, the mark "-" which is used in the monomer component of the table means that the monomer is not used.

TABLE 1

| | | | Example No. | | | | | | | | | |
|---|---|---|---|---|---|---|---|---|---|---|---|---|
| | | | 1 | 2 | 3 | 4 | 5 | 6 | 7 | 8 | 9 | 10 |
| Composition of each layer (parts) | Layer 1 | St | — | — | — | — | — | — | — | — | 200 | — |
| | | 2EHA | — | — | — | — | — | — | — | — | 125 | — |
| | | AA | — | — | — | — | — | — | — | — | 5 | — |
| | Layer 2 (Inner layer) | St | 440 | 285 | 665 | 500 | 440 | 665 | 315 | 315 | 315 | 245 |
| | | MMA | — | — | — | — | — | — | 10 | 10 | 10 | — |
| | | 2EHA | 50 | 10 | 20 | — | 50 | 20 | 10 | 10 | 10 | — |
| | | AA | 10 | 5 | 15 | — | 10 | 15 | 5 | 5 | 5 | 5 |
| | Layer 3 | St | — | — | — | — | — | — | 200 | — | — | 300 |
| | | MMA | — | — | — | — | — | — | — | — | — | — |
| | | BA | — | — | — | — | — | — | — | — | — | — |
| | | 2EHA | — | — | — | — | — | — | 125 | — | — | 145 |
| | | AA | — | — | — | — | — | — | 05 | — | — | 5 |
| | Layer 4 (Outer layer) | AA | 55 | 40 | 40 | 55 | 35 | 40 | 40 | 40 | 40 | — |
| | | MAA | — | 35 | — | — | — | 25 | — | — | — | 35 |
| | | St | 160 | 435 | 110 | 160 | 160 | 80 | 190 | 190 | 190 | 170 |
| | | MMA | 125 | — | — | 125 | 145 | — | — | — | — | — |
| | | BA | — | — | — | — | — | — | — | — | — | — |
| | | 2EHA | 160 | 190 | 150 | 160 | 160 | 155 | 100 | 100 | 100 | 95 |
| | | HEMA | — | — | — | — | — | — | — | — | — | — |
| | | TMSMA | — | — | — | — | — | — | — | — | — | — |
| | Layer 5 | St | — | — | — | — | — | — | — | 200 | — | — |
| | | 2EHA | — | — | — | — | — | — | — | 125 | — | — |
| | | AA | — | — | — | — | — | — | — | 5 | — | — |

TABLE 1-continued

|  |  |  | Example No. | | | | | | | |
|---|---|---|---|---|---|---|---|---|---|---|
|  |  |  | 11 | 12 | 13 | 14 | 15 | 16 | 17 | 18 |
| Composition of each layer (parts) | Layer 1 | St | — | — | — | — | — | — | — | — |
|  |  | 2EHA | — | — | — | — | — | — | — | — |
|  |  | AA | — | — | — | — | — | — | — | — |
|  | Layer 2 (Inner layer) | St | 340 | 290 | 315 | 290 | 315 | 315 | 315 | 315 |
|  |  | MMA | — | 45 | 10 | 35 | 10 | 10 | 10 | 10 |
|  |  | 2EHA | — | — | 10 | 10 | 10 | 10 | 10 | 10 |
|  |  | AA | — | 5 | 5 | 5 | 5 | 5 | 5 | 5 |
|  | Layer 3 | St | 225 | 225 | 135 | — | 225 | 225 | 225 | 225 |
|  |  | MMA | — | — | 90 | 215 | — | — | — | — |
|  |  | BA | — | — | — | 60 | — | — | — | — |
|  |  | 2EHA | 100 | 100 | 100 | 50 | 100 | 100 | 100 | 100 |
|  |  | AA | 5 | 5 | 5 | 5 | 5 | 5 | 5 | 5 |
|  | Layer 4 (Outer layer) | AA | 40 | 40 | 40 | 40 | 40 | 40 | 40 | 40 |
|  |  | MAA | — | — | — | — | — | — | — | — |
|  |  | St | 190 | 190 | 100 | — | 135 | 160 | 210 | 175 |
|  |  | MMA | — | — | 90 | 180 | — | — | — | — |
|  |  | BA | — | — | — | 60 | — | — | — | — |
|  |  | 2EHA | 100 | 100 | 100 | 50 | 155 | 130 | 80 | 95 |
|  |  | HEMA | — | — | — | — | — | — | — | 10 |
|  |  | TMSMA | — | — | — | — | — | — | — | 10 |
|  | Layer 5 | St | — | — | — | — | — | — | — | — |
|  |  | 2EHA | — | — | — | — | — | — | — | — |
|  |  | AA | — | — | — | — | — | — | — | — |

TABLE 2

|  |  | Example No. | | | | | | | | | |
|---|---|---|---|---|---|---|---|---|---|---|---|
|  |  | 1 | 2 | 3 | 4 | 5 | 6 | 7 | 8 | 9 | 10 |
| Properties of resin emulsion | Number of layer | 2 | 2 | 2 | 2 | 2 | 2 | 3 | 3 | 3 | 3 |
|  | Amount of St in inner layer (%) | 88 | 95 | 95 | 100 | 88 | 95 | 93 | 93 | 93 | 98 |
|  | Amount of carboxylic acid in outer layer (%) | 11.0 | 10.7 | 13.3 | 11.0 | 7.0 | 21.7 | 12.1 | 12.1 | 12.1 | 11.7 |
|  | Ratio of each layer (inner layer/outer layer) (weight ratio) | 50/50 | 30/70 | 70/30 | 50/50 | 50/50 | 70/30 | 34/33/33 | 34/33/33 | 33/34/33 | 24/45/30 |
|  | Total amount of inner and outer layers (%) | 100 | 100 | 100 | 100 | 100 | 100 | 67 | 67 | 67 | 55 |
|  | Tg of outer layer (° C.) | 21 | 32 | −11 | 21 | 21 | −12 | 24 | 24 | 24 | 21 |
|  | Total amount of St (%) | 60 | 72 | 78 | 66 | 60 | 75 | 71 | 71 | 71 | 72 |
|  | Total Tg (° C.) | 44 | 47 | 53 | 56 | 44 | 53 | 38 | 38 | 38 | 37 |
|  | MFT (° C.) | 45 | 55 | 26 | 45 | 47 | 22 | 45 | 40 | 65 | 46 |
|  | Amount of nonvolatile component (% by mass) | 43 | 43 | 43 | 43 | 43 | 43 | 43 | 43 | 43 | 43 |
|  | Average particle diameter (nm) | 170 | 170 | 170 | 170 | 170 | 170 | 170 | 170 | 170 | 170 |

|  |  | Example No. | | | | | | | |
|---|---|---|---|---|---|---|---|---|---|
|  |  | 11 | 12 | 13 | 14 | 15 | 16 | 17 | 18 |
| Properties of resin emulsion | Number of layer | 3 | 3 | 3 | 3 | 3 | 3 | 3 | 3 |
|  | Amount of St in inner layer (%) | 100 | 85 | 93 | 85 | 93 | 93 | 93 | 93 |
|  | Amount of carboxylic acid in outer layer (%) | 12.1 | 12.1 | 12.1 | 12.1 | 12.1 | 12.1 | 12.1 | 12.9 |
|  | Ratio of each layer (inner layer/outer layer) (weight ratio) | 34/33/33 | 34/33/33 | 34/33/33 | 34/33/33 | 34/33/33 | 34/33/33 | 34/33/33 | 34/33/33 |
|  | Total amount of inner and outer layers (%) | 67 | 67 | 67 | 67 | 67 | 67 | 67 | 67 |
|  | Tg of outer layer (° C.) | 24 | 24 | 25 | 25 | −6 | 7 | 36 | 25 |
|  | Total amount of St (%) | 76 | 71 | 55 | 29 | 68 | 70 | 75 | 72 |
|  | Total Tg (° C.) | 46 | 46 | 45 | 45 | 32 | 38 | 48 | 45 |
|  | MFT (° C.) | 45 | 55 | 50 | 50 | 17 | 30 | 55 | 50 |
|  | Amount of nonvolatile component (% by mass) | 43 | 43 | 43 | 43 | 43 | 43 | 43 | 43 |
|  | Average particle diameter (nm) | 170 | 170 | 170 | 170 | 170 | 170 | 170 | 170 |

Comparative Example 1

A flask equipped with a dropping funnel, a stirrer, a nitrogen gas inlet pipe, a thermometer and a reflux condenser was charged with 800 parts of deionized water.

The dropping funnel was charged with 290 parts of deionized water, 120 parts of 25% aqueous solution of an emulsifier commercially available from Dai-Ichi Kogyo Seiyaku Co., Ltd. under the trade name of Aqualon HS-10, 130 parts of 2-ethylhexyl acrylate, 50 parts of methyl methacrylate, 800 parts of styrene and 20 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 86 parts of 3.5% aqueous solution of ammonium persulfate and 60 parts of 2.5% aqueous solution of sodium hydrogensulfite were added dropwise to the flask over 240 minutes. After the completion of the dropwise addition, the temperature of the mixture was maintained at 80° C. for 120 minutes. Thereafter, the pH of the mixture in the flask was controlled to 8 by adding 25% aqueous ammonia to the mixture, to complete the emulsion polymerization reaction.

The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 3 and Table 4, respectively.

Comparative Examples 2 and 3

Resin emulsions for a sealer were prepared in the same manner as in Comparative Example 1, except that the monomer component used in Comparative Example 1 was changed to the monomer component as shown in Table 3. The composition of each monomer component used for the resin emulsion for a sealer and properties of each resin emulsion for a sealer are shown in Table 3 and Table 4, respectively.

Comparative Examples 4 and 5

Resin emulsions for a sealer were prepared in the same manner as in Example 1, except that the monomer component used in Example 1 was changed to the monomer component as shown in Table 3. The composition of each monomer component used for the resin emulsion for a sealer and properties of each resin emulsion for a sealer are shown in Table 3 and Table 4, respectively.

Comparative Example 6

A flask equipped with a dropping funnel, a stirrer, a nitrogen gas inlet pipe, a thermometer and a reflux condenser was charged with 800 parts of deionized water.

The dropping funnel was charged with 245 parts of deionized water, 80 parts of 25% aqueous solution of an emulsifier commercially available from Dai-Ichi Kogyo Seiyaku Co., Ltd. under the trade name of Aqualon HS-10, 50 parts of 2-ethylhexyl acrylate, 30 parts of methyl methacrylate, 700 parts of styrene and 20 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 69 parts of 3.5% aqueous solution of ammonium persulfate and 48 parts of 2.5% aqueous solution of sodium hydrogensulfite were added dropwise to the flask over 180 minutes. After the completion of the dropwise addition, the temperature of the mixture was maintained at 80° C. for 60 minutes.

Thereafter, a second-step pre-emulsion prepared from 60 parts of deionized water, 40 parts of 25% aqueous solution of an emulsifier commercially available from Dai-Ichi Kogyo Seiyaku Co., Ltd. under the trade name of Aqualon HS-10, 100 parts of 2-ethylhexyl acrylate, 30 parts of methyl methacrylate, 50 parts of styrene and 20 parts of acrylic acid, 17 parts of 3.5% aqueous solution of ammonium persulfate and 12 parts of 2.5% aqueous solution of sodium hydrogensulfite were added dropwise to the flask over 60 minutes. After completion of the dropwise addition, the temperature of the mixture was maintained at 80° C. for 120 minutes, and the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 3 and Table 4, respectively.

Comparative Examples 7 to 9

Resin emulsions for a sealer were prepared in the same manner as in Example 1, except that the monomer component used in Example 1 was changed to the monomer component as shown in Table 3. The composition of each monomer component used for the resin emulsion for a sealer and properties of each resin emulsion for a sealer are shown in Table 3 and Table 4, respectively.

Comparative Example 10

A flask equipped with a dropping funnel, a stirrer, a nitrogen gas inlet pipe, a thermometer and a reflux condenser was charged with 800 parts of deionized water.

The dropping funnel was charged with 60 parts of deionized water, 40 parts of 25% aqueous solution of an emulsifier commercially available from Dai-Ichi Kogyo Seiyaku Co., Ltd. under the trade name of Aqualon HS-10, 20 parts of 2-ethylhexyl acrylate, 175 parts of styrene and 5 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 17 parts of 3.5% aqueous solution of ammonium persulfate and 12 parts of 2.5% aqueous solution of sodium hydrogensulfite were added dropwise to the flask over 60 minutes. After the completion of the dropwise addition, the temperature of the mixture was maintained at 80° C. for 60 minutes.

Thereafter, a second-step pre-emulsion prepared from 245 parts of deionized water, 80 parts of 25% aqueous solution of an emulsifier commercially available from Dai-Ichi Kogyo Seiyaku Co., Ltd. under the trade name of Aqualon HS-10, 257 parts of 2-ethylhexyl acrylate, 30 parts of methyl methacrylate, 425 parts of styrene, 55 parts of acrylic acid and 33 parts of methacrylic acid, 69 parts of 3.5% aqueous solution of ammonium persulfate and 48 parts of 2.5% aqueous solution of sodium hydrogensulfite were added dropwise to the flask over 180 minutes. After completion of the dropwise addition, the temperature of the mixture was maintained at 80° C. for 120 minutes, and the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 3 and Table 4, respectively.

Comparative Example 11

A flask equipped with a dropping funnel, a stirrer, a nitrogen gas inlet pipe, a thermometer and a reflux condenser was charged with 800 parts of deionized water.

The dropping funnel was charged with 60 parts of deionized water, 40 parts of 25% aqueous solution of an emulsifier commercially available from Dai-Ichi Kogyo Seiyaku Co., Ltd. under the trade name of Aqualon HS-10, 15 parts of 2-ethylhexyl acrylate, 180 parts of styrene and 5 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 17 parts of 3.5% aqueous solution of ammonium persulfate and 12 parts of 2.5% aqueous solution of sodium hydrogensulfite were added dropwise to the flask over 60 minutes. After the completion of the dropwise addition, the temperature of the mixture was maintained at 80° C. for 60 minutes.

Thereafter, a second-step pre-emulsion prepared from 195 parts of deionized water, 40 parts of 25% aqueous solution of an emulsifier commercially available from Dai-Ichi Kogyo Seiyaku Co., Ltd. under the trade name of Aqualon HS-10, 280 parts of 2-ethylhexyl acrylate, 310 parts of styrene and 10 parts of acrylic acid, 49 parts of 3.5% aqueous solution of ammonium persulfate and 38 parts of 2.5% aqueous solution of sodium hydrogensulfite were added dropwise to the flask over 120 minutes. After completion of the dropwise addition, the temperature of the mixture was maintained at 80° C. for 60 minutes.

Next, a third-step pre-emulsion prepared from 60 parts of deionized water, 40 parts of 25% aqueous solution of an emulsifier commercially available from Dai-Ichi Kogyo Seiyaku Co., Ltd. under the trade name of Aqualon HS-10, 130 parts of 2-ethylhexyl acrylate, 50 parts of styrene and 20 parts of acrylic acid, 20 parts of 3.5% aqueous solution of ammonium persulfate and 10 parts of 2.5% aqueous solution of sodium hydrogensulfite were added dropwise to the flask over 60 minutes. After completion of the dropwise addition, the temperature of the mixture was maintained at 80° C. for 120 minutes.

Thereafter, the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 3 and Table 4, respectively.

Comparative Example 12

A flask equipped with a dropping funnel, a stirrer, a nitrogen gas inlet pipe, a thermometer and a reflux condenser was charged with 800 parts of deionized water.

The dropping funnel was charged with 30 parts of deionized water, 20 parts of 25% aqueous solution of an emulsifier commercially available from Dai-Ichi Kogyo Seiyaku Co., Ltd. under the trade name of Aqualon HS-10, 15 parts of 2-ethylhexyl acrylate, 80 parts of styrene and 5 parts of acrylic acid, to prepare a pre-emulsion for dropping.

The obtained pre-emulsion for dropping n in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 9 parts of 3.5% aqueous solution of ammonium persulfate and 6 parts of 2.5% aqueous solution of sodium hydrogensulfite were added dropwise to the flask over 30 minutes. After the completion of the dropwise addition, the temperature of the mixture was maintained at 80° C. for 60 minutes.

Thereafter, a second-step pre-emulsion prepared from 100 parts of deionized water, 40 parts of 25% aqueous solution of an emulsifier commercially available from Dai-Ichi Kogyo Seiyaku Co., Ltd. under the trade name of Aqualon HS-10, 155 parts of 2-ethylhexyl acrylate, 115 parts of styrene and 30 parts of acrylic acid, 26 parts of 3.5% aqueous solution of ammonium persulfate and 18 parts of 2.5% aqueous solution of sodium hydrogensulfite were added dropwise to the flask over 90 minutes. After completion of the dropwise addition, the temperature of the mixture was maintained at 80° C. for 60 minutes.

Next, a third-step pre-emulsion prepared from 180 parts of deionized water, 60 parts of 25% aqueous solution of an emulsifier commercially available from Dai-Ichi Kogyo Seiyaku Co., Ltd. under the trade name of Aqualon HS-10, 90 parts of 2-ethylhexyl acrylate, 505 parts of styrene and 5 parts of acrylic acid, 52 parts of 3.5% aqueous solution of ammonium persulfate and 36 parts of 2.5% aqueous solution of sodium hydrogensulfite were added dropwise to the flask over 120 minutes. After completion of the dropwise addition, the temperature of the mixture was maintained at 80° C. for 120 minutes.

Thereafter, the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 3 and Table 4, respectively.

Comparative Examples 13 to 15

Resin emulsions for a sealer were prepared in the same manner as in Example 7, except that the monomer component used in Example 7 was changed to the monomer component as shown in Table 3. The composition of each monomer component used for the resin emulsion for a sealer and properties of each resin emulsion for a sealer are shown in Table 3 and Table 4, respectively.

Comparative Example 16

A flask equipped with a dropping funnel, a stirrer, a nitrogen gas inlet pipe, a thermometer and a reflux condenser was charged with 800 parts of deionized water.

The dropping funnel was charged with 35 parts of deionized water, 20 parts of 25% aqueous solution of an emulsifier commercially available from Dai-Ichi Kogyo Seiyaku Co., Ltd. under the trade name of Aqualon HS-10, 4 parts of 2-ethylhexyl acrylate, 4 parts of methyl methacrylate, 120 parts of styrene and 2 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 9 parts of 3.5% aqueous solution of ammonium persulfate and 6 parts of 2.5% aqueous solution of sodium hydrogensulfite were added dropwise to the flask over 30 minutes. After the completion of the dropwise addition, the temperature of the mixture was maintained at 80° C. for 60 minutes.

Thereafter, a second-step pre-emulsion prepared from 95 parts of deionized water, 40 parts of 25% aqueous solution of an emulsifier commercially available from Dai-Ichi Kogyo Seiyaku Co., Ltd. under the trade name of Aqualon HS-10, 125 parts of 2-ethylhexyl acrylate, 200 parts of styrene and 5 parts of acrylic acid, 26 parts of 3.5% aqueous solution of ammonium persulfate and 18 parts of 2.5% aqueous solution of sodium hydrogensulfite were added dropwise to the flask over 90 minutes. After completion of the dropwise addition, the temperature of the mixture was maintained at 80° C. for 60 minutes.

Next, a third-step pre-emulsion prepared from 160 parts of deionized water, 60 parts of 25% aqueous solution of an emulsifier commercially available from Dai-Ichi Kogyo Seiyaku Co., Ltd. under the trade name of Aqualon HS-10, 165 parts of 2-ethylhexyl acrylate, 310 parts of styrene and 40 parts of acrylic acid and 25 parts of methacrylic acid, 52 parts of 3.5% aqueous solution of ammonium persulfate and 36 parts of 2.5% aqueous solution of sodium hydrogensulfite were added dropwise to the flask over 120 minutes. After completion of the dropwise addition, the temperature of the mixture was maintained at 80° C. for 120 minutes.

Thereafter, the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 3 and Table 4, respectively.

Comparative Example 17

A flask equipped with a dropping funnel, a stirrer, a nitrogen gas inlet pipe, a thermometer and a reflux condenser was charged with 800 parts of deionized water.

The dropping funnel was charged with 95 parts of deionized water, 40 parts of 25% aqueous solution of an emulsifier commercially available from Dai-Ichi Kogyo Seiyaku Co., Ltd. under the trade name of Aqualon HS-10, 125 parts of 2-ethylhexyl acrylate, 200 parts of styrene and 5 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 25 parts of 3.5% aqueous solution of ammonium persulfate and 18 parts of 2.5% aqueous solution of sodium hydrogensulfite were added dropwise to the flask over 90 minutes. After the completion of the dropwise addition, the temperature of the mixture was maintained at 80° C. for 60 minutes.

Thereafter, a second-step pre-emulsion prepared from 160 parts of deionized water, 60 parts of 25% aqueous solution of an emulsifier commercially available from Dai-Ichi Kogyo Seiyaku Co., Ltd. under the trade name of Aqualon HS-10, 15 parts of 2-ethylhexyl acrylate, 15 parts of methyl methacrylate, 500 parts of styrene and 10 parts of acrylic acid, 52 parts of 3.5% aqueous solution of ammonium persulfate and 36 parts of 2.5% aqueous solution of sodium hydrogensulfite were added dropwise to the flask over 120 minutes. After completion of the dropwise addition, the temperature of the mixture was maintained at 80° C. for 60 minutes.

Next, a third-step pre-emulsion prepared from 35 parts of deionized water, 20 parts of 25% aqueous solution of an emulsifier commercially available from Dai-Ichi Kogyo Seiyaku Co., Ltd. under the trade name of Aqualon HS-10, 40 parts of 2-ethylhexyl acrylate, 74 parts of methyl methacrylate and 16 parts of acrylic acid, 9 parts of 3.5% aqueous solution of ammonium persulfate and 6 parts of 2.5% aqueous solution of sodium hydrogensulfite were added dropwise to the flask over 60 minutes. After completion of the dropwise addition, the temperature of the mixture was maintained at 80° C. for 120 minutes.

Thereafter, the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 3 and Table 4, respectively.

TABLE 3

| | | | Comparative Example No. | | | | | | | | |
|---|---|---|---|---|---|---|---|---|---|---|---|
| | | | 1 | 2 | 3 | 4 | 5 | 6 | 7 | 8 | 9 |
| Composition of each layer (parts) | Layer 1 | St | — | — | — | — | — | — | — | — | — |
| | | 2EHA | — | — | — | — | — | — | — | — | — |
| | | AA | — | — | — | — | — | — | — | — | — |
| | Layer 2 (Inner layer) | St | 800 | 550 | 600 | 440 | 285 | 700 | 350 | 440 | 440 |
| | | MMA | 50 | 40 | 125 | — | — | 30 | 25 | — | — |
| | | BA | — | — | — | — | — | — | 50 | — | — |
| | | 2EHA | 130 | 300 | 210 | 50 | 160 | 50 | — | 50 | 50 |

TABLE 3-continued

|  |  |  |  |  |  |  |  |  |  |  |
|---|---|---|---|---|---|---|---|---|---|---|
|  |  | AA | 20 | 110 | 65 | 10 | 55 | 20 | 25 | 10 | 10 |
|  |  | HEMA | — | — | — | — | — | — | 50 | — | — |
|  | Layer 3 | St | — | — | — | — | — | — | — | — | — |
|  |  | 2EHA | — | — | — | — | — | — | — | — | — |
|  |  | AA | — | — | — | — | — | — | — | — | — |
|  | Layer 4 | AA | — | — | — | 70 | 10 | 20 | 25 | 15 | 55 |
|  | (Outer layer) | MAA | — | — | — | 70 | — | — | — | 10 | — |
|  |  | St | — | — | — | 100 | 440 | 50 | 250 | 160 | 160 |
|  |  | MMA | — | — | — | 100 | — | 30 | 25 | 155 | 190 |
|  |  | BA | — | — | — | — | — | — | 100 | — | — |
|  |  | 2EHA | — | — | — | 160 | 50 | 100 | — | 160 | 95 |
|  |  | HEMA | — | — | — | — | — | — | 100 | — | — |
|  | Layer 5 | St | — | — | — | — | — | — | — | — | — |
|  |  | 2EHA | — | — | — | — | — | — | — | — | — |
|  |  | AA | — | — | — | — | — | — | — | — | — |

|  |  |  | Comparative Example No. | | | | | | | |
|---|---|---|---|---|---|---|---|---|---|---|
|  |  |  | 10 | 11 | 12 | 13 | 14 | 15 | 16 | 17 |
| Composition | Layer 1 | St | — | — | — | — | — | 200 | — | 200 |
| of each layer |  | 2EHA | — | — | — | — | — | 125 | — | 125 |
| (parts) |  | AA | — | — | — | — | — | 5 | — | 5 |
|  | Layer 2 | St | 175 | 180 | 80 | 315 | 315 | 315 | 120 | 500 |
|  | (Inner layer) | MMA | — | 15 | — | 10 | 10 | 10 | 4 | 15 |
|  |  | BA | — | — | — | — | — | — | — | — |
|  |  | 2EHA | 20 | — | 15 | 10 | 10 | 10 | 4 | 15 |
|  |  | AA | 5 | 5 | 5 | 5 | 5 | 5 | 2 | 10 |
|  |  | HEMA | — | — | — | — | — | — | — | — |
|  | Layer 3 | St | — | 310 | — | 200 | 200 | — | 200 | — |
|  |  | 2EHA | — | 280 | — | 125 | 125 | — | 125 | — |
|  |  | AA | — | 10 | — | 5 | 05 | — | 5 | — |
|  | Layer 4 | AA | 55 | 20 | 30 | 40 | 8 | 40 | 40 | 16 |
|  | (Outer layer) | MAA | 33 | — | — | 55 | 8 | — | 25 | — |
|  |  | St | 425 | 50 | 115 | 130 | 214 | 190 | 310 | — |
|  |  | MMA | 30 | — | — | — | — | 40 | — | 74 |
|  |  | BA | — | — | — | — | — | — | — | — |
|  |  | 2EHA | 257 | 130 | 155 | 105 | 100 | 60 | 165 | 40 |
|  |  | HEMA | — | — | — | — | — | — | — | — |
|  | Layer 5 | St | — | 505 | — | — | — | — | — | — |
|  |  | 2EHA | — | 90 | — | — | — | — | — | — |
|  |  | AA | — | 5 | — | — | — | — | — | — |

TABLE 4

|  |  | Comparative Example No. | | | | | | | | | |
|---|---|---|---|---|---|---|---|---|---|---|---|
|  |  | 1 | 2 | 3 | 4 | 5 | 6 | 7 | 8 | 9 | 10 |
| Properties | Number of layer | 1 | 1 | 1 | 2 | 2 | 2 | 2 | 2 | 2 | 2 |
| of resin | Amount of St in inner layer (%) | — | — | — | 88 | 57 | 88 | 70 | 88 | 88 | 88 |
| emulsion | Amount of carboxylic acid in outer layer (%) | — | — | — | 28.0 | 2.0 | 10.0 | 5.0 | 5.0 | 11.0 | 11.0 |
|  | Ratio of each layer (inner layer/outer layer) (weight ratio) | — | — | — | 50/50 | 50/50 | 80/20 | 50/50 | 50/50 | 50/50 | 20/80 |
|  | Total amount of inner and outer layers (%) | — | — | — | 100 | 100 | 100 | 100 | 100 | 100 | 100 |
|  | Tg of outer layer (° C.) | — | — | — | 23 | 71 | −10 | 45 | 22 | 50 | 21 |
|  | Total amount of St (%) | 80 | 55 | 60 | 54 | 73 | 75 | 60 | 60 | 60 | 60 |
|  | Total Tg (° C.) | 63 | 25 | 44 | 45 | 44 | 58 | 57 | 44 | 60 | 29 |
|  | MFT (° C.) | >80 | 48 | 64 | 58 | 91 | 72 | >80 | 48 | >80 | 35 |
|  | Amount of nonvolatile component (% by mass) | 43 | 43 | 43 | 43 | 43 | 43 | 43 | 43 | 43 | 43 |
|  | Average particle diameter (nm) | 170 | 170 | 170 | 170 | 170 | 170 | 170 | 170 | 170 | 170 |

|  |  | Comparative Example No. | | | | | | |
|---|---|---|---|---|---|---|---|---|
|  |  | 11 | 12 | 13 | 14 | 15 | 16 | 17 |
| Properties | Number of layer | 3 | 3 | 3 | 3 | 3 | 3 | 3 |
| of resin | Amount of St in inner layer (%) | 90 | 80 | 93 | 93 | 93 | 92 | 93 |
| emulsion | Amount of carboxylic acid in outer layer (%) | 10.0 | 10.0 | 28.8 | 4.8 | 12.1 | 12.0 | 12.3 |
|  | Ratio of each layer (inner layer/outer layer) (weight ratio) | 20/60/20 | 10/30/60 | 34/33/33 | 34/33/33 | 33/34/33 | 13/33/54 | 33/54/13 |
|  | Total amount of inner and outer layers (%) | 40 | 40 | 67 | 67 | 67 | 67 | 67 |
|  | Tg of outer layer (° C.) | −32 | 58 | 24 | 24 | 50 | 24 | 23 |
|  | Total amount of St (%) | 54 | 70 | 65 | 73 | 71 | 63 | 70 |
|  | Total Tg (° C.) | −5 | 33 | 38 | 38 | 48 | 27 | 51 |

TABLE 4-continued

| MFT (° C.) | <−5 | >80 | 50 | 50 | 65 | 45 | 75 |
|---|---|---|---|---|---|---|---|
| Amount of nonvolatile component (% by mass) | 43 | 43 | 43 | 43 | 43 | 43 | 43 |
| Average particle diameter (nm) | 170 | 170 | 170 | 170 | 170 | 170 | 170 |

Experimental Example

A dispersing agent commercially available from Kao Corporation under the trade name of DEMOL EP in an amount of 60 parts, 50 parts of a dispersing agent commercially available from Dai-Ichi Kogyo Seiyaku Co., Ltd. under the trade name of Discoat N-14, 10 parts of a wetting agent commercially available from Kao Corporation under the trade name of EMULGEN LS-106, 210 parts of deionized water, 200 parts of titanium oxide commercially available from Ishihara Sangyo Kaisha, Ltd. under the product number of CR-97, 600 parts of calcium carbonate commercially available from Takehara Kagaku Kogyo Co., Ltd. under the name of precipitated calcium carbonate, 200 parts of talc commercially available from Nippon Talc Co., Ltd. under the product number of MICROACE S-3, 10 parts of a defoaming agent commercially available from San Nopco Limited under the trade name of Nopco 8034L and 200 parts of glass beads each having a diameter of 1 mm were blended under agitation with a disperser. Thereafter, the resulting mixture was matured with stirring at 3000 min$^{-1}$ for 60 minutes, and filtered with a 100-mesh metal screen, to give a white pigment paste of which content of a nonvolatile component is 75% by mass. Incidentally, the content of the nonvolatile component in the pigment paste was determined in the same manner as in the content of the nonvolatile component in the resin emulsion for a sealer.

While 82 parts of the resin emulsion for a sealer obtained in each working example or each comparative example was dispersing at 1500 min$^{-1}$ with a homo disperser, a mixed solution prepared by mixing 2,2,4-trimethyl-1,3-pentanediol monoisobutylate commercially available from Chisso Corporation under the product number of CS-12 as a film-forming aid with butyl cellosolve in an equal weight was added to the above resin emulsion for a sealer so that its film-forming temperature was controlled to 0 to 5° C., to give a mixture.

To the resulting mixture, 47 parts of the pigment paste obtained in the above was added, and moreover, a proper amount of water for dilution and a proper amount of a defoaming agent (silicone defoaming agent) commercially available from San Nopco Limited under the trade name of SN Defoamer 777 was added so that the content of a nonvolatile component became 50% by mass. Thereafter, a thickener commercially available from NIPPON SHOKUBAI Co., Ltd. under the trade name of ACRYSET WR-503A was added thereto so that the viscosity of the mixture became 1000 mPa-s at a rotational speed of 30 min$^{-1}$ when determined by using a BM-type viscometer commercially available from Tokyo Keiki Inc. The mixture was stirred at this rotational speed for 30 minutes, to give a paint sealer. This paint sealer was allowed to stand at room temperature for 1 day or more.

Next, a flexible board commercially available from Nippon Testpanel Co., Ltd. was coated with this paint sealer in amount of 90 g/m² by means of a sponge roll coater, and dried at 100° C. for 10 minutes by means of a hot air dryer, to give a test panel. The following physical properties were evaluated by using the obtained test panel. The results are shown in Table 5.

<Water Permeability Resistance>

A funnel having a diameter of 10 cm was placed on a coated film formed on a test panel, and their contact portion was sealed with a silicone bath bond commercially available from Konishi Co., Ltd. Thereafter, in accordance with "funnel method" prescribed in JIS K 5400, the reduced amount of water after 24 hours passed was determined, and the water permeability resistance was evaluated in accordance with the following criteria for evaluation.
(Criteria for Evaluation)
⊚: Less than 0.03 mL/cm²
○: Not less than 0.03 mL/cm² and less than 0.05 mL/cm²
Δ: Not less than 0.05 mL/cm² and less than 0.10 mL/cm²
x: Not less than 0.10 mL/cm²

<Blocking Resistance>

Two test panels each having a size of 7 cm×15 cm were allowed to stand in an atmosphere of 60° C. for 1 hour. Thereafter, the surface of each test panel on which a coated film was formed was laminated with each other, and a load of 300 g/cm² was applied onto the test panels. The test panels were allowed to stand in this state at a temperature of 60° C. for 24 hours, and thereafter, each test panel was separated from each other. The appearance of the surface on which a coated film was formed was observed with naked eyes, and evaluated in accordance with the following criteria for evaluation.
(Criteria for Evaluation)
⊚: No change was observed.
○: Only a slight change in gloss was observed on the surface of the coated film.
Δ: A peeled portion of a coated film was slightly observed.
x: Many peeled portions of a coated film were observed.

<Frost Damage Resistance>

After the side and back surfaces of the test panel, on which a coated film was not formed were sealed with a silicone bath bond commercially available from Konishi Co., Ltd., 300 cycles of a process were carried out, one cycle comprising cooling the test panel to −20° C. in the air for 2 hours to freeze the test panel by using a freeze-thaw testing apparatus, and dipping the test panel in water of 20° C. for 2 hours, while the generation of a crack on coated film was observed with a loupe having a magnification of 30 times every 100 cycles. Thereafter, the frost damage resistance was evaluated in accordance with the following criteria for evaluation.
(Criteria for Evaluation)
⊚: After 300 cycles, no problem was observed.
○: After 200 cycles, no problem was observed, but after 300 cycles, a crack was observed.
Δ: After 100 cycles, no problem was observed, but after 200 cycles, a crack was observed.
x: After 100 cycles, a crack was observed.

<Adhesion>

The coated film of the test panel was cut by means of a utility knife so that 100 cross-cut squares having a length of 2 mm in one side were formed, and a cellophane adhesive tape commercially available from Nichiban Co., Ltd. under the product number of CT405AP-18 was stuck on these squares. Thereafter, a peeling test was carried out in accordance with JIS K 5400, and the number of the cross-cut squares remaining on the test panel was counted. The adhesion was evaluated in accordance with the following criteria for evaluation.
(Criteria for Evaluation)
○: Number of remaining cross-cut squares is not less than 90.
Δ: Number of remaining cross-cut squares is 70 to 89.
x: Number of remaining cross-cut squares is not more than 69.
<Mud Crack Resistance>
A flexible board commercially available from Nippon Test Panel Co., Ltd. was coated with a paint sealer obtained in the above in an amount of 250 g/cm² with a sponge roll coater, and immediately dried with a hot air drier at 130° C. for 5 minutes, to give a test board. After the coated film of the obtained test board was observed with naked eyes, it was checked whether or not a wrinkle caused by shrinkage (mud crack) was generated in the coated film, and the mud crack resistance was evaluated in accordance with the following criteria for evaluation.
(Criteria for Evaluation)
○: No wrinkle caused by shrinkage was observed.
Δ: Wrinkles caused by shrinkage were slightly observed.
x: Many wrinkles caused by shrinkage were observed.
<Excoriation Resistance>
After the surface of the test board was rubbed with a steel wool (#0000) under a load of 200 g/cm² by using an abrasion resistance tester commercially available from Imoto Machinery Co., Ltd. under the product number of IMC-154A for 10 reciprocations, its surface state was observed with naked eyes, and the excoriation resistance was evaluated in accordance with the following criteria for evaluation.

(Criteria for evaluation)
○: No scratch was observed.
Δ: A slight scratch was observed.
x: A deep scratch was observed.
<Burden on the Environment>
The minimum film-forming temperature of a resin emulsion for a sealer is generally controlled to 0° to 5° C., in order to impart film-forming property to the resin emulsion for a sealer. When this film-forming temperature is controlled, a film-forming aid is used. However, it has been desired that the amount of the film-forming aid being used is reduced as much as possible from the viewpoint of minimization of burden on the environment since the film-forming aid is a volatile substance.
Therefore, the burden on the environment was evaluated based on the amount of the film-forming aid which is necessitated for the resin emulsion for a sealer. Its criteria for evaluation are as follows:
(Criteria for Evaluation)
⊚: Content of the film-forming aid in the resin emulsion for a sealer is less than 3%.
○: Content of the film-forming aid in the resin emulsion for a sealer is not less than 3% and less than 5%.
Δ: Content of the film-forming aid in the resin emulsion for a sealer is not less than 5% and less than 10%.
x: Content of the film-forming aid in the resin emulsion for a sealer is not less than 10%.
Incidentally, the resin emulsion for a sealer having at least one evaluation of "x" in the physical properties was unsuitable to be used in a paint sealer.

TABLE 5

| Example and Comparative Example No. | Physical properties of paint sealer | | | | | | |
|---|---|---|---|---|---|---|---|
| | Water permeability resistance | Blocking resistance | Frost damage resistance | Adhesion | Mud crack resistance | Excoriation resistance | Burden on the environment |
| Example | | | | | | | |
| 1 | Δ | ○ | ○ | ○ | ○ | Δ | ○ |
| 2 | ○ | ○ | ○ | ○ | ○ | Δ | Δ |
| 3 | ○ | ○ | ○ | Δ | ○ | ○ | ⊚ |
| 4 | ○ | ○ | Δ | ○ | ○ | ○ | ○ |
| 5 | Δ | ○ | ○ | Δ | Δ | Δ | ○ |
| 6 | Δ | ○ | Δ | Δ | ○ | ○ | ○ |
| 7 | ⊚ | ○ | ⊚ | ○ | ○ | Δ | ○ |
| 8 | ○ | ○ | ○ | Δ | Δ | Δ | ○ |
| 9 | ○ | ⊚ | Δ | Δ | ○ | ○ | Δ |
| 10 | ⊚ | ○ | ⊚ | ○ | ○ | Δ | ○ |
| 11 | ⊚ | ⊚ | ⊚ | ○ | ○ | ○ | ○ |
| 12 | ○ | ○ | ⊚ | ○ | ○ | ○ | Δ |
| 13 | ○ | ○ | ⊚ | ○ | ○ | ○ | ○ |
| 14 | Δ | ○ | ⊚ | ○ | ○ | ○ | ○ |
| 15 | ⊚ | Δ | ⊚ | ○ | ○ | Δ | ⊚ |
| 16 | ○ | Δ | ⊚ | ○ | ○ | ○ | ⊚ |
| 17 | Δ | ○ | ○ | ○ | ○ | ○ | Δ |
| 18 | ○ | ○ | ⊚ | ○ | ○ | ○ | Δ |
| Comp. Ex. | | | | | | | |
| 1 | X | ⊚ | X | X | X | ○ | X |
| 2 | X | X | ○ | ○ | ○ | X | ○ |
| 3 | X | ○ | Δ | Δ | Δ | ○ | Δ |
| 4 | X | ○ | X | ○ | ○ | Δ | Δ |
| 5 | X | ⊚ | X | X | Δ | ○ | X |
| 6 | Δ | ⊚ | X | X | Δ | ○ | X |
| 7 | X | ○ | X | X | ○ | ○ | X |
| 8 | Δ | ○ | ○ | X | X | Δ | ○ |
| 9 | Δ | Δ | X | ○ | ○ | Δ | X |
| 10 | X | Δ | X | ○ | ⊚ | X | ○ |
| 11 | Δ | X | ⊚ | Δ | ○ | X | ⊚ |
| 12 | X | ⊚ | X | X | X | ○ | ○ |
| 13 | X | ○ | X | ⊚ | ○ | Δ | Δ |
| 14 | ⊚ | ○ | ⊚ | X | Δ | Δ | Δ |

TABLE 5-continued

| Example and Comparative Example No. | Water permeability resistance | Blocking resistance | Frost damage resistance | Adhesion | Mud crack resistance | Excoriation resistance | Burden on the environment |
|---|---|---|---|---|---|---|---|
| 15 | Δ | ⊚ | X | Δ | ○ | ○ | Δ |
| 16 | ⊚ | X | ○ | ○ | ○ | X | ○ |
| 17 | Δ | ⊚ | X | X | X | ○ | X |

From the results as shown in Table 5, it can be seen that the resin emulsion for a sealer obtained in each example forms a coated film which is excellent in water permeability resistance, blocking resistance and frost damage resistance. In addition, since the resin emulsion for a sealer obtained in each example can form a coated film which is excellent in water permeability resistance and frost damage resistance without the lowering of film-forming property even when a pigment is used therein in a fixed amount, the resin emulsion for a sealer obtained in each sample has a high economic value. Moreover, since the resin emulsion for a sealer is excellent in film-forming property, and the amount of a film-forming aid can be greatly reduced, it can be seen that the resin emulsion for a sealer is excellent environmental protection.

(2) Examples and Comparative Examples of a Resin Composition for a Sealer

Production Example 1

A flask equipped with a dropping funnel, a stirrer, a nitrogen gas inlet pipe, a thermometer and a reflux condenser was charged with 820 parts of deionized water.

The dropping funnel was charged with 145 parts of deionized water, 60 parts of 25% aqueous solution of an emulsifier commercially available from Dai-Ichi Kogyo Seiyaku Co., Ltd. under the trade name of Aqualon HS-10, 80 parts of 2-ethylhexyl acrylate, 230 parts of methyl methacrylate, 180 parts of styrene and 10 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 43 parts of 3.5% aqueous solution of ammonium persulfate and 30 parts of 2.5% aqueous solution of sodium hydrogensulfite were added dropwise to the flask over 120 minutes. After the completion of the dropwise addition, the temperature of the mixture was maintained at 80° C. for 60 minutes.

Thereafter, a second-step pre-emulsion prepared from 145 parts of deionized water, 60 parts of 25% aqueous solution of an emulsifier commercially available from Dai-Ichi Kogyo Seiyaku Co., Ltd. under the trade name of Aqualon HS-10, 110 parts of 2-ethylhexyl acrylate, 100 parts of butyl acrylate, 160 parts of methyl methacrylate, 120 parts of styrene and 10 parts of acrylic acid, 43 parts of 3.5% aqueous solution of ammonium persulfate and 30 parts of 2.5% aqueous solution of sodium hydrogensulfite were added dropwise to the flask over 120 minutes. After completion of the dropwise addition, the temperature of the mixture was maintained at 80° C. for 120 minutes, and the pH of the mixture in the flask, which was determined at 23° C. by using a pH meter commercially available from HORIBA, Ltd. under the product number of F-23 (hereinafter referred to the same), was controlled to 8 by adding 25% aqueous ammonia to the mixture, to complete the emulsion polymerization reaction. The resulting reaction mixture was cooled to room temperature, and thereafter, filtrated with a 300-mesh (JIS mesh, hereinafter referred to the same) metal screen, to give a resin emulsion for a sealer.

The composition of the monomer component used for the resin emulsion for a sealer and properties of the resin emulsion for a sealer are shown in Table 6.

Production Examples 2 to 6

Resin emulsions for a sealer were prepared in the same manner as in Production Example 1, except that the monomer component used in Production Example 1 was changed to the monomer component as shown in Table 6. The composition of each monomer component used for the resin emulsion for a sealer and properties of each resin emulsion for a sealer are shown in Table 6.

Production Example 7

A flask equipped with a dropping funnel, a stirrer, a nitrogen gas inlet pipe, a thermometer and a reflux condenser was charged with 800 parts of deionized water.

The dropping funnel was charged with 100 parts of deionized water, 40 parts of 25% aqueous solution of an emulsifier commercially available from Dai-Ichi Kogyo Seiyaku Co., Ltd. under the trade name of Aqualon HS-10, 5 parts of 2-ethylhexyl acrylate, 330 parts of styrene and 5 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 29 parts of 3.5% aqueous solution of ammonium persulfate and 20 parts of 2.5% aqueous solution of sodium hydrogensulfite were added dropwise to the flask over 90 minutes. After the completion of the dropwise addition, the temperature of the mixture was maintained at 80° C. for 60 minutes.

Thereafter, a second-step pre-emulsion prepared from 96 parts of deionized water, 40 parts of 25% aqueous solution of an emulsifier commercially available from Dai-Ichi Kogyo Seiyaku Co., Ltd. under the trade name of Aqualon HS-10, 100 parts of 2-ethylhexyl acrylate, 225 parts of styrene and 5 parts of acrylic acid, 29 parts of 3.5% aqueous solution of ammonium persulfate and 20 parts of 2.5% aqueous solution of sodium hydrogensulfite were added dropwise to the flask over 90 minutes. After completion of the dropwise addition, the temperature of the mixture was maintained at 80° C. for 60 minutes.

Next, a third-step pre-emulsion prepared from 96 parts of deionized water, 40 parts of 25% aqueous solution of an emulsifier commercially available from Dai-Ichi Kogyo Seiyaku Co., Ltd. under the trade name of Aqualon HS-10, 70 parts of 2-ethylhexyl acrylate, 50 parts of butyl acrylate, 170 parts of styrene and 40 parts of acrylic acid, 29 parts of 3.5% aqueous solution of ammonium persulfate and 20 parts of 2.5% aqueous solution of sodium hydrogensulfite were added dropwise to the flask over 90 minutes. After completion of the dropwise addition, the temperature of the mixture was maintained at 80° C. for 120 minutes.

Next, the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 6.

Comparative Production Example 1

A flask equipped with a dropping funnel, a stirrer, a nitrogen gas inlet pipe, a thermometer and a reflux condenser was charged with 820 parts of deionized water.

The dropping funnel was charged with 145 parts of deionized water, 120 parts of 25% aqueous solution of an emulsifier commercially available from Dai-Ichi Kogyo Seiyaku Co., Ltd. under the trade name of Aqualon HS-10, 60 parts of 2-ethylhexyl acrylate, 120 parts of butyl acrylate, 300 parts of methyl methacrylate, 500 parts of styrene and 20 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 86 parts of 3.5% aqueous solution of ammonium persulfate and 60 parts of 2.5% aqueous solution of sodium hydrogensulfite were added dropwise to the flask over 240 minutes. After the completion of the dropwise addition, the temperature of the mixture was maintained at 80° C. for 120 minutes.

Thereafter, the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 6.

Comparative Production Example 2

A resin emulsion for a sealer was prepared in the same manner as in Comparative Production Example 1, except that the monomer component used in Comparative Production Example 1 was changed to the monomer component as shown in Table 6. The composition of each monomer component used for the resin emulsion for a sealer and properties of each resin emulsion for a sealer are shown in Table 6.

Comparative Production Example 3

A resin emulsion was prepared in the same manner as in Production Example 1, except that the monomer component used in Production Example 1 was changed to the monomer component as shown in Table 6. The composition of each monomer component used for the resin emulsion for a sealer and properties of each resin emulsion for a sealer are shown in Table 6.

Incidentally, abbreviations listed in Table 6 mean the followings:

[Meaning of Abbreviations Listed in Table 6]

St: styrene

MMA: methyl methacrylate

2EHA: 2-ethylhexyl acrylate

BA: butyl acrylate

AA: acrylic acid

MAA: methacrylic acid

In addition, the terms listed in Table 6 mean the followings:

[Total St Content]

Content (%) of styrene in total monomer components used as a raw material for a polymer constituting an emulsion particle

[St Content in Layer 1]

Content (%) of styrene in a monomer component used as a raw material of the layer

[Carboxylic Acid Content in Layer 3]

Content (%) of carboxylic acid in a monomer component used as a raw material of the layer

[Ratio of Each Layer]

Weight ratio of each layer which constitutes an emulsion particle (the ratio of layer 1/layer 2/layer 3 means the weight ratio from the left in order)

[Tg of Each Layer]

Glass transition temperature (° C.) of each layer constituting an emulsion particle (the glass transition temperature of layer 1/layer 2/layer 3 means a glass transition temperature from the left in order)

[Total Tg]

Glass transition temperature (° C.) of an emulsion particle

[MFT]

Minimum film-forming temperature (° C.) of a resin emulsion for a sealer

[Amount of Nonvolatile Component]

Content (% by mass) of a nonvolatile component in a resin emulsion

[Average Particle Diameter]

Average particle diameter (nm) of emulsion particles

In Table 6, the layer 1 to the layer 3 show a polymerization order. Incidentally, the mark "-" which is used in the monomer component of Table 6 means that the monomer is not used.

TABLE 6

| | | | Production Ex. | | | | | | | Comparative Production Ex. | | |
|---|---|---|---|---|---|---|---|---|---|---|---|---|
| | | | 1 | 2 | 3 | 4 | 5 | 6 | 7 | 1 | 2 | 3 |
| Composition of each layer (parts) | Layer 1 | St | 180 | 380 | 350 | 460 | 370 | 290 | 330 | 500 | 500 | 200 |
| | | MMA | 230 | 10 | 100 | — | 10 | — | — | 300 | — | 120 |
| | | 2EHA | 80 | 100 | 20 | — | — | 5 | 5 | 60 | 380 | 70 |
| | | BA | — | — | 20 | 30 | 10 | — | — | 120 | 100 | — |
| | | AA | 10 | 10 | 10 | 10 | 10 | 5 | 5 | 20 | 20 | 10 |
| | Layer 2 | St | — | — | — | — | — | — | 225 | — | — | — |
| | | 2EHA | — | — | — | — | — | — | 100 | — | — | — |
| | | AA | — | — | — | — | — | — | 5 | — | — | — |
| | Layer 3 | AA | 10 | 20 | 20 | — | 40 | 40 | 40 | — | — | 10 |
| | | MAA | — | — | — | 20 | 40 | 40 | — | — | — | — |
| | | St | 120 | 350 | 200 | 280 | 130 | 415 | 170 | — | — | 300 |
| | | MMA | 160 | — | 100 | — | — | — | — | — | — | 230 |
| | | BA | 100 | 30 | — | — | — | 205 | 50 | — | — | 30 |
| | | 2EHA | 110 | 100 | 180 | 200 | 390 | — | 70 | — | — | 30 |
| Properties of resin emulsion | Number of layers | | 2 | 2 | 2 | 2 | 2 | 2 | 3 | 1 | 1 | 2 |
| | Total St content (%) | | 30.0 | 73.0 | 55.0 | 74.0 | 50.0 | 70.5 | 72.5 | 50.0 | 50.0 | 50.0 |
| | St content in layer 1 (%) | | 36 | 76 | 73 | 98 | 95 | 97 | 97 | 50 | 50 | 50 |
| | Carboxylic acid content in layer 3 (%) | | 2.0 | 4.0 | 4.0 | 4.0 | 13.3 | 11.4 | 12.1 | — | — | 2.7 |
| | Ratio of each layer (weight ratio) | | 50/50 | 50/50 | 50/50 | 50/50 | 40/60 | 30/70 | 34/33/33 | 100 | 100 | 50/50 |
| | Tg of each layer (° C.) | | 58/9 | 46/34 | 85/14 | 92/−19 | 93/−33 | 95/35 | 95/13/15 | 56 | −5 | 53/82 |
| | Total Tg (° C.) | | 31 | 40 | 43 | 22 | 7 | 51 | 36 | 56 | −5 | 66 |
| | MFT (° C.) | | 39 | 56 | 36 | 14 | <−5 | 58 | 32 | 84 | 6 | >95 |
| | Amount of nonvolatile component (% by mass) | | 43 | 43 | 43 | 43 | 43 | 43 | 43 | 43 | 43 | 43 |
| | Average particle diameter (nm) | | 170 | 170 | 170 | 170 | 170 | 170 | 170 | 170 | 170 | 170 |

Preparation Example

A dispersing agent commercially available from Kao Corporation under the trade name of DEMOL EP in an amount of 60 parts, 50 parts of a dispersing agent commercially available from Dai-Ichi Kogyo Seiyaku Co., Ltd. under the trade name of Discoat N-14, 10 parts of a wetting agent commercially available from Kao Corporation under the trade name of EMULGEN LS-106, 210 parts of deionized water, 200 parts of titanium oxide commercially available from Ishihara Sangyo Kaisha, Ltd. under the product number of CR-97, 600 parts of calcium carbonate commercially available from Takehara Kagaku Kogyo Co., Ltd. under the name of precipitated calcium carbonate, 200 parts of talc commercially available from Nippon Talc Co., Ltd. under the product number of MICROACE S-3, 10 parts of a defoaming agent commercially available from San Nopco Limited under the trade name of Nopco 8034L and 200 parts of glass beads each having a diameter of 1 mm were blended under agitation with a disperser, and thereafter, the resulting mixture was matured with stirring at 3000 min$^{-1}$ for 60 minutes, and filtered with a 100-mesh metal screen, to give a white pigment paste of which nonvolatile component is 75% by mass. Incidentally, the content of the nonvolatile component in the pigment paste was determined in the same manner as in the content of the nonvolatile component in the resin emulsion.

Example 1

While 82 parts of the resin emulsion obtained in Production Example 1 was dispersing at 1500 min$^{-1}$ with a homo disperser, a mixed solution prepared by mixing 2,2,4-trimethyl-1,3-pentanediol monoisobutylate commercially available from Chisso Corporation under the product number of CS-12 as a film-forming aid with butyl cellosolve in an equal weight was added to the above resin emulsion so that its film-forming temperature was controlled to 0° to 5° C., to give a mixture.

To the resulting mixture, 109 parts of the pigment paste obtained in the above was added, and moreover, a proper amount of water for dilution and a proper amount of a defoaming agent (silicone defoaming agent) commercially available from San Nopco Limited under the trade name of SN Defoamer 777 was added so that the content of a nonvolatile component became 50% by mass, to give a resin composition for a sealer.

Next, a thickener commercially available from NIPPON SHOKUBAI Co., Ltd. under the trade name of ACRYSET WR-503A was added to the obtained resin composition for a sealer so that the viscosity of the resulting mixture became 1000 mPa·s at a rotational speed of 30 min$^{-1}$ when determined by using a BM-type viscometer commercially available from Tokyo Keiki Inc. The mixture was stirred at the same rotational speed for 30 minutes, to give a paint sealer. This paint sealer was allowed to stand at room temperature for 1 day or more.

Next, a flexible board commercially available from Nippon Testpanel Co., Ltd. was coated with this paint sealer in an amount of 90 g/m$^2$ by means of a sponge roll coater, and dried at 100° C. for 10 minutes by means of a hot air dryer, to give a test panel. The following physical properties were evaluated by using the obtained test panel. The results are shown in Table 7.

<Water Permeability Resistance>

A funnel having a diameter of 10 cm was placed on the coated film formed on the test panel, and their contact portion was sealed with a silicone bath bond commercially available from Konishi Co., Ltd. Thereafter, in accordance with "funnel method" prescribed in JIS K 5400, reduced amount of water after 24 hours passed was determined, and the water permeability resistance was evaluated in accordance with the following criteria for evaluation.

(Criteria for Evaluation)
⊚: Less than 0.03 mL/cm²
○: Not less than 0.03 mL/cm² and less than 0.05 mL/cm²
Δ: Not less than 0.05 mL/cm² and less than 0.10 mL/cm²
x: Not less than 0.10 mL/cm²

<Blocking Resistance>

Two test panels each having a size of 7 cm×15 cm was allowed to stand in an atmosphere of 60° C. for 1 hour. Thereafter, the surface of each test panel on which a coated film was formed was laminated with each other, and a load of 300 g/cm² was applied onto the test panels. The test panels were allowed to stand in this state at a temperature of 60° C. for 24 hours, and thereafter, each test panel was separated from each other. The appearance of the surface on which a coated film was formed was observed with naked eyes, and evaluated in accordance with the following criteria for evaluation.

(Criteria for Evaluation)
⊚: No change was observed.
○: Only a slight change in gloss was observed on the surface of the coated film.
Δ: A peeled portion of a coated film was slightly observed.
x: Many peeled portions of a coated film were observed.

<Frost Damage Resistance>

After the side and back surfaces of the test panel, on which a coated film was not formed were sealed with a silicone bath bond commercially available from Konishi Co., Ltd., a cycle comprising cooling the test panel to −20° C. in the air for 2 hours to freeze the test panel, and dipping the test panel in water of 20° C. for 2 hours was carried out 300 times while the generation of a crack on coated film was observed with a loupe having a magnification of 30 times every 100 cycles. Thereafter, the frost damage resistance was evaluated in accordance with the following criteria for evaluation.

(Criteria for Evaluation)
⊚: After 300 cycles, no problem was observed.
○: After 200 cycles, no problem was observed, but after 300 cycles, a crack was observed.
Δ: After 100 cycles, no problem was observed, but after 200 cycles, a crack was observed.
x: After 100 cycles, a crack was observed.

<Content of Pigment>

The content of a pigment was determined in accordance with the equation:

[Content of a Pigment(%)]=([Weight of pigment]÷
[Weight of nonvolatile component of a resin+
Weight of a pigment])×100.

Examples 2 to 7 and Comparative Examples 1 to 3

A resin composition and a paint sealer were prepared in the same manner as in Example 1, except that 82 parts of a resin emulsion obtained in the Production Example number as listed in Table 7 was used instead of the resin emulsion used in Example 1. The physical properties of the obtained paint sealer were examined in the same manner as in Example 1. The results are shown in Table 7.

Examples 8 and 9

A resin composition and a paint sealer were prepared in the same manner as in Example 1, except that 82 parts of a resin emulsion obtained in the Production Example number as listed in Table 7 was used instead of the resin emulsion used in Example 1, and that the amount of a pigment was changed to 141 parts. The physical properties of the obtained paint sealer were examined in the same manner as in Example 1. The results are shown in Table 7.

Comparative Example 4

A resin composition and a paint sealer were prepared in the same manner as in Example 1, except that 82 parts of a resin emulsion obtained in the Production Example 1 was used instead of the resin emulsion used in Example 1, and that the amount of a pigment was changed to 71 parts. The physical properties of the obtained paint sealer were examined in the same manner as in Example 1. The results are shown in Table 7.

The Production Example number listed in Table 7 means that the resin emulsion obtained in its Production Example number was used.

Incidentally, a resin composition for a sealer having at least one evaluation of "x" in the physical properties is unsuitable to be used in a paint sealer.

TABLE 7

| | | Physical properties of paint sealer | | | |
|---|---|---|---|---|---|
| Example and Comparative Example No. | Production Example No. | Water permeability resistance | Blocking resistance | Frost damage resistance | Content of Pigment (%) |
| Example | | | | | |
| 1 | 1 | Δ | Δ | ○ | 70 |
| 2 | 2 | ○ | ○ | Δ | 70 |
| 3 | 3 | Δ | ⊚ | ○ | 70 |
| 4 | 4 | ○ | ○ | ⊚ | 70 |
| 5 | 5 | ○ | Δ | ⊚ | 70 |
| 6 | 6 | ⊚ | ⊚ | ○ | 70 |
| 7 | 7 | ⊚ | ○ | ⊚ | 70 |
| 8 | 5 | ○ | ○ | ○ | 75 |
| 9 | 7 | ⊚ | ⊚ | ○ | 75 |
| Comp. Ex. | | | | | |
| 1 | 8 | Δ | ○ | X | 70 |
| 2 | 9 | Δ | X | ○ | 70 |
| 3 | 10 | X | ⊚ | X | 70 |
| 4 | 1 | Δ | X | ○ | 60 |

From the results as shown in Table 7, it can be seen that the resin composition for a sealer obtained in each example forms a coated film which is excellent in water permeability resistance, blocking resistance and frost damage resistance. In addition, since the resin emulsion for a sealer obtained in each example can form a coated film which is excellent in water permeability resistance and frost damage resistance without the lowering of film-forming property even when a pigment is used therein in a fixed amount, the resin emulsion for a sealer has a high economic value. Moreover, since the resin emulsion for a sealer obtained in each example is excellent in film-forming property, and the amount of a film-forming aid can be greatly reduced, it can be seen that the resin emulsion for a sealer is excellent environmental protection.

(3) Examples and Comparative Examples of a Coating Composition for a Sealer

Production Example 1

A flask equipped with a dropping funnel, a stirrer, a nitrogen gas inlet pipe, a thermometer and a reflux condenser was charged with 820 parts of deionized water.

The dropping funnel was charged with 145 parts of deionized water, 120 parts of 25% aqueous solution of an emulsifier commercially available from Dai-Ichi Kogyo Seiyaku Co., Ltd. under the trade name of Aqualon HS-10, 60 parts of 2-ethylhexyl acrylate, 120 parts of butyl acrylate, 300 parts of methyl methacrylate, 500 parts of styrene and 20 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 86 parts of 3.5% aqueous solution of ammonium persulfate and 60 parts of 2.5% aqueous solution of sodium hydrogensulfite were added dropwise to the flask over 240 minutes. After the completion of the dropwise addition, the temperature of the mixture was maintained at 80° C. for 120 minutes.

Thereafter, the pH of the mixture in the flask, which was determined at 23° C. by using a pH meter commercially available from HORIBA, Ltd. under the product number of F-23 (hereinafter referred to the same), was controlled to 8 by adding 25% aqueous ammonia to the mixture, to complete the emulsion polymerization reaction. The resulting reaction mixture was cooled to room temperature, and thereafter, filtrated with a 300-mesh (JIS mesh, hereinafter referred to the same) metal screen, to give a resin emulsion for a sealer.

The composition of the monomer component used for the resin emulsion for a sealer and properties of the resin emulsion for a sealer are shown in Table 8.

Production Example 2

A flask equipped with a dropping funnel, a stirrer, a nitrogen gas inlet pipe, a thermometer and a reflux condenser was charged with 820 parts of deionized water.

The dropping funnel was charged with 145 parts of deionized water, 60 parts of 25% aqueous solution of an emulsifier commercially available from Dai-Ichi Kogyo Seiyaku Co., Ltd. under the trade name of Aqualon HS-10, 100 parts of 2-ethylhexyl acrylate, 10 parts of methyl methacrylate, 380 parts of styrene and 10 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 43 parts of 3.5% aqueous solution of ammonium persulfate and 30 parts of 2.5% aqueous solution of sodium hydrogensulfite were added dropwise to the flask over 120 minutes. After the completion of the dropwise addition, the temperature of the mixture was maintained at 80° C. for 60 minutes.

Thereafter, a second-step pre-emulsion prepared from 145 parts of deionized water, 60 parts of 25% aqueous solution of an emulsifier commercially available from Dai-Ichi Kogyo Seiyaku Co., Ltd. under the trade name of Aqualon HS-10, 100 parts of 2-ethylhexyl acrylate, 30 parts of butyl acrylate, 350 parts of styrene and 20 parts of acrylic acid, 43 parts of 3.5% aqueous solution of ammonium persulfate and 30 parts of 2.5% aqueous solution of sodium hydrogensulfite were added dropwise to the flask over 120 minutes. After completion of the dropwise addition, the temperature of the mixture was maintained at 80° C. for 120 minutes, and the pH of the mixture in the flask was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 8.

Production Examples 3 to 5

A resin emulsion for a sealer was prepared in the same manner as in Production Example 2, except that the monomer component used in Production Example 2 was changed to the monomer component as shown in Table 8. The composition of each monomer component used for the resin emulsion for a sealer and properties of each resin emulsion for a sealer are shown in Table 8.

Production Example 6

A flask equipped with a dropping funnel, a stirrer, a nitrogen gas inlet pipe, a thermometer and a reflux condenser was charged with 800 parts of deionized water.

The dropping funnel was charged with 100 parts of deionized water, 40 parts of 25% aqueous solution of an emulsifier commercially available from Dai-Ichi Kogyo Seiyaku Co., Ltd. under the trade name of Aqualon HS-10, 5 parts of 2-ethylhexyl acrylate, 330 parts of styrene and 5 parts of acrylic acid, to prepare a pre-emulsion for dropping.

The obtained pre-emulsion for dropping in an amount of 71 parts, which was 5% of the total amount of the monomer component, was added to the above flask, and its temperature was raised to 80° C. while nitrogen gas was blown into the flask gently. Thereafter, 14 parts of 3.5% aqueous solution of ammonium persulfate was added to the above flask to initiate an emulsion polymerization.

Next, the rest of the pre-emulsion for dropping, 29 parts of 3.5% aqueous solution of ammonium persulfate and 20 parts of 2.5% aqueous solution of sodium hydrogensulfite were added dropwise to the flask over 90 minutes. After the completion of the dropwise addition, the temperature of the mixture was maintained at 80° C. for 60 minutes.

Thereafter, a second-step pre-emulsion prepared from 96 parts of deionized water, 40 parts of 25% aqueous solution of an emulsifier commercially available from Dai-Ichi Kogyo Seiyaku Co., Ltd. under the trade name of Aqualon HS-10, 100 parts of 2-ethylhexyl acrylate, 225 parts of styrene and 5 parts of acrylic acid, 29 parts of 3.5% aqueous solution of ammonium persulfate and 20 parts of 2.5% aqueous solution of sodium hydrogensulfite were added dropwise to the flask over 90 minutes. After completion of the dropwise addition, the temperature of the mixture was maintained at 80° C. for 60 minutes.

Next, a third-step pre-emulsion prepared from 96 parts of deionized water, 40 parts of 25% aqueous solution of an emulsifier commercially available from Dai-Ichi Kogyo Seiyaku Co., Ltd. under the trade name of Aqualon HS-10, 70 parts of 2-ethylhexyl acrylate, 50 parts of butyl acrylate, 170 parts of styrene and 40 parts of acrylic acid, 29 parts of 3.5% aqueous solution of ammonium persulfate and 20 parts of 2.5% aqueous solution of sodium hydrogensulfite were added dropwise to the flask over 90 minutes. After completion of the dropwise addition, the temperature of the mixture was maintained at 80° C. for 120 minutes, and the pH of the mixture in the flask, which was determined at 23° C. by using a pH meter commercially available from HORIBA, Ltd. under the product number of F-23 (hereinafter referred to the same), was controlled to 8 by adding 25% aqueous ammonia to the mixture, to complete the emulsion polymerization reaction. The resulting reaction mixture was cooled to room temperature, and thereafter, filtrated with a 300-mesh metal screen, to give a resin emulsion for a sealer.

The composition of the monomer component used for the resin emulsion for a sealer and properties of the resin emulsion for a sealer are shown in Table 8.

Comparative Production Example 1

A resin emulsion for a sealer was prepared in the same manner as in Production Example 1, except that the monomer component used in Production Example 1 was changed to the monomer component as shown in Table 8. The composition of each monomer component used for the resin emulsion for a sealer and properties of each resin emulsion for a sealer are shown in Table 8.

Comparative Production Example 2

A resin emulsion for a sealer was prepared in the same manner as in Production Example 2, except that the monomer component used in Production Example 2 was changed to the monomer component as shown in Table 8. The composition of each monomer component used for the resin emulsion for a sealer and properties of each resin emulsion for a sealer are shown in Table 8.

Incidentally, abbreviations listed in Table 8 mean the followings:
[Meaning of Abbreviations Listed in Table 8]
St: styrene
MMA: methyl methacrylate
2EHA: 2-ethylhexyl acrylate
BA: butyl acrylate
AA: acrylic acid
MAA: methacrylic acid
In addition, the terms listed in Table 8 mean the followings:
[St content in layer 1]
Content (%) of styrene in the monomer component used as a raw material of the layer 1
[Carboxylic Acid Content in Layer 3]
Content (%) of carboxylic acid in a monomer component used as a raw material of the layer 3
[Total St Content]
Content (%) of styrene in total monomer components used as a raw material for a polymer constituting an emulsion particle
[Ratio of Each Layer]
Weight ratio of each layer which constitutes an emulsion particle (the ratio of layer 1/layer 2/layer 3 means the weight ratio from the left in order)
[Tg of Each Layer]
Glass transition temperature (° C.) of each layer constituting an emulsion particle (the glass transition temperature of layer 1/layer 2/layer 3 means a glass transition temperature from the left in order)
[Total Tg]
Glass transition temperature (° C.) of an emulsion particle
[MFT]
Minimum film-forming temperature (° C.) of a resin emulsion for a sealer
[Amount of Nonvolatile Component]
Content (% by mass) of a nonvolatile component in a resin emulsion
[Average Particle Diameter]
Average particle diameter (nm) of emulsion particles
In Table 8, the layer 1 to the layer 3 show a polymerization order. Incidentally, the mark "-" which is used in the monomer component of Table 8 means that the monomer is not used.

TABLE 8

| | | | Production Example and Comparative Example No. | | | | | | | |
|---|---|---|---|---|---|---|---|---|---|---|
| | | | Production Ex. | | | | | | Comp. Production Ex. | |
| | | | 1 | 2 | 3 | 4 | 5 | 6 | 1 | 2 |
| Composition of each layer (parts) | Layer 1 | St | 500 | 380 | 460 | 370 | 290 | 330 | 500 | 200 |
| | | MMA | 300 | 10 | — | 10 | — | — | — | 120 |
| | | 2EHA | 60 | 100 | — | — | 5 | 5 | 380 | 70 |
| | | BA | 120 | — | 30 | 10 | — | — | 100 | — |
| | | AA | 20 | 10 | 10 | 10 | 5 | 5 | 20 | 10 |
| | Layer 2 | St | — | — | — | — | — | 225 | — | — |
| | | 2EHA | — | — | — | — | — | 100 | — | — |
| | | AA | — | — | — | — | — | 5 | — | — |
| | Layer 3 | AA | — | 20 | — | 40 | 40 | 40 | — | 10 |
| | | MAA | — | — | 20 | 40 | 40 | — | — | — |
| | | St | — | 350 | 280 | 130 | 415 | 170 | — | 300 |
| | | MMA | — | — | — | — | — | — | — | 230 |
| | | BA | — | 30 | — | — | 205 | 50 | — | 30 |
| | | 2EHA | — | 100 | 200 | 390 | — | 70 | — | 30 |
| Properties or resin emulsion | Number of layers | | 1 | 2 | 2 | 2 | 2 | 3 | 1 | 2 |
| | Total St content (%) | | 50.0 | 73.0 | 74.0 | 50.0 | 70.5 | 72.5 | 50.0 | 50.0 |
| | St content in layer 1 (%) | | 50 | 76 | 98 | 95 | 97 | 97 | 56 | 50 |
| | Carboxylic acid content in layer 3 (%) | | — | 4.0 | 4.0 | 13.3 | 11.4 | 12.1 | — | 2.7 |
| | Ratio of each layer (weight ratio) | | 100 | 50/50 | 50/50 | 40/60 | 30/70 | 34/33/33 | 100 | 50/50 |
| | Tg of each layer (° C.) | | 56 | 46/34 | 92/−19 | 93/−33 | 95/35 | 95/13/15 | −5 | 53/82 |
| | Total Tg (° C.) | | 56 | 40 | 22 | 7 | 51 | 36 | −5 | 66 |
| | MFT (° C.) | | 84 | 56 | 14 | <−5 | 58 | 32 | 6 | >95 |
| | Amount of nonvolatile component(% by mass) | | 43 | 43 | 43 | 43 | 43 | 43 | 43 | 43 |
| | Average particle diameter (nm) | | 170 | 170 | 170 | 170 | 170 | 170 | 170 | 170 |

Preparation Example

A dispersing agent commercially available from Kao Corporation under the trade name of DEMOL EP in an amount of 60 parts, 50 parts of a dispersing agent commercially available from Dai-Ichi Kogyo Seiyaku Co., Ltd. under the trade name of Discoat N-14, 10 parts of a wetting agent commercially available from Kao Corporation under the trade name of EMULGEN LS-106, 210 parts of deionized water, 200 parts of titanium oxide commercially available from Ishihara Sangyo Kaisha, Ltd. under the product number of CR-97, 600 parts of calcium carbonate commercially available from Takehara Kagaku Kogyo Co., Ltd. under the name of precipitated calcium carbonate, 200 parts of talc commercially available from Nippon Talc Co., Ltd. under the product number of MICROACE S-3, 10 parts of a defoaming agent commercially available from San Nopco Limited under the trade name of Nopco 8034L and 200 parts of glass beads each having a diameter of 1 mm were blended under agitation with a disperser. Thereafter, the resulting mixture was matured with stirring at 3000 $min^{-1}$ for 60 minutes, and filtered with a 100-mesh metal screen, to give a white pigment paste of which content of a nonvolatile component is 75% by mass. Incidentally, the content of the nonvolatile component in the pigment paste was determined in the same manner as in the content of the nonvolatile component in the resin emulsion.

Example 1

While 82 parts of the resin emulsion obtained in Production Example 1 was dispersing at 1500 $min^{-1}$ with a homo disperser, a mixed solution prepared by mixing 2,2,4-trimethyl-1,3-pentanediol monoisobutylate commercially available from Chisso Corporation under the product number of CS-12 as a film-forming aid with butyl cellosolve in an equal weight was added to the above resin emulsion so that its film-forming temperature was controlled to 0° to 5° C., to give a mixture.

To the resulting mixture, 87 parts of the pigment paste obtained in the above was added, and moreover, a proper amount of water for dilution and a proper amount of a defoaming agent (silicone defoaming agent) commercially available from San Nopco Limited under the trade name of SN Defoamer 777 was added so that the content of a nonvolatile component became 40% by mass, to give a resin composition for a sealer.

Next, 1.4 parts of an alkali-soluble rheology control agent commercially available from NIPPON SHOKUBAI Co., Ltd. under the trade name of ACRYSET WR-507 (content of active ingredient: 30%) was added to the obtained resin composition for a sealer, and the resulting mixture was stirred at a rotational speed of 1500 $min^{-1}$ for 30 minutes, to give a coating composition for a sealer. This coating composition for a sealer was allowed to stand at room temperature for 1 day or more.

Example 2

A coating composition for a sealer was prepared in the same manner as in Example 1, except that the resin emulsion obtained in Production Example 2 was used as a resin emulsion, that the amount of the pigment paste was changed to 57 parts, and that the amount of the rheology control agent was changed to 1.2 parts in Example 1.

Example 3

A coating composition for a sealer was prepared in the same manner as in Example 1, except that the resin emulsion obtained in Production Example 2 was used as a resin emulsion, and that the amount of the rheology control agent was changed to 1.9 parts in Example 1.

Example 4

A coating composition for a sealer was prepared in the same manner as in Example 2, except that 1.4 parts of a urethane-associated rheology control agent commercially available from ADEKA CORPORATION under the trade name of ADEKANOL UH-420 (content of active ingredient: 30%) was used as a rheology control agent in Example 2.

Example 5

A coating composition for a sealer was prepared in the same manner as in Example 3, except that 2.0 parts of a urethane-associated rheology control agent commercially available from ADEKA CORPORATION under the trade name of ADEKANOL UH-420 (content of active ingredient: 30%) was used as a rheology control agent in Example 3.

Example 6

A coating composition for a sealer was prepared in the same manner as in Example 1, except that the resin emulsion obtained in Production Example 3 was used as a resin emulsion, that the amount of the pigment paste was changed to 71 parts, and that the amount of the rheology control agent was changed to 1.8 parts in Example 1.

Example 7

A coating composition for a sealer was prepared in the same manner as in Example 6, except that the resin emulsion obtained in Production Example 4 was used as a resin emulsion, and that the amount of the rheology control agent was changed to 1.9 parts in Example 6.

Example 8

A coating composition for a sealer was prepared in the same manner as in Example 2, except that the resin emulsion obtained in Production Example 5 was used as a resin emulsion, and that the amount of the rheology control agent was changed to 2.0 parts in Example 2.

Example 9

A coating composition for a sealer was prepared in the same manner as in Example 1, except that the resin emulsion obtained in Production Example 5 was used as a resin emulsion, and that the amount of the rheology control agent was changed to 2.5 parts in Example 1.

Example 10

A coating composition for a sealer was prepared in the same manner as in Example 4, except that the resin emulsion obtained in Production Example 5 was used as a resin emulsion, and that the amount of the rheology control agent was changed to 1.6 parts in Example 4.

Example 11

A coating composition for a sealer was prepared in the same manner as in Example 5, except that the resin emulsion obtained in Production Example 5 was used as a resin emulsion, and that the amount of the rheology control agent was changed to 2.1 parts in Example 5.

Example 12

A coating composition for a sealer was prepared in the same manner as in Example 1, except that the resin emulsion obtained in Production Example 6 was used as a resin emulsion, and that the amount of the rheology control agent was changed to 2.6 parts in Example 1.

Example 13

A coating composition for a sealer was prepared in the same manner as in Example 2, except that 11.8 parts of 3% aqueous solution of hydroxyethyl cellulose commercially available from DAICEL CHEMICAL INDUSTRIES LTD. under the product number of SP-850 which was denoted as HEC in Table 9 was used as a rheology control agent in Example 2.

Comparative Example 1

A coating composition for a sealer was prepared in the same manner as in Example 6, except that the resin emulsion obtained in Comparative Production Example 1 was used as a resin emulsion, and that the amount of the rheology control agent was changed to 1.5 parts in Example 6.

Comparative Example 2

A coating composition for a sealer was prepared in the same manner as in Example 6, except that the resin emulsion obtained in Comparative Production Example 2 was used as a resin emulsion, and that the amount of the rheology control agent was changed to 1.6 parts in Example 6.

Comparative Example 3

A coating composition for a sealer was prepared in the same manner as in Example 2, except that the amount of the pigment paste was changed to 31 parts, and that the amount of the rheology control agent was changed to 0.8 parts in Example 2.

Comparative Example 4

A coating composition for a sealer was prepared in the same manner as in Example 4, except that the amount of the pigment paste was changed to 31 parts, and that the amount of the amount of the rheology control agent was changed to 0.9 parts in Example 4.

Comparative Example 5

A coating composition for a sealer was prepared in the same manner as in Example 4, except that the rheology control agent was not used in Example 4.

Experimental Example

Next, the physical properties of the coating composition for a sealer obtained in each working example or each comparative example were evaluated in accordance with the following methods. Their results are shown in Table 9.

Incidentally, when an alkali-soluble rheology control agent was used as a rheology control agent, a test panel was produced by the following method for producing a test panel 1. When a urethane-associated rheology control agent was used as a rheology control agent, a test panel was produced by the following method for producing a test panel 2.

[Method for Producing a Test Panel 1]

A slate panel having a size of 300 mm×300 mm×12 mm in thickness commercially available from Nippon Testpanel Co., Ltd. was coated with a coating composition for a sealer, in which an alkali-soluble rheology control agent was used, in a coated amount of 100 g/m² by means of an airless spraying equipment commercially available from ANEST IWATA Corporation under the product number of EX-700, and dried at 100° C. for 10 minutes by means of a hot air dryer, to give a test panel.

[Method for Producing a Test Panel 2]

A slate panel having a size of 300 mm×300 mm×12 mm in thickness commercially available from Nippon Testpanel Co., Ltd. was coated with a coating composition for a sealer, in which a urethane-associated rheology control agent was used, in a coated amount of 100 g/m² by means of a roll coater commercially available from Seiwa Sangyo Kabushiki Kaisha, and dried at 100° C. for 10 minutes by means of a hot air dryer, to give a test panel.

<Viscosity>

The viscosity of a rheology control agent at a rotational speed of 6 $min^{-1}$ and the viscosity of a rheology control agent at a rotational speed of 60 $min^{-1}$ were determined at 25° C. by using a BM-type viscometer commercially available from Tokyo Keiki Inc.

<Viscositic Property>

As a viscositic property of a coating composition for a sealer, a thixotropic index (TI) as determined in the above was evaluated in accordance with the equation:

[Thixotropic index(TI)]=[Viscosity of a rheology control agent at a rotational speed of 6 $min^{-1}$]÷[Viscosity of a rheology control agent at a rotational speed of 60 $min^{-1}$].

<Sprayability>

As to the coating composition for a sealer in which an alkali-soluble rheology control agent was used, the sprayability was evaluated in accordance with the following criteria for evaluation by using the thixotropic index (TI) as obtained above.

(Criteria for Evaluation)

⊚: TI is not less than 5.5 and less than 6.0.
○: TI is not less than 5.0 and less than 5.5.
Δ: TI is not less than 4.0 and less than 5.0.
x: TI is less than 4.0

<Roller Coatability>

As to the coating composition for a sealer in which a urethane-associated rheology control agent was used, roller coatability was evaluated in accordance with the following criteria for evaluation by using the thixotropic index (TI) as d above.

(Criteria for Evaluation)

⊚: TI is not less than 1.0 and less than 1.5.
○: TI is not less than 1.5 and less than 2.0.
Δ: TI is not less than 2.0 and less than 3.0.
x: TI is not less than 3.0.

<Water Permeability Resistance>

A funnel having a diameter of 10 cm was placed on the coated film formed on the test panel, and their contact portion was sealed with a silicone bath bond commercially available from Konishi Co., Ltd. Thereafter, in accordance with "funnel method" prescribed in JIS K 5400, reduced amount of water after 24 hours passed was determined, and the water permeability resistance was evaluated in accordance with the following criteria for evaluation.

(Criteria for Evaluation)
◎: Less than 0.03 mL/cm²
○: Not less than 0.03 mL/cm² and less than 0.05 mL/cm²
Δ: Not less than 0.05 mL/cm² and less than 0.10 mL/cm²
x: Not less than 0.10 mL/cm²

<Blocking Resistance>

Two test panels each having a size of 7 cm×15 cm was allowed to stand in an atmosphere of 60° C. for 1 hour. Thereafter, the surface of each test panel on which a coated film was formed was laminated with each other, and a load of 300 g/cm² was applied onto the test panels. The test panels were allowed to stand in this state at a temperature of 60° C. for 24 hours, and thereafter, each test panel was separated from each other. The appearance of the surface on which a coated film was formed was observed with naked eyes, and evaluated in accordance with the following criteria for evaluation.

(Criteria for Evaluation)
◎: No change was observed.
○: Only a slight change in gloss was observed on the surface of the coated film.
Δ: A peeled portion of a coated film was slightly observed.
x: Many peeled portions of a coated film were observed.

Frost Damage Resistance>

After the side and back surfaces of the test panel, on which a coated film was not formed were sealed with a silicone bath bond commercially available from Konishi Co., Ltd., 300 cycles of a process were carried out, one cycle comprising cooling the test panel to −20° C. in the air for 2 hours to freeze the test panel, and dipping the test panel in water of 20° C. for 2 hours, while the state of generation of a crack on coated film was observed with a loupe having a magnification of 30 times every 100 cycles. Thereafter, the frost damage resistance was evaluated in accordance with the following criteria for evaluation.

(Criteria for Evaluation)
◎: After 300 cycles, no problem was observed.
○: After 200 cycles, no problem was observed, but after 300 cycles, a crack was observed.
Δ: After 100 cycles, no problem was observed, but after 200 cycles, a crack was observed.
x: After 100 cycles, a crack was observed.

<Content of Pigment>

The content of a pigment was obtained in accordance with the equation:

[Content of a pigment(%)]=([Weight of pigment]÷ [Weight of nonvolatile component of a resin+ Weight of a pigment])×100.

The Production Example number listed in Table 9 means that the resin emulsion obtained in its Production Example number was used. The items "Comparative 1" and "Comparative 2" mean that the resin emulsions obtained in Comparative Production Examples 1 and 2 are used, respectively. Incidentally, the amount of an active ingredient of the rheology control agent means the amount per 100 parts of the nonvolatile component of the resin emulsion used in the resin composition for a sealer.

Incidentally, a coating composition for a sealer having at least one evaluation of "x" in the physical properties is unsuitable to be used in a paint sealer.

TABLE 9

| Example and Comparative Example No. | Production Ex. No. | Rheology control agent Kind | Amount of active ingredient (parts) | Viscosity 6 min⁻¹ | Viscosity 60 min⁻¹ | Viscositic property (TI) | Sprayability | Roller coatability | Water permeability resistance | Blocking resistance | Frost damage resistance | Content of pigment (%) |
|---|---|---|---|---|---|---|---|---|---|---|---|---|
| Example | | | | | | | | | | | | |
| 1 | 1 | Alkali-soluble | 1.2 | 3770 | 740 | 5.1 | ○ | — | Δ | ○ | Δ | 65 |
| 2 | 2 | Alkali-soluble | 1.0 | 3550 | 710 | 5.0 | ○ | — | ○ | Δ | Δ | 55 |
| 3 | 2 | Alkali-soluble | 1.6 | 3730 | 690 | 5.4 | ○ | — | Δ | ○ | Δ | 65 |
| 4 | 2 | Urethane-associated | 1.2 | 1350 | 710 | 1.9 | — | ○ | ○ | Δ | Δ | 55 |
| 5 | 2 | Urethane-associated | 1.7 | 1230 | 770 | 1.6 | — | ○ | Δ | ○ | Δ | 65 |
| 6 | 3 | Alkali-soluble | 1.5 | 3690 | 710 | 5.2 | ○ | — | Δ | ○ | ○ | 60 |
| 7 | 4 | Alkali-soluble | 1.6 | 3940 | 730 | 5.4 | ○ | — | ○ | Δ | ◎ | 60 |
| 8 | 5 | Alkali-soluble | 1.7 | 3710 | 700 | 5.3 | ○ | — | ◎ | ○ | ◎ | 55 |
| 9 | 5 | Alkali-soluble | 2.1 | 4230 | 730 | 5.8 | ◎ | — | ◎ | ◎ | ○ | 65 |
| 10 | 5 | Urethane-associated | 1.4 | 1220 | 760 | 1.6 | — | ○ | ◎ | ○ | ◎ | 55 |
| 11 | 5 | Urethane-associated | 1.8 | 940 | 780 | 1.2 | — | ◎ | ○ | ◎ | ○ | 65 |
| 12 | 6 | Alkali-soluble | 2.2 | 4350 | 750 | 5.8 | ◎ | — | ◎ | ○ | ◎ | 65 |
| 13 | 2 | HEC | 1.0 | 3310 | 770 | 4.3 | Δ | Δ | ○ | Δ | Δ | 55 |
| Comp. Ex. | | | | | | | | | | | | |
| 1 | Comp. 1 | Alkali-soluble | 1.3 | 3640 | 700 | 5.2 | ○ | — | Δ | X | ○ | 60 |
| 2 | Comp. 2 | Alkali-soluble | 1.4 | 3520 | 690 | 5.1 | ○ | — | X | ○ | X | 60 |
| 3 | 2 | Alkali-soluble | 0.7 | 3360 | 730 | 4.6 | Δ | — | ○ | X | Δ | 40 |
| 4 | 2 | Urethane-associated | 0.8 | 1820 | 760 | 2.4 | Δ | — | ○ | X | Δ | 40 |
| 5 | 2 | Not used | — | 120 | 60 | 2.0 | X | Δ | Δ | Δ | Δ | 55 |

From the results as shown in Table 9, it can be seen that the coating composition for a sealer obtained in each example is excellent in sprayability or roll coatability, and forms a coated film which is excellent in water permeability resistance, blocking resistance and frost damage resistance.

[The Second Aspect of the Invention]

(1) Examples and Comparative Examples of Resin Emulsions for a Sealer Example 1

A flask equipped with a dropping funnel, a stirrer, a nitrogen gas inlet pipe, a thermometer and a reflux condenser was charged with 46 parts of deionized water.

A monomer component A was prepared by mixing 12.8 parts of styrene, 1.7 parts of methyl methacrylate and 0.5 parts of acrylic acid.

The monomer component A obtained above was mixed with 5 pars of deionized water and 2 parts of 25% aqueous solution of an emulsifier commercially available from Dai-Ichi Kogyo Seiyaku Co., Ltd. under the trade name of Aqualon HS-10, to prepare a pre-emulsion for dropping.

The obtained pre-emulsion for dropping in an amount of 1.5 parts, which was 1% of the total amount of the monomer component, was added to the above flask, and its temperature was raised to 80° C. while nitrogen gas was blown into the flask gently. Thereafter, 2 parts of 3.5% aqueous solution of ammonium persulfate was added to the above flask to initiate an initial emulsion polymerization.

Next, the rest of the pre-emulsion for dropping, 1 part of 3.5% aqueous solution of ammonium persulfate and 1 part of 2.5% aqueous solution of sodium hydrogensulfite were added dropwise to the flask over 40 minutes. After the completion of the dropwise addition, the temperature of the mixture was maintained at 80° C. for 60 minutes.

Thereafter, a monomer component B was prepared by mixing 1 part of acrylic acid, 76.5 parts of 2-ethylhexyl acrylate, 0.5 parts of hydroxyethyl methacrylate and 7 parts of acrylonitrile.

The obtained monomer component B was mixed with 29 pars of deionized water and 10 parts of 25% aqueous solution of an emulsifier commercially available from Dai-Ichi Kogyo Seiyaku Co., Ltd. under the trade name of Aqualon HS-10, to prepare a second-step pre-emulsion.

The obtained second-step pre-emulsion, 6 parts of 3.5% aqueous solution of ammonium persulfate and 6 parts of 2.5% aqueous solution of sodium hydrogensulfite were added dropwise to the flask over 200 minutes. After completion of the dropwise addition, the temperature of the mixture was maintained at 80° C. for 120 minutes, and the pH of the mixture in the flask, which was determined at 23° C. by using a pH meter commercially available from HORIBA, Ltd. under the product number of F-23 (hereinafter referred to the same), was controlled to 8.5 by adding 25% aqueous ammonia to the mixture, to complete the emulsion polymerization reaction. The resulting reaction mixture was cooled to room temperature, and thereafter, filtrated with a 300-mesh (JIS mesh, hereinafter referred to the same) metal screen, to give a resin emulsion for a sealer having a content of a nonvolatile component of 50%.

The composition of the monomer component used for the resin emulsion for a sealer and properties of the resin emulsion for a sealer are shown in Table 10 and Table 11, respectively.

Examples 2 to 11

A resin emulsion for a sealer was prepared in the same manner as in Example 1 except that the monomer component was changed to the monomer component as shown in Table 10, that the amount of 25% aqueous solution of an emulsifier was controlled so that the amount of the aqueous solution of an emulsifier became 2 parts per 15 parts of monomers, that the amount of deionized water which was added to a flask was controlled in accordance with the amount of the nonvolatile component, that the amount of deionized water was controlled so that the concentration of a monomer component in the components composed of a monomer component, an emulsifier and water became 68% when each layer is formed, that the period of time required for emulsion polymerization was determined in accordance with the equation:

[Period of time required for emulsion polymerization]
=[(Weight of monomers used in each layer)÷
(Weight of total monomers used)]×240 minutes, that the amount of the 3.5% aqueous solution of ammonium persulfate was determined when an emulsion polymerization other than an initial emulsion polymerization is carried out in accordance with the equation:

[Amount of the 3.5% aqueous solution of ammonium
persulfate]=[(Weight of a monomer component
in each layer)÷99]×7, that the amount of the 2.5% aqueous solution of sodium hydrogensulfite was determined in accordance with the equation:

[Amount of 2.5% aqueous solution of sodium hydrogensulfite]=[(Weight of a monomer component
in each layer)÷99]×7, and that the maintaining temperature after the dropwise addition of a monomer component which was used when each layer was formed was controlled to 80° C. and its temperature was maintained for 60 minutes in Example 1. The composition of the monomer component used for the resin emulsion for a sealer and properties of the resin emulsion for a sealer are shown in Table 10 and Table 11, respectively.

Incidentally, abbreviations listed in the following tables mean the followings:

[Meaning of Abbreviations Listed in the Tables]
St: styrene
MMA: methyl methacrylate
BA: butyl acrylate
2EHA: 2-ethylhexyl acrylate
AA: acrylic acid
MAA: methacrylic acid
HEMA: hydroxyethyl methacrylate
AN: acrylonitrile
TMSMA: gamma-methacryloxypropyltrimethoxysilane In addition, the terms listed in the tables mean the followings:

[Amount of St in Inner Layer]
Content (%) of styrene in the monomer component A used as a raw material of an inner layer
[Amount of Carboxylic Acid in Outer Layer]
Content (%) of a carboxyl group-containing monomer in the monomer component B used as a raw material of an outer layer
[Ratio of Each Layer]
Weight ratio of the polymer which constitutes the inner layer to the polymer which constitutes the outer layer [polymer of inner layer/polymer of outer layer]
[Total Amount of Inner and Outer Layers]
Total content (%) of the polymer of inner layer and the polymer of outer layer in an emulsion particle
[Tg of Outer Layer]
Glass transition temperature (° C.) of the polymer (II) which constitutes the outer layer
[Total Amount of St]
Content of styrene (%) in the total monomer components used as a raw material for the polymer which constitutes an emulsion particle

[Total Tg]

Glass transition temperature (° C.) of an emulsion particle

[MFT]

Minimum film-forming temperature (° C.) of a resin emulsion for a sealer

[Total Carboxylic Acid Amount]

Content (%) of a carboxyl group-containing monomer in total monomer components used as a raw material of a polymer which constitutes an emulsion particle

[Tg of Inner Layer]

Glass transition temperature (° C.) of a polymer which constitutes an inner layer

[Tg of the Other Layer]

Glass transition temperature (° C.) of a polymer which constitutes a layer other than an inner layer and an outer layer

[Amount of Nonvolatile Component]

Content (%) of a resin solid contained in a resin emulsion

[Average Particle Diameter]

Average particle diameter (nm) of emulsion particles

In the following tables, the layer 1 to the layer 5 show a polymerization order. Incidentally, the mark "-" which is used in the monomer component of the table means that the monomer is not used.

Comparative Example 1

A flask equipped with a dropping funnel, a stirrer, a nitrogen gas inlet pipe, a thermometer and a reflux condenser was charged with 28 parts of deionized water.

The dropping funnel was charged with 34 parts of deionized water, 12 parts of 25% aqueous solution of an emulsifier commercially available from Dai-Ichi Kogyo Seiyaku Co., Ltd. under the trade name of Aqualon HS-10, 15 parts of styrene, 33 parts of methyl methacrylate, 51 parts of 2-ethylhexyl acrylate and 1 part of acrylic acid, to prepare a pre-emulsion for dropping.

The obtained pre-emulsion for dropping in an amount of 1.5 parts, which was 1% of the total amount of the monomer component, was added to the above flask, and its temperature was raised to 80° C. while nitrogen gas was blown into the flask gently. Thereafter, 2 parts of 3.5% aqueous solution of ammonium persulfate was added to the above flask to initiate an initial emulsion polymerization.

Next, the rest of the pre-emulsion for dropping, 7 parts of 3.5% aqueous solution of ammonium persulfate and 7 part of 2.5% aqueous solution of sodium hydrogensulfite were added dropwise to the flask over 240 minutes. After the completion

TABLE 10

| | | | Example No. | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Composition of each layer (parts) | Layer 1 | 2EHA | — | — | — | — | — | — | — | — | — | 10 | — |
| | Layer 2 (Inner layer) | St | 12.8 | 13.5 | 15 | 13.5 | 10 | 25 | 13.5 | 13.5 | 25 | 15 | 30 |
| | | MMA | 1.7 | 0.5 | — | 0.5 | — | — | 0.5 | 0.5 | — | — | — |
| | | AA | 0.5 | 1 | — | 1 | — | — | 1 | 1 | — | — | — |
| | Layer 3 | MMA | — | — | — | — | — | — | — | — | 0.5 | — | — |
| | | BA | — | — | — | — | — | — | — | — | — | 10 | — |
| | | 2EHA | — | — | — | — | — | — | — | — | 57.3 | — | — |
| | | AA | — | — | — | — | — | — | — | — | 0.5 | — | — |
| | Layer 4 (Outer layer) | AA | 1 | — | 2 | 1 | 1.5 | 2 | — | — | 0.8 | 1.5 | 2 |
| | | MAA | — | 3 | — | — | — | — | 3 | 3 | — | — | — |
| | | St | — | 1 | — | — | 5 | — | 1 | 1 | — | — | — |
| | | MMA | — | — | — | 21 | — | — | — | — | 0.2 | 1.5 | — |
| | | BA | — | — | 80 | 59 | — | — | — | — | — | 50 | — |
| | | 2EHA | 76.5 | 79 | — | — | 73.5 | 69 | 79 | 81 | 14.7 | — | 64 |
| | | HEMA | 0.5 | — | — | — | — | — | 0.5 | — | — | — | — |
| | | AN | 7 | 2 | 3 | 4 | 10 | 4 | 1 | — | 1 | 2 | 4 |
| | | TMSMA | — | — | — | — | — | — | 0.5 | — | — | — | — |
| | Layer 5 | BA | — | — | — | — | — | — | — | — | — | 10 | — |

TABLE 11

| | | Example No. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| | Number of layer | 2 | 2 | 2 | 2 | 2 | 2 | 2 | 2 | 3 | 5 | 2 |
| Properties of resin emulsion | Amount of St in inner layer (%) | 85 | 90 | 100 | 90 | 100 | 100 | 100 | 90 | 100 | 100 | 100 |
| | Amount of carboxylic acid in outer layer (%) | 1.2 | 3.5 | 2.4 | 1.2 | 1.7 | 2.6 | 3.5 | 3.5 | 5.0 | 2.7 | 2.9 |
| | Ratio of each layer (inner layer/outer layer) (weight ratio) | 15/85 | 15/85 | 15/85 | 15/85 | 10/90 | 25/75 | 15/85 | 15/85 | 60/40 | 21/79 | 30/70 |
| | Total amount of inner and outer layers (%) | 100 | 100 | 100 | 100 | 100 | 100 | 100 | 100 | 40 | 70 | 100 |
| | Tg of outer layer (° C.) | −61 | −63 | −51 | −24 | −52 | −62 | −63 | −65 | −58 | −48 | −62 |
| | Total amount of St (%) | 12.8 | 14.5 | 15.0 | 13.5 | 15.0 | 25.0 | 14.5 | 14.5 | 25.0 | 15.0 | 30.0 |
| | Total Tg (° C.) | −46 | −48 | −36 | −11 | −42 | −36 | −48 | −49 | −40 | −38 | −30 |
| | MFT (° C.) | <0 | <0 | <0 | 5 | <0 | <0 | <0 | <0 | <0 | <0 | <0 |
| | Total carboxylic acid amount(%) | 1.5 | 4.0 | 2.0 | 2.0 | 1.5 | 2.0 | 4.0 | 4.0 | 1.3 | 1.5 | 2.0 |
| | Tg of inner layer (° C.) | 100 | 100 | 100 | 100 | 100 | 100 | 100 | 100 | 100 | 100 | 100 |
| | Tg of the other layer (° C.) | — | — | — | — | — | — | — | — | −68 (Layer 1) | −70 (Layer 1)/ −56 (Layer 3)/ −56 (Layer 5) | — |
| | Amount of nonvolatile component(%) | 50.0 | 55.0 | 60.0 | 55.0 | 55.0 | 55.0 | 55.0 | 55.0 | 55.0 | 55.0 | 55.0 |
| | Average particle diameter (nm) | 280 | 280 | 350 | 280 | 280 | 280 | 280 | 280 | 300 | 280 | 280 | of the dropwise addition, the temperature of the mixture was maintained at 80° C. for 120 minutes. Thereafter, the pH of the mixture in the flask was controlled to 8.5 by adding 25% aqueous ammonia to the mixture, to complete the emulsion polymerization reaction.

The resulting reaction mixture was cooled to room temperature, and thereafter, filtrated with a 300-mesh (JIS mesh, hereinafter referred to the same) metal screen, to give a resin emulsion for a sealer.

The composition of the monomer component used for the resin emulsion for a sealer and properties of the resin emulsion for a sealer are shown in Table 12 and Table 13, respectively.

Comparative Examples 2 to 8

A resin emulsion for a sealer was prepared in the same manner as in Comparative Example 1 except that the monomer component was changed to the monomer component as shown in Table 12, that the amount of 25% aqueous solution of an emulsifier was controlled so that the amount of the aqueous solution of an emulsifier became 2 parts per 15 parts of monomers, that the amount of deionized water which was added to a flask was controlled in accordance with the amount of the nonvolatile component, that the amount of deionized water was controlled so that the concentration of the monomer component in the components composed of a monomer component, an emulsifier and water became 68% when each layer was formed, that the period of time required for emulsion polymerization was determined in accordance with the equation:

[Period of time required for emulsion polymerization]=[(Weight of monomers used in each layer)÷(Weight of total monomers used)]×240 minutes, that the amount of the 3.5% aqueous solution of ammonium persulfate was determined when an emulsion polymerization other than an initial emulsion polymerization is carried out in accordance with the equation:

[Amount of the 3.5% aqueous solution of ammonium persulfate]=[(Weight of a monomer component in each layer)÷99]×7, that the amount of the 2.5% aqueous solution of sodium hydrogensulfite was determined in accordance with the equation:

[Amount of 2.5% aqueous solution of sodium hydrogensulfite]=[(Weight of a monomer component in each layer)÷99]×7, and that the maintaining temperature after the dropwise addition of a monomer component which was used when each layer was formed was controlled to 80° C. and its temperature was maintained for 60 minutes in Example 1. The composition of the monomer component used for the resin emulsion for a sealer and properties of the resin emulsion for a sealer are shown in Table 12 and Table 13, respectively.

TABLE 12

| | | | Comparative Example No. | | | | | | | |
|---|---|---|---|---|---|---|---|---|---|---|
| | | | 1 | 2 | 3 | 4 | 5 | 6 | 7 | 8 |
| Composition of each layer (parts) | Layer 1 (Inner layer) | St | 15 | 11 | 13.5 | 13.5 | 13.5 | 5 | 25 | 4.5 |
| | | MMA | 33 | 3 | 0.5 | 0.5 | 0.5 | — | — | — |
| | | AA | 1 | 1 | 1 | 1 | 1 | — | — | 0.5 |
| | | 2EHA | 51 | — | — | — | — | — | — | — |
| | Layer 2 | MMA | — | — | — | — | — | — | 0.5 | 0.5 |
| | | 2EHA | — | — | — | — | — | — | 64 | 49 |
| | | AA | — | — | — | — | — | — | 0.5 | 0.5 |
| | Layer 3 (Outer layer) | AA | — | — | — | — | 1.5 | 1.5 | 0.4 | 1 |
| | | MAA | — | 3 | 0.5 | 9.4 | — | — | — | — |
| | | St | — | 1 | 1 | — | — | 5 | — | — |
| | | MMA | — | — | 2.5 | — | 42 | — | 0.2 | — |
| | | BA | — | — | — | — | 40.5 | — | — | — |
| | | 2EHA | — | 79 | 79 | 74.6 | — | 78.5 | 8.4 | 42 |
| | | AN | — | 2 | 2 | 1 | 1 | 10 | 1 | 2 |

TABLE 13

| | | Comparative Example No. | | | | | | | |
|---|---|---|---|---|---|---|---|---|---|
| | | 1 | 2 | 3 | 4 | 5 | 6 | 7 | 8 |
| Properties of resin emulsion | Number of layer | 1 | 2 | 2 | 2 | 2 | 2 | 3 | 3 |
| | Amount of St in inner layer (%) | — | 73 | 90 | 90 | 90 | 100 | 100 | 90 |
| | Amount of carboxylic acid in outer layer (%) | — | 3.5 | 0.6 | 11.0 | 1.7 | 1.7 | 4.0 | 2.0 |
| | Ratio of each layer (inner layer/outer layer) (weight ratio) | — | 15/85 | 15/85 | 15/85 | 15/85 | 5/95 | 71/29 | 10/90 |
| | Total amount of inner and outer layers (%) | — | 100 | 100 | 100 | 100 | 100 | 35 | 50 |
| | Tg of outer layer (° C.) | — | −63 | −63 | −57 | 6 | −53 | −54 | −64 |
| | Total amount of St (%) | 15.0 | 12.0 | 14.5 | 13.5 | 13.5 | 10.0 | 25.0 | 4.5 |
| | Total Tg (° C.) | −11 | −48 | −48 | −42 | 17 | −48 | −41 | −61 |
| | MFT (° C.) | <0 | <0 | <0 | <0 | 35 | <0 | <0 | <0 |
| | Total carboxylic acid amount (%) | 1.0 | 4.0 | 1.5 | 10.4 | 2.5 | 1.5 | 1.3 | 4.0 |
| | Tg of inner layer (° C.) | — | 101 | 100 | 100 | 100 | 100 | 100 | 46 |
| | Tg of the other layer (° C.) | — | — | — | — | — | — | −69 | −68 |
| | Amount of nonvolatile component (%) | 55.0 | 55.0 | 55.0 | 55.0 | 55.0 | 55.0 | 55.0 | 55.0 |
| | Average particle diameter (nm) | 280 | 280 | 280 | 280 | 280 | 280 | 300 | 280 |

Experimental Example

A resin emulsion for a sealer obtained in each working example or each comparative example was used. In the resin emulsion for a sealer having a content of a nonvolatile component of 50%, 100 parts of the resin emulsion for a sealer was mixed with 33 parts of water. In the resin emulsion for a sealer having a content of a nonvolatile component of 55%, 91 parts of the resin emulsion for a sealer was mixed with 42 parts of water. Also, in the resin emulsion for a sealer having a content of a nonvolatile component of 60%, 83 parts of the resin emulsion for a sealer was mixed with 50 parts of water.

While the mixture obtained by mixing the resin emulsion for a sealer with water mentioned above was stirred at a rotational speed of 1000 min$^{-1}$ with a disperser, this mixture was mixed with 2,2,4-trimethyl-1,3-pentanediol monoisobutylate commercially available from Chisso Corporation under the product number of CS-12 as a film-forming aid so that the film-forming temperature became 0° C. To the resulting mixture, 4 parts of a dispersing agent commercially available from San Nopco Limited under the trade name of Nopco Sperse 44C, 100 parts of calcium carbonate commercially available from Nitto Funka Kogyo K.K. under the product number of NS #100, 100 parts of calcium carbonate commercially available from Nitto Funka Kogyo K.K. under the product number of NN #200, 9 parts of zinc oxide and 0.8 parts of a defoaming agent commercially available from San Nopco Limited under the trade name of Nopco 8034L were added under stirring. Thereafter, the mixture was stirred at a rotational speed of 3000 min$^{-1}$ for 5 minutes, and then the rotational speed was controlled to 1000 min$^{-1}$.

Next, 3% aqueous solution of a thickener commercially available from Daicel Chemical Industries, Ltd. under the trade name of SP-850 was added to this mixture so that the viscosity of the resulting mixture became 15000 mPa-s at a rotational speed of 20 min$^{-1}$ at 25° C. when determined by using a BH-type viscometer commercially available from Tokyo Keiki Inc., and the mixture was stirred for 30 minutes, to give a paint sealer. This paint sealer was allowed to stand at room temperature for 1 day or more.

Next, a flexible board commercially available from Nippon Testpanel Co., Ltd. was coated with this paint sealer so that a coated film having a dry film thickness of 0.5 mm was formed, and dried in an atmosphere having a temperature of 23° C. and a relative humidity of 50% for 14 days, to give a test panel. The following physical properties were evaluated by using the obtained test panel. The results are shown in Table 14. Incidentally, the paint sealer having at least one evaluation of "x" in the physical properties is unacceptable.

<Water Permeability Resistance>

A funnel having a diameter of 10 cm was placed on the coated film formed on the test panel, and their contact portion was sealed with a silicone bath bond commercially available from Konishi Co., Ltd. Thereafter, in accordance with "funnel method" prescribed in JIS K 5400, reduced amount of water after 24 hours passed was determined, and the water permeability resistance was evaluated in accordance with the following criteria for evaluation.

(Criteria for Evaluation)
⊚: Less than 0.3 mL/cm$^2$
○: Not less than 0.3 mL/cm$^2$ and less than 0.5 mL/cm$^2$
Δ: Not less than 0.5 mL/cm$^2$ and less than 1.0 mL/cm$^2$
x: Not less than 1.0 mL/cm$^2$ <Frost Damage Resistance>

A repeated heating and cooling test according to JIS A 6909 was carried out. More specifically, after the side and back surfaces of the test panel, on which a coated film was not formed were sealed with a silicone bath bond commercially available from Konishi Co., Ltd., 20 cycles of a process were carried out, one cycle comprising cooling the test panel to −20° C. in the air for 3 hours to freeze the test panel, and heating the test panel in the air of 50° C. for 3 hours, while the generation of a crack on the coated film was observed with a loupe having a magnification of 30 times every 4 cycles. The frost damage resistance was evaluated in accordance with the following criteria for evaluation.

(Criteria for Evaluation)
⊚: After 20 cycles, no problem was observed.
○: After 16 cycles, no problem was observed, but after 20 cycles, a crack was observed.
Δ: After 12 cycles, no problem was observed, but after 16 cycles, a crack was observed.
x: After 4 cycles, 8 cycles or 12 cycles, a crack was observed.

<Adhesion>

The coated film of the test panel was cut by means of a utility knife so that 100 cross-cut squares having a length of 2 mm each side were formed, and a cellophane adhesive tape commercially available from Nichiban Co., Ltd. under the product number of CT405AP-18 was stuck on these squares. Thereafter, a peeling test was carried out in accordance with JIS K 5400, and the number of the cross-cut squares remaining on the test panel was counted. The adhesion was evaluated in accordance with the following criteria for evaluation.

(Criteria for Evaluation)
⊚: All of the cross-cut squares are remaining.
○: Number of remaining cross-cut squares is not less than 98.
Δ: Number of remaining cross-cut squares is 90 to 97.
x: Number of remaining cross-cut squares is not more than 89.

<Elongation Property>

A sheet of exfoliate paper was put on a metallic plate. The paint sealer obtained above was applied onto the exfoliate paper so as to form a coated film having a dry film thickness of 0.5 mm, and the metallic plate was allowed to stand in an atmosphere having a temperature of 23° C. and a relative humidity of 50% for 7 days to dry the coated film. Thereafter, the formed coated film was removed from the exfoliate paper, and the removed coated film was turned upside down. The removed coated film was put on the exfoliate paper, and allowed to stand for additional 7 days for drying, to give a test body.

Next, a dumbbell specimen having No. 2 type shape as defined by JIS K 6251, item 4.1 was stamped out from the test body, and the exfoliate paper was removed from the dumbbell specimen, to give a test piece. The obtained test piece was attached to a tension tester so that the distance between two chucks became 60 mm, and a tensile load was applied to the test piece at a tensile rate of 200 mm/min until the test piece was broken. The maximum tensile load and the elongation of the test piece between the chucks at break were measured, and film strength and elongation percentage were evaluated in accordance with the following criteria for evaluation.

(1) Criteria for Evaluation of Film Strength
⊚: Maximum tensile load is not less than 2 N/mm$^2$.
○: Maximum tensile load is not less than 1.5 N/mm$^2$ and less than 2 N/mm$^2$.
Δ: Maximum tensile load is not less than 1.0 N/mm$^2$ and less than 1.5 N/mm$^2$.
x: Maximum tensile load is less than 1.0 N/mm$^2$.

(2) Criteria for Evaluation of Elongation Percentage
⊚: Elongation percentage is not less than 50%.
○: Elongation percentage is not less than 30% and less than 50%.

Δ: Elongation percentage is not less than 10% and less than 30%.

x: Elongation percentage is less than 10%.

<Burden on Environment>

The minimum film-forming temperature of a resin emulsion for a sealer has been generally controlled to a temperature of not more than 0° C. in order to impart film-forming property to the resin emulsion. When the minimum film-forming temperature is controlled, a film-forming aid has been used. However, since the film-forming aid is a volatile substance, it has been desired to reduce the amount of the film-forming aid as much as possible from the viewpoint of the reduction of environmental burden.

Thereupon, the burden on environment was evaluated based on the amount of the film-forming aid which was necessitated for a resin emulsion for a sealer. Its criteria for evaluation are as follows:

(Criteria for Evaluation)

◉: Content of a film-forming aid in the resin emulsion for a sealer is less than 1%.

○: Content of a film-forming aid in the resin emulsion for a sealer is not less than 0.5% and less than 1%.

Δ: Content of a film-forming aid in the resin emulsion for a sealer is not less than 1% and less than 2%.

x: Content of a film-forming aid in the resin emulsion for a sealer is not less than 2%.

can be greatly reduced, it can be seen that the resin emulsion for a sealer is excellent in environmental protection.

(2) Examples and Comparative Examples of a Resin Composition for a Sealer

Production Example 1

A flask equipped with a dropping funnel, a stirrer, a nitrogen gas inlet pipe, a thermometer and a reflux condenser was charged with 46 parts of deionized water.

A monomer component A was prepared by mixing 12.8 parts of styrene, 1.7 parts of methyl methacrylate and 0.5 parts of acrylic acid.

The monomer component A obtained above was mixed with 5 pars of deionized water and 2 parts of 25% aqueous solution of an emulsifier commercially available from Dai-Ichi Kogyo Seiyaku Co., Ltd. under the trade name of Aqualon HS-10, to prepare a pre-emulsion for dropping.

The obtained pre-emulsion for dropping in an amount of 1.5 parts, which was 1% of the total amount of the monomer component, was added to the above flask, and its temperature was raised to 80° C. while nitrogen gas was blown into the flask gently. Thereafter, 2 parts of 3.5% aqueous solution of ammonium persulfate was added to the above flask to initiate an initial emulsion polymerization.

TABLE 14

| Example and Comparative Example No. | Physical properties of paint sealer | | | | | |
|---|---|---|---|---|---|---|
| | Water permeability resistance | Frost damage resistance | Adhesion | Film strength | Elongation property Elongation percentage | Burden on Environment |
| Example | | | | | | |
| 1 | ○ | ○ | ◉ | ◉ | ◉ | ◉ |
| 2 | ◉ | ◉ | ◉ | ◉ | ◉ | ◉ |
| 3 | ◉ | ◉ | ◉ | ◉ | ◉ | ◉ |
| 4 | ◉ | ◉ | ◉ | ◉ | ○ | ○ |
| 5 | ◉ | ◉ | ◉ | ○ | ◉ | ◉ |
| 6 | ◉ | ◉ | ◉ | ◉ | ○ | ◉ |
| 7 | ◉ | ◉ | ◉ | ◉ | ◉ | ◉ |
| 8 | ◉ | ◉ | ◉ | ◉ | ○ | ◉ |
| 9 | ◉ | ○ | ◉ | ○ | ○ | ◉ |
| 10 | ◉ | ◉ | ◉ | ◉ | ◉ | ◉ |
| 11 | ◉ | ○ | ◉ | ◉ | Δ | ◉ |
| Comp. Ex. | | | | | | |
| 1 | Δ | ○ | ○ | ○ | X | Δ |
| 2 | Δ | X | ◉ | ◉ | ◉ | ◉ |
| 3 | ○ | ◉ | X | X | ○ | ◉ |
| 4 | ○ | X | ◉ | ◉ | X | ◉ |
| 5 | ◉ | X | ○ | ◉ | X | X |
| 6 | ◉ | ◉ | ◉ | X | ◉ | ◉ |
| 7 | ◉ | Δ | ◉ | X | Δ | ◉ |
| 8 | ◉ | ◉ | ◉ | X | ◉ | ◉ |

From the results as shown in Table 14, it can be seen that the resin emulsion for a sealer obtained in each example forms a coated film which is excellent in water permeability resistance, frost damage resistance and film strength. In addition, since the resin emulsion for a sealer obtained in each example can form a coated film which is excellent in water permeability resistance, frost damage resistance and elongation property without the lowering of adhesion even when a pigment is used therein in a fixed amount, the resin emulsion for a sealer has a high economic value. Moreover, according to the resin emulsion for a sealer, since the amount of a film-forming aid Next, the rest of the pre-emulsion for dropping, 1 part of 3.5% aqueous solution of ammonium persulfate and 1 part of 2.5% aqueous solution of sodium hydrogensulfite were added dropwise to the flask over 40 minutes. After the completion of the dropwise addition, the temperature of the mixture was maintained at 80° C. for 60 minutes.

Thereafter, a monomer component B was prepared by mixing 1 part of acrylic acid, 76.5 parts of 2-ethylhexyl acrylate, 0.5 parts of hydroxyethyl methacrylate and 7 parts of acrylonitrile.

The obtained monomer component B was mixed with 29 pars of deionized water and 10 parts of 25% aqueous solution of an emulsifier commercially available from Dai-Ichi Kogyo Seiyaku Co., Ltd. under the trade name of Aqualon HS-10, to prepare a second-step pre-emulsion.

The obtained second-step pre-emulsion, 6 parts of 3.5% aqueous solution of ammonium persulfate and 6 parts of 2.5% aqueous solution of sodium hydrogensulfite were added dropwise to the flask over 200 minutes. After completion of the dropwise addition, the temperature of the mixture was maintained at 80° C. for 120 minutes, and the pH of the mixture in the flask, which was determined at 23° C. by using a pH meter commercially available from HORIBA, Ltd. under the product number of F-23 (hereinafter referred to the same), was controlled to 8.5 by adding 25% aqueous ammonia to the mixture, to complete the emulsion polymerization reaction. The resulting reaction mixture was cooled to room temperature, and thereafter, filtrated with a 300-mesh (JIS mesh, hereinafter referred to the same) metal screen, to give a resin emulsion for a sealer having a content of a nonvolatile component of 50%.

The composition of the monomer component used for the resin emulsion for a sealer and properties of the resin emulsion for a sealer are shown in Table 15 and Table 16, respectively.

Production Examples 2 to 11

A resin emulsion for a sealer was prepared in the same manner as in Production Example 1 except that the monomer component was changed to the monomer component as shown in Table 15, that the amount of 25% aqueous solution of an emulsifier was controlled so that the amount of the aqueous solution of an emulsifier became 2 parts per 15 parts of monomers, that the amount of deionized water which was added to a flask was controlled in accordance with the amount of the nonvolatile component, that the amount of deionized water was controlled so that the concentration of the monomer component in the components composed of a monomer component, an emulsifier and water became 68%, that the period of time required for emulsion polymerization was determined in accordance with the equation:

[Period of time required for emulsion polymerization]=[(Weight of monomers used in each layer)÷(Weight of total monomers used)]×240 minutes, that the amount of the 3.5% aqueous solution of ammonium persulfate was determined when an emulsion polymerization other than an initial emulsion polymerization is carried out in accordance with the equation:

[Amount of the 3.5% aqueous solution of ammonium persulfate]=[(Weight of a monomer component in each layer)÷99]×7, that the amount of the 2.5% aqueous solution of sodium hydrogensulfite was determined in accordance with the equation:

[Amount of 2.5% aqueous solution of sodium hydrogensulfite]=[(Weight of a monomer component in each layer)÷99]×7, and that the maintaining temperature after the dropwise addition of a monomer component which was used when each layer was formed was controlled to 80° C. and its temperature was maintained for 60 minutes in Production Example 1. The composition of the monomer component used for the resin emulsion for a sealer and properties of the resin emulsion for a sealer are shown in Table 15 and Table 16, respectively.

Production Example 12

A flask equipped with a dropping funnel, a stirrer, a nitrogen gas inlet pipe, a thermometer and a reflux condenser was charged with 28 parts of deionized water.

The dropping funnel was charged with 34 pars of deionized water, 12 parts of 25% aqueous solution of an emulsifier commercially available from Dai-Ichi Kogyo Seiyaku Co., Ltd. under the trade name of Aqualon HS-10, 15 parts of styrene, 33 parts of methyl methacrylate, 51 parts of 2-ethylhexyl acrylate and 1 part of acrylic acid, to prepare a pre-emulsion for dropping.

The obtained pre-emulsion for dropping in an amount of 1.5 parts, which was 1% of the total amount of the monomer component, was added to the above flask, and its temperature was raised to 80° C. while nitrogen gas was blown into the flask gently. Thereafter, 2 parts of 3.5% aqueous solution of ammonium persulfate was added to the above flask to initiate an initial emulsion polymerization.

Next, the rest of the pre-emulsion for dropping, 7 parts of 3.5% aqueous solution of ammonium persulfate and 7 part of 2.5% aqueous solution of sodium hydrogensulfite were added dropwise to the flask over 240 minutes. After the completion of the dropwise addition, the temperature of the mixture was maintained at 80° C. for 120 minutes. Thereafter, 25% aqueous ammonia was added to the above flask in order to control the pH of the mixture in the flask to 8.5, to complete the emulsion polymerization reaction.

The resulting reaction mixture was cooled to room temperature, and thereafter, filtrated with a 300-mesh (JIS mesh, hereinafter referred to the same) metal screen, to give a resin emulsion for a sealer.

The composition of the monomer component used for the resin emulsion for a sealer and properties of the resin emulsion for a sealer are shown in Table 15 and Table 16, respectively.

Production Example 13

A resin emulsion for a sealer was prepared in the same manner as in Production Example 1 except that the monomer component was changed to the monomer component as shown in Table 15, that the amount of 25% aqueous solution of an emulsifier was controlled so that the amount of the aqueous solution of an emulsifier became 2 parts per 15 parts of the monomers, that the amount of deionized water which was added to a flask was controlled in accordance with the amount of the nonvolatile component, that the amount of deionized water was controlled so that the concentration of the monomer component in the components composed of a monomer component, an emulsifier and water became 68%, that the period of time required for emulsion polymerization was obtained in accordance with the equation:

[Period of time required for emulsion polymerization]=[(Weight of monomers used in each layer)÷(Weight of total monomers used)]×240 minutes, that the amount of the 3.5% aqueous solution of ammonium persulfate was determined when an emulsion polymerization other than an initial emulsion polymerization is carried out in accordance with the equation:

[Amount of the 3.5% aqueous solution of ammonium persulfate]=[(Weight of a monomer component in each layer)÷99]×7, that the amount of the 2.5% aqueous solution of sodium hydrogensulfite was determined in accordance with the equation:

[Amount of 2.5% aqueous solution of sodium hydrogensulfite]=[(Weight of a monomer component in each layer)÷99]×7, and that the maintaining temperature after the dropwise addition of a monomer component which was used when each layer was formed was controlled to 80° C., and its temperature was maintained for 60 minutes in Production Example 1. The composition of the monomer component used for the resin emulsion for a sealer and properties of the resin emulsion for a sealer are shown in Table 15 and Table 16, respectively.

Incidentally, abbreviations listed in the following tables mean the followings:

[Meaning of Abbreviations Listed in the Tables]
St: styrene
MMA: methyl methacrylate
BA: butyl acrylate
2EHA: 2-ethylhexyl acrylate
AA: acrylic acid
MAA: methacrylic acid
HEMA: hydroxyethyl methacrylate
AN: acrylonitrile
TMSMA: gamma-methacryloxypropyltrimethoxysilane In addition, the terms listed in the tables mean the followings:

[Amount of St in Inner Layer]
Content (%) of styrene in the monomer component A used as a raw material of an inner layer

[Amount of Carboxylic Acid in Outer Layer]
Content (%) of a carboxyl group-containing monomer in the monomer component B used as a raw material of an outer layer

[Ratio of Each Layer]
Weight ratio of the polymer which constitutes the inner layer to the polymer which constitutes the outer layer [polymer of inner layer/polymer of outer layer]

[Total Amount of Inner and Outer Layers]
Total content (%) of the polymer of inner layer and the polymer of outer layer in an emulsion particle

[Tg of Outer Layer]
Glass transition temperature (° C.) of the polymer (II) which constitutes the outer layer

[Total Amount of St]
Content of styrene (%) in the total monomer components used as a raw material for the polymer which constitutes an emulsion particle

[Total Tg]
Glass transition temperature (° C.) of an emulsion particle

[MFT]
Minimum film-forming temperature (° C.) of a resin emulsion for a sealer

[Total Carboxylic Acid Amount]
Content (%) of a carboxyl group-containing monomer in total monomer components used as a raw material of a polymer which constitutes an emulsion particle

[Tg of Inner Layer]
Glass transition temperature (° C.) of a polymer which constitutes an inner layer

[Tg of the Other Layer]
Glass transition temperature (° C.) of a polymer which constitutes a layer other than an inner layer and an outer layer

[Amount of Nonvolatile Component]
Content (%) of a resin solid contained in a resin emulsion

[Average Particle Diameter]
Average particle diameter (nm) of emulsion particles In the following tables, the layer 1 to the layer 5 show a polymerization order. Incidentally, the mark "-" which is used in the monomer component of the table means that the monomer is not used.

TABLE 15

| | | | | | | | Production Example No. | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Composition of each layer (parts) | Layer 1 | 2EHA | — | — | — | — | — | — | — | — | — | 10 | — | — | — |
| | Layer 2 (inner layer) | St | 12.8 | 13.5 | 15 | 13.5 | 10 | 25 | 13.5 | 13.5 | 25 | 15 | 30 | 15 | 13.5 |
| | | MMA | 1.7 | 0.5 | — | 0.5 | — | — | 0.5 | 0.5 | — | — | — | 33 | 0.5 |
| | | AA | 0.5 | 1 | — | 1 | — | — | 1 | 1 | — | — | — | 1 | 1 |
| | | 2EHA | — | — | — | — | — | — | — | — | — | — | — | 51 | — |
| | Layer 3 | MMA | — | — | — | — | — | — | — | — | 0.5 | — | — | — | — |
| | | BA | — | — | — | — | — | — | — | — | — | 10 | — | — | — |
| | | 2EHA | — | — | — | — | — | — | — | — | 57.3 | — | — | — | — |
| | | AA | — | — | — | — | — | — | — | — | 0.5 | — | — | — | — |
| | Layer 4 (outer layer) | AA | 1 | — | 2 | 1 | 1.5 | 2 | — | — | 0.8 | 1.5 | 2 | — | 1.5 |
| | | MAA | — | 3 | — | — | — | — | 3 | 3 | — | — | — | — | — |
| | | St | — | 1 | — | — | 5 | — | 1 | 1 | — | — | — | — | — |
| | | MMA | — | — | — | 21 | — | — | — | — | 0.2 | 1.5 | — | — | 42 |
| | | BA | — | — | 80 | 59 | — | — | — | — | — | 50 | — | — | 40.5 |
| | | 2EHA | 76.5 | 79 | — | — | 73.5 | 69 | 79 | 81 | 14.7 | — | 64 | — | — |
| | | HEMA | 0.5 | — | — | — | — | — | 0.5 | — | — | — | — | — | — |
| | | AN | 7 | 2 | 3 | 4 | 10 | 4 | 1 | — | 1 | 2 | 4 | — | 1 |
| | | TMSMA | — | — | — | — | — | — | 0.5 | — | — | — | — | — | — |
| | Layer 5 | BA | — | — | — | — | — | — | — | — | — | 10 | — | — | — |

TABLE 16

| | | | | | | | Production Example No. | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| Properties of resin emulsion | Number of layer | 2 | 2 | 2 | 2 | 2 | 2 | 2 | 2 | 3 | 5 | 2 | 1 | 2 |
| | Amount of St in inner layer (%) | 85 | 90 | 100 | 90 | 100 | 100 | 100 | 90 | 100 | 100 | 100 | — | 90 |
| | Amount of carboxylic acid in outer layer (%) | 1.2 | 3.5 | 2.4 | 1.2 | 1.7 | 2.6 | 3.5 | 3.5 | 5.0 | 2.7 | 2.9 | — | 1.7 |
| | Ratio of each layer (inner layer/outer layer) (weight ratio) | 15/85 | 15/85 | 15/85 | 15/85 | 10/90 | 25/75 | 15/85 | 15/85 | 60/40 | 21/79 | 30/70 | — | 15/85 |

TABLE 16-continued

| | Production Example No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Total amount of inner and outer layers (%) | 100 | 100 | 100 | 100 | 100 | 100 | 100 | 100 | 40 | 70 | 100 | — | 100 |
| Tg of outer layer (° C.) | −61 | −63 | −51 | −24 | −52 | −62 | −63 | −65 | −58 | −48 | −62 | — | 6 |
| Total amount of St (%) | 12.8 | 14.5 | 15.0 | 13.5 | 15.0 | 25.0 | 14.5 | 14.5 | 25.0 | 15.0 | 30.0 | 15.0 | 13.5 |
| Total Tg (° C.) | −46 | −48 | −36 | −11 | −42 | −36 | −48 | −49 | −40 | −38 | −30 | −11 | 17 |
| MFT (° C.) | <0 | <0 | <0 | 5 | <0 | <0 | <0 | <0 | <0 | <0 | <0 | <0 | 35 |
| Total carboxylic acid amount(%) | 1.5 | 4.0 | 2.0 | 2.0 | 1.5 | 2.0 | 4.0 | 4.0 | 1.3 | 1.5 | 2.0 | 1.0 | 2.5 |
| Tg of inner layer (° C.) | 100 | 100 | 100 | 100 | 100 | 100 | 100 | 100 | 100 | 100 | 100 | — | 100 |
| Tg of the other layer (° C.) | — | — | — | — | — | — | — | — | −68 (Layer 1) | −70 (Layer 1)/ −56 (Layer 3)/ −56 (Layer 5) | — | — | — |
| Amount of nonvolatile component (%) | 50.0 | 55.0 | 60.0 | 55.0 | 55.0 | 55.0 | 55.0 | 55.0 | 55.0 | 55.0 | 55.0 | 55.0 | 55.0 |
| Average particle diameter (nm) | 280 | 280 | 350 | 280 | 280 | 280 | 280 | 280 | 300 | 280 | 280 | 280 | 280 |

Examples 1 to 11 and Comparative Examples 1 and 2

A resin emulsion for a sealer obtained in each production example was used. The number of the production example of the resin emulsion for a sealer used in each example or each comparative example is shown in Table 17.

In the resin emulsion for a sealer having a content of a nonvolatile component of 50%, 100 parts of the resin emulsion for a sealer was mixed with 33 parts of water. In the resin emulsion for a sealer having a content of a nonvolatile component of 55%, 91 parts of the resin emulsion for a sealer was mixed with 42 parts of water. Also, in the resin emulsion for a sealer having a content of a nonvolatile component of 60%, 83 parts of the resin emulsion for a sealer was mixed with 50 parts of water.

While the mixture obtained by mixing the resin emulsion for a sealer with water in the above was stirred at a rotational speed of 1000 min$^{-1}$ with a disperser, this mixture was mixed with 2,2,4-trimethyl-1,3-pentanediol monoisobutylate commercially available from Chisso Corporation under the product number of CS-12 as a film-forming aid so that the film-forming temperature became 0° C. To the resulting mixture, 4 parts of a dispersing agent commercially available from San Nopco Limited under the trade name of Nopco Sperse 44C, 100 parts of calcium carbonate commercially available from Nitto Funka Kogyo K.K. under the product number of NS #100, 100 parts of calcium carbonate commercially available from Nitto Funka Kogyo K.K. under the product number of NN #200, 9 parts of zinc oxide and 0.8 parts of a defoaming agent commercially available from San Nopco Limited under the trade name of Nopco 8034L were added under stirring. Thereafter, the mixture was stirred at a rotational speed of 3000 min$^{-1}$ for 5 minutes, and then the rotational speed was controlled to 1000 min$^{-1}$.

Next, 3% aqueous solution of a thickener commercially available from Daicel Chemical Industries, Ltd. under the trade name of SP-850 was added to this mixture so that the viscosity of the resulting mixture became 15000 mPa·s at a rotational speed of 20 min$^{-1}$ at 25° C. when determined by using a BH-type viscometer commercially available from Tokyo Keiki Inc., and the mixture was stirred at this rotational speed for 30 minutes, to give a paint sealer. This paint sealer was allowed to stand at room temperature for 1 day or more.

Next, a flexible board commercially available from Nippon Testpanel Co., Ltd. was coated with this paint sealer so that a coated film having a dry film thickness of 0.5 mm was formed, and dried in an atmosphere having a temperature of 23° C. and a relative humidity of 50% for 14 days, to give a test panel. The following physical properties were evaluated by using the obtained test panel. The results are shown in Table 17. Incidentally, the paint sealer having at least one evaluation of "x" in the physical properties is rejected.

<Content of Pigment>

The content of a pigment was determined in accordance with the equation:

[Content of pigment(%)]=([Weight of pigment]÷
[Weight of nonvolatile component of resin]+
[Weight of pigment])×100.

<Water Permeability Resistance>

A funnel having a diameter of 10 cm was placed on the coated film formed on the test panel, and their contact portion was sealed with a silicone bath bond commercially available from Konishi Co., Ltd. Thereafter, in accordance with "funnel method" prescribed in JIS K 5400, reduced amount of water after 24 hours passed was determined, and the water permeability resistance was evaluated in accordance with the following criteria for evaluation.

(Criteria for Evaluation)

⊚: Less than 0.3 mL/cm$^2$
○: Not less than 0.3 mL/cm$^2$ and less than 0.5 mL/cm$^2$
Δ: Not less than 0.5 mL/cm$^2$ and less than 1.0 mL/cm$^2$
x: Not less than 1.0 mL/cm$^2$ <Frost Damage Resistance>

A repeated heating and cooling test according to JIS A 6909 was carried out. More specifically, after the side and back surfaces of the test panel, on which a coated film was not formed were sealed with a silicone bath bond commercially available from Konishi Co., Ltd., 20 cycles of a process were carried out, one cycle comprising cooling the test panel to −20° C. in the air for 3 hours to freeze the test panel, and heating the test panel in the air of 50° C. for 3 hours, while the generation of a crack on coated film was observed with a loupe having a magnification of 30 times every 4 cycles. Thereafter, the frost damage resistance was evaluated in accordance with the following criteria for evaluation.

(Criteria for Evaluation)

⊚: After 20 cycles, no problem was observed.
○: After 16 cycles, no problem was observed, but after 20 cycles, a crack was observed.
Δ: After 12 cycles, no problem was observed, but after 16 cycles, a crack was observed.
x: After 4 cycles, 8 cycles or 12 cycles, a crack was observed.

<Adhesion>

The coated film of the test panel was cut by means of a utility knife so that 100 cross-cut squares having a length of 2 mm in one side were formed, and a cellophane adhesive tape commercially available from Nichiban Co., Ltd. under the product number of CT405AP-18 was stuck on these squares. Thereafter, a peeling test was carried out in accordance with JIS K 5400, and the number of the cross-cut squares remaining on the test panel was counted The adhesion was evaluated in accordance with the following criteria for evaluation.
(Criteria for Evaluation)
◎: All of the cross-cut squares are remaining.
○: Number of remaining cross-cut squares is not less than 98.
Δ: Number of remaining cross-cut squares is 90 to 97.
x: Number of remaining cross-cut squares is not more than 89.

<Elongation Property>

A sheet of exfoliate paper was put on a metallic plate. The paint sealer obtained above was applied onto the exfoliate paper so as to form a coated film having a dry film thickness of 0.5 mm, and the metallic plate was allowed to stand in an atmosphere having a temperature of 23° C. and a relative humidity of 50% for 7 days to dry the coated film. Thereafter, the formed coated film was removed from the exfoliate paper, and the removed coated film was turned upside down. The removed coated film was put on the exfoliate paper, and allowed to stand for additional 7 days for drying, to give a test body.

Next, a dumbbell specimen having No. 2 type shape as defined by JIS K 6251, item 4.1 was stamped out from the test body, and the exfoliate paper was removed from the dumbbell specimen, to give a test piece. The obtained test piece was attached to a tension tester so that the distance between two chucks became 60 mm, and applied a tensile load to the test piece at a tensile rate of 200 mm/min until the test piece was broken. The maximum tensile load and the elongation of the test piece between the chucks at break were measured, and film strength and elongation percentage were evaluated in accordance with the following criteria for evaluation.

(1) Criteria for Evaluation of Film Strength
◎: Maximum tensile load is not less than 2 N/mm².
○: Maximum tensile load is not less than 1.5 N/mm² and less than 2 N/mm².
Δ: Maximum tensile load is not less than 1.0 N/mm² and less than 1.5N/mm².
x: Maximum tensile load is less than 1.0 N/mm².

(2) Criteria for Evaluation of Elongation Percentage
◎: Elongation percentage is not less than 50%.
○: Elongation percentage is not less than 30% and less than 50%.
Δ: Elongation percentage is not less than 10% and less than 30%.
x: Elongation percentage is less than 10%.

<Burden on Environment>

The minimum film-forming temperature of a resin emulsion for a sealer has been generally controlled to a temperature of not more than 0° C. in order to impart film-forming property to the resin emulsion. When the minimum film-forming temperature is controlled, a film-forming aid has been used. However, since the film-forming aid is a volatile substance, it has been desired to reduce the amount of the film-forming aid as much as possible from the viewpoint of the reduction of environmental burden.

Thereupon, the burden on environment was evaluated based on the amount of the film-forming aid necessary for a resin emulsion for a sealer. Its criteria for evaluation are as follows:
(Criteria for Evaluation)
◎: Content of a film-forming aid in the resin emulsion for a sealer is less than 1%.
○: Content of a film-forming aid in the resin emulsion for a sealer is not less than 0.5% and less than 1%.
Δ: Content of a film-forming aid in the resin emulsion for a sealer is not less than 1% and less than 2%.
x: Content of a film-forming aid in the resin emulsion for a sealer is not less than 2%.

Examples 12 and 13, and Comparative Examples 3 and 4

As calcium carbonate, a calcium carbonate mixture comprising 50% of calcium carbonate commercially available from Nitto Funka Kogyo K.K. under the product number of NS #100 and 50% of calcium carbonate commercially available from Nitto Funka Kogyo K.K. under the product number of NN #200 was used.

Next, a paint sealer was prepared in the same manner as in Example 1 except that a resin emulsion for a sealer obtained in Production Example as shown in Table 17 was used, and that the amount of the calcium carbonate mixture was adjusted to 150 parts, and the amount of a dispersing agent was adjusted to 3 parts per 100 parts of the nonvolatile component of the resin emulsion when the content of a pigment was controlled to 75% (Example 12); the amount of the calcium carbonate mixture was adjusted to 450 parts, and the amount of a dispersing agent was adjusted to 9 parts per 100 parts of the nonvolatile component of the resin emulsion when the content of a pigment was controlled to 90% (Example 13); the amount of the calcium carbonate mixture was adjusted to 75 parts, and the amount of a dispersing agent was adjusted to 1.5 parts per 100 parts of the nonvolatile component of the resin emulsion when the content of a pigment was controlled to 60% (Comparative Example 3); the amount of the calcium carbonate mixture was adjusted to 950 parts, and the amount of a dispersing agent was adjusted to 19 parts per 100 parts of the nonvolatile component of the resin emulsion when the content of a pigment was controlled to 95% (Comparative Example 4). The physical properties of the obtained paint sealer were examined in the same manner as in Example 1. Its results are shown in Table 17.

TABLE 17

| Example and Comparative Example No. | Production Ex. No. | Content of pigment (%) | Physical properties of paint sealer | | | | | |
|---|---|---|---|---|---|---|---|---|
| | | | Water permeability resistance | Frost damage resistance | Adhesion | Film strength | Elongation property Elongation percentage | Burden on Environment |
| Example | | | | | | | | |
| 1 | 1 | 80 | ○ | ○ | ◎ | ◎ | ◎ | ◎ |
| 2 | 2 | 80 | ◎ | ◎ | ◎ | ◎ | ◎ | ◎ |
| 3 | 3 | 80 | ◎ | ◎ | ◎ | ◎ | ◎ | ◎ |

TABLE 17-continued

| | | | Physical properties of paint sealer | | | | | |
|---|---|---|---|---|---|---|---|---|
| Example and Comparative Example No. | Production Ex. No. | Content of pigment (%) | Water permeability resistance | Frost damage resistance | Adhesion | Film strength | Elongation percentage | Burden on Environment |
| 4 | 4 | 80 | ⊚ | ⊚ | ⊚ | ⊚ | ○ | ○ |
| 5 | 5 | 80 | ⊚ | ⊚ | ⊚ | ○ | ⊚ | ⊚ |
| 6 | 6 | 80 | ⊚ | ⊚ | ⊚ | ⊚ | ○ | ⊚ |
| 7 | 7 | 80 | ⊚ | ⊚ | ⊚ | ⊚ | ⊚ | ⊚ |
| 8 | 8 | 80 | ⊚ | ⊚ | ⊚ | ⊚ | ○ | ⊚ |
| 9 | 9 | 80 | ⊚ | ○ | ⊚ | ○ | ○ | ⊚ |
| 10 | 10 | 80 | ⊚ | ⊚ | ⊚ | ⊚ | ⊚ | ⊚ |
| 11 | 11 | 80 | ⊚ | ○ | ⊚ | ⊚ | △ | ⊚ |
| 12 | 2 | 75 | ⊚ | ⊚ | ⊚ | ○ | ⊚ | ⊚ |
| 13 | 2 | 90 | ○ | ○ | ○ | ○ | ○ | ⊚ |
| Comp. Ex. | | | | | | | | |
| 1 | 12 | 80 | △ | ○ | ○ | ○ | X | △ |
| 2 | 13 | 80 | ⊚ | X | ○ | ⊚ | X | X |
| 3 | 2 | 60 | ⊚ | ⊚ | ⊚ | X | ⊚ | ⊚ |
| 4 | 2 | 95 | X | X | X | △ | X | ⊚ |

From the results as shown in Table 17, it can be seen that the resin emulsion for a sealer obtained in each example forms a coated film which is excellent in water permeability resistance, frost damage resistance and film strength. In addition, since the resin emulsion for a sealer obtained in each example can form a coated film which is excellent in water permeability resistance, frost damage resistance and elongation property without the lowering of adhesion even when a pigment is used therein in a fixed amount, the resin emulsion for a sealer has a high economic value. Moreover, since the amount of a film-forming aid can be greatly reduced, the resin emulsion for a sealer is excellent in environmental protection.

(3) Examples and Comparative Examples of a Coating Composition for a Sealer

Production Example 1

A flask equipped with a dropping funnel, a stirrer, a nitrogen gas inlet pipe, a thermometer and a reflux condenser was charged with 46 parts of deionized water.

A monomer component A was prepared by mixing 13.5 parts of styrene, 0.5 parts of methyl methacrylate and 1 part of acrylic acid.

The monomer component A obtained above was mixed with 5 pars of deionized water and 2 parts of 25% aqueous solution of an emulsifier commercially available from Dai-Ichi Kogyo Seiyaku Co., Ltd. under the trade name of Aqualon HS-10, to prepare a pre-emulsion for dropping.

The obtained pre-emulsion for dropping in an amount of 1.5 parts, which was 1% of the total amount of the monomer component, was added to the above flask, and its temperature was raised to 80° C. while nitrogen gas was blown into the flask gently. Thereafter, 2 parts of 3.5% aqueous solution of ammonium persulfate was added to the above flask to initiate an initial emulsion polymerization.

Next, the rest of the pre-emulsion for dropping, 1 part of 3.5% aqueous solution of ammonium persulfate and 1 part of 2.5% aqueous solution of sodium hydrogensulfite were added dropwise to the flask over 40 minutes. After the completion of the dropwise addition, the temperature of the mixture was maintained at 80° C. for 60 minutes.

Thereafter, a monomer component B was prepared by mixing 3 part of methacrylic acid, 1 part of styrene, 79 parts of 2-ethylhexyl acrylate and 2 parts of acrylonitrile.

The obtained monomer component B was mixed with 29 pars of deionized water and 10 parts of 25% aqueous solution of an emulsifier commercially available from Dai-Ichi Kogyo Seiyaku Co., Ltd. under the trade name of Aqualon HS-10, to prepare a second-step pre-emulsion.

The obtained second-step pre-emulsion, 6 parts of 3.5% aqueous solution of ammonium persulfate and 6 parts of 2.5% aqueous solution of sodium hydrogensulfite were added dropwise to the flask over 200 minutes. After completion of the dropwise addition, the temperature of the mixture was maintained at 80° C. for 120 minutes, and the pH of the mixture in the flask, which was determined at 23° C. by using a pH meter commercially available from HORIBA, Ltd. under the product number of F-23 (hereinafter referred to the same), was controlled to 8.5 by adding 25% aqueous ammonia to the mixture, to complete the emulsion polymerization reaction. The resulting reaction mixture was cooled to room temperature, and thereafter, filtrated with a 300-mesh (JIS mesh, hereinafter referred to the same) metal screen, to give a resin emulsion for a sealer having a content of a nonvolatile component of 55%.

The composition of the monomer component used for the resin emulsion for a sealer and properties of the resin emulsion for a sealer are shown in Table 18.

Production Examples 2

A resin emulsion for a sealer was prepared in the same manner as in Production Example 1 except that the monomer component was changed to the monomer component as shown in Table 18. The composition of the monomer component used for the resin emulsion for a sealer and properties of the resin emulsion for a sealer are shown in Table 18.

Incidentally, abbreviations listed in the following tables mean the followings:
[Meaning of Abbreviations Listed in the Tables]
St: styrene
MMA: methyl methacrylate
AA: acrylic acid
MAA: methacrylic acid
BA: butyl acrylate
2EHA: 2-ethylhexyl acrylate
AN: acrylonitrile In addition, the terms listed in the tables mean the followings:

[Amount of St in Inner Layer]
Content (%) of styrene in the monomer component A used as a raw material of an inner layer

[Amount of Carboxylic Acid in Outer Layer]
Content (%) of a carboxyl group-containing monomer in the monomer component B used as a raw material of an outer layer

[Ratio of Each Layer]
Weight ratio of the polymer which constitutes the inner layer to the polymer which constitutes the outer layer [polymer of inner layer/polymer of outer layer]

[Total Amount of Inner and Outer Layers]
Total content (%) of the polymer of inner layer and the polymer of outer layer in an emulsion particle

[Tg of Outer Layer]
Glass transition temperature (° C.) of the polymer (II) which constitutes the outer layer

[Total Amount of St]
Content of styrene (%) in the total monomer components used as a raw material for the polymer which constitutes an emulsion particle

[Total Tg]
Glass transition temperature (° C.) of an emulsion particle

[MFT]
Minimum film-forming temperature (° C.) of a resin emulsion for a sealer

[Total Carboxylic Acid Amount]
Content (%) of a carboxyl group-containing monomer in total monomer components used as a raw material of a polymer which constitutes an emulsion particle

[Tg of Inner Layer]
Glass transition temperature (° C.) of a polymer which constitutes an inner layer

[Tg of the Other Layer]
Glass transition temperature (° C.) of a polymer which constitutes a layer other than an inner layer and an outer layer

[Amount of Nonvolatile Component]
Content (%) of a resin solid contained in a resin emulsion

[Average Particle Diameter]
Average particle diameter (nm) of emulsion particles In Table 18, the layer 1 to the layer 2 show a polymerization order. Incidentally, the mark "-" which is used in the monomer component of Table 18 means that the monomer is not used.

TABLE 18

| | | | Production Example Number | |
|---|---|---|---|---|
| | | | 1 | 2 |
| Composition of each layer (parts) | Layer 1 (Inner layer) | St | 13.5 | 13.5 |
| | | MMA | 0.5 | 0.5 |
| | | AA | 1 | 1 |
| | Layer 2 (Outer layer) | AA | — | 1.5 |
| | | MAA | 3 | — |
| | | St | 1 | — |
| | | MMA | — | 42 |
| | | BA | — | 40.5 |
| | | 2EHA | 79 | — |
| | | AN | 2 | 1 |
| Properties of resin emulsion | Number of layer | | 2 | 2 |
| | Amount of St in inner layer (%) | | 90 | 90 |
| | Amount of carboxylic acid in outer layer (%) | | .5 | 1.7 |
| | Ratio of each layer (inner layer/outer layer) (weight ratio) | | 15/85 | 15/85 |

TABLE 18-continued

| | Production Example Number | |
|---|---|---|
| | 1 | 2 |
| Total amount of inner and outer layers (%) | 100 | 100 |
| Tg of outer layer (° C.) | −63 | 6 |
| Total amount of St (%) | 4.5 | 13.5 |
| Total Tg (° C.) | −48 | 17 |
| MFT (° C.) | <0 | 35 |
| Total carboxylic acid amount (%) | 4.0 | 2.5 |
| Tg of inner layer (° C.) | 100 | 100 |
| Tg of the other layer (° C.) | — | — |
| Amount of nonvolatile component (%) | 55.0 | 55.0 |
| Average particle diameter (nm) | 280 | 280 |

Example 1

The resin emulsion for a sealer obtained in Production Example 1 was used, and 91 parts of this resin emulsion for a sealer was mixed with 42 parts of water.

While the mixture obtained by mixing the resin emulsion for a sealer with water in the above was stirred at a rotational speed of 1000 min$^{-1}$ with a disperser, this mixture was mixed with 2,2,4-trimethyl-1,3-pentanediol monoisobutylate commercially available from Chisso Corporation under the product number of CS-12 as a film-forming aid so that the film-forming agent became 0° C. To the resulting mixture, 4 parts of a dispersing agent commercially available from San Nopco Limited under the trade name of Nopco Sperse 44C, 100 parts of calcium carbonate commercially available from Nitto Funka Kogyo K.K. under the product number of NS #100, 100 parts of calcium carbonate commercially available from Nitto Funka Kogyo K.K. under the product number of NN #200, 9 parts of zinc oxide and 0.8 parts of a defoaming agent commercially available from San Nopco Limited under the trade name of Nopco 8034L were added under stirring. Thereafter, the mixture was stirred at a rotational speed of 3000 min$^{-1}$ for 5 minutes, and then the rotational speed was controlled to 1000 min$^{-1}$.

Next, 5 parts of 3% aqueous solution of a thickener commercially available from Daicel Chemical Industries, Ltd. under the trade name of SP-850 was added to this mixture so that the viscosity of the resulting mixture became 15000 mPa-s at a rotational speed of 20 min$^{-1}$ at 25° C. when determined by using a BH-type viscometer commercially available from Tokyo Keiki Inc., and the mixture was stirred at this rotational speed for 30 minutes, to give a coating composition for a sealer. This coating composition for a sealer was allowed to stand at room temperature for 1 day or more. The physical properties of the obtained coating composition for a sealer were examined in accordance with the following methods.

<Viscositic Property>

The viscosity of the rheology control agent at a rotational speed of 2 min$^{-1}$ at 25° C. and the viscosity of the rheology control agent at a rotational speed of 20 min$^{-1}$ were determined by using a BH-type viscometer commercially available from Tokyo Keiki Inc. Next, as a viscositic property of a coating composition for a sealer, thixotropic index (TI) was obtained in accordance with the equation:

[Thixotropic Index(TI)]=[Viscosity of a rheology control agent at a rotational speed of 2 min$^{-1}$]÷[Viscosity of a rheology control agent at a rotational speed of 20 min$^{-1}$].

<Aptitude for Coating>

The aptitude for coating was evaluated in accordance with the following criteria for evaluation based on the thixotropic index (TI) as determined in the above.

(Criteria for Evaluation)

○: TI is not less than 4 and less than 7.
Δ: TI is not less than 3 and less than 4.
x: TI is less than 3 or not less than 7.

Next, a flexible board commercially available from Nippon Testpanel Co., Ltd. was coated with this coating composition for a sealer so that a coated film having a dry film thickness of 0.5 mm was formed, and dried in an atmosphere having a temperature of 23° C. and a relative humidity of 50% for 14 days, to give a test panel. The following physical properties were evaluated by using the obtained test panel.

<Water Permeability Resistance>

A funnel having a diameter of 10 cm was placed on the coated film formed on the test panel, and their contact portion was sealed with a silicone bath bond commercially available from Konishi Co., Ltd. Thereafter, in accordance with "funnel method" prescribed in JIS K 5400, reduced amount of water after 24 hours passed was determined, and the water permeability resistance was evaluated in accordance with the following criteria for evaluation.

(Criteria for Evaluation)

◉: Less than 0.3 mL/cm$^2$
○: Not less than 0.3 mL/cm$^2$ and less than 0.5 mL/cm$^2$
Δ: Not less than 0.5 mL/cm$^2$ and less than 1.0 mL/cm$^2$
x: Not less than 1.0 mL/cm$^2$ <Frost Damage Resistance>

A repeat test for warming and cooling, which was defined by JIS A 6909, was carried out. More specifically, after the side and back surfaces of the test panel, on which a coated film was not formed were sealed with a silicone bath bond commercially available from Konishi Co., Ltd., 20 cycles of a process were carried out, one cycle comprising dipping the test panel in water of 23° C. for 18 hours, cooling the test panel to −20° C. in the air for 3 hours to freeze the test panel and heating the test panel in the air of 50° C. for 3 hours, while the generation of a crack on coated film was observed with a loupe having a magnification of 30 times every 4 cycles. Thereafter, the frost damage resistance was evaluated in accordance with the following criteria for evaluation.

(Criteria for Evaluation)

◉: After 20 cycles, no problem was observed.
○: After 16 cycles, no problem was observed, but after 20 cycles, a crack was observed.
Δ: After 12 cycles, no problem was observed, but after 16 cycles, a crack was observed.
x: After 4 cycles, 8 cycles or 12 cycles, a crack was observed.

<Adhesion>

The coated film of the test panel was cut by means of a utility knife so that 100 cross-cut squares having a length of 2 mm in one side were formed, and a cellophane adhesive tape commercially available from Nichiban Co., Ltd. under the product number of CT405AP-18 was stuck on these squares. Thereafter, a peeling test was carried out in accordance with JIS K 5400, and the number of the cross-cut squares remaining on the test panel was counted. The adhesion was evaluated in accordance with the following criteria for evaluation.

(Criteria for Evaluation)

◉: All cross-cut squares are remaining.
○: Number of remaining cross-cut squares is not less than 98.
Δ: Number of remaining cross-cut squares is 90 to 97.
x: Number of remaining cross-cut squares is not more than 89.

<Elongation Property>

A sheet of exfoliate paper was put on a metallic plate. The paint sealer obtained above was applied onto the metallic plate so as to form a coated film having a dry film thickness of 0.5 mm, and the metallic plate was allowed to stand in an atmosphere having a temperature of 23° C. and a relative humidity of 50% for 7 days to dry the coated film. Thereafter, the formed coated film was removed from the exfoliate paper, and the removed coated film was turned upside down. The removed coated film was put on the exfoliate paper, and allowed to stand for additional 7 days for drying, to give a test body.

Next, a dumbbell specimen having No. 2 type shape as defined by JIS K 6251, item 4.1 was stamped out from the test body, and the exfoliate paper was removed from the dumbbell specimen, to give a test piece. The obtained test piece was attached to a tension tester so that the distance between two chucks became 60 mm, and applied a tensile load to the test piece at a tensile rate of 200 mm/min until the test piece was broken. The maximum tensile load and the elongation of the test piece between the chucks at break were measured, and film strength and elongation percentage were evaluated in accordance with the following criteria for evaluation.

(1) Criteria for Evaluation of Film Strength

◉: Maximum tensile load is not less than 2 N/mm$^2$.
○: Maximum tensile load is not less than 1.5 N/mm$^2$ and less than 2 N/mm$^2$.
Δ: Maximum tensile load is not less than 1.0 N/mm$^2$ and less than 1.5 N/mm$^2$.
x: Maximum tensile load is less than 1.0 N/mm$^2$.

(2) Criteria for evaluation of Elongation percentage

◉: Elongation percentage is not less than 50%.
○: Elongation percentage is not less than 30% and less than 50%.
Δ: Elongation percentage is not less than 10% and less than 30%.
x: Elongation percentage is less than 10%.

<Burden on Environment>

The minimum film-forming temperature of a resin emulsion for a sealer is generally controlled to not less than 0° C., in order to impart film-forming property to the resin emulsion for a sealer. When the film-forming temperature is controlled, a film-forming aid is used. However, it has been desired that the amount of the film-forming aid being used is reduced as much as possible from the viewpoint of reduction of burden on the environment since the film-forming aid is a volatile substance.

Therefore, the burden on the environment was evaluated based on the amount of the film-forming aid necessary for the resin emulsion for a sealer. Its criteria for evaluation are as follows:

(Criteria for Evaluation)

◉: Content of the film-forming aid in the resin emulsion for a sealer is less than 1%.
○: Content of the film-forming aid in the resin emulsion for a sealer is not less than 0.5% and less than 1%.
Δ: Content of the film-forming aid in the resin emulsion for a sealer is not less than 1% and less than 2%.
x: Content of the film-forming aid in the resin emulsion for a sealer is not less than 2%.

<Content of Pigment>

The content of a pigment was obtained in accordance with the equation:

[Content of a pigment(%)]=([Weight of pigment]÷
[Weight of nonvolatile component of a resin+
Weight of a pigment])×100.

Examples 2 and 3, and Comparative Examples 1 and 2

As calcium carbonate, a calcium carbonate mixture comprising 50% of calcium carbonate commercially available from Nitto Funka Kogyo K.K. under the product number of NS #100 and 50% of calcium carbonate commercially available from Nitto Funka Kogyo K.K. under the product number of NN #200 was used.

Next, a paint sealer was prepared in the same manner as in Example 1 except that a resin emulsion for a sealer obtained in Production Example 1 was used, that the amount of the calcium carbonate mixture was adjusted to 150 parts, and the amount of a dispersing agent was adjusted to 3 parts per 100 parts of the nonvolatile component of the resin emulsion when the content of a pigment was controlled to 75% (Example 2); the amount of the calcium carbonate mixture was adjusted to 450 parts, and the amount of a dispersing agent was adjusted to 9 parts base on 100 parts of the nonvolatile component of the resin emulsion when the content of a pigment was controlled to 90% (Example 3); the amount of the calcium carbonate mixture was adjusted to 75 parts, and the amount of a dispersing agent was adjusted to 1.5 parts per 100 parts of the nonvolatile component of the resin emulsion when the content of a pigment was controlled to 60% (Comparative Example 1); and the amount of the calcium carbonate mixture was adjusted to 950 parts, and the amount of a dispersing agent was adjusted to 19 parts per 100 parts of the nonvolatile component of the resin emulsion when the content of a pigment was controlled to 95% (Comparative Example 2), and that the active ingredient (hydroxyethyl cellulose) was changed to the amount as shown in Table 19. The physical properties of the obtained paint sealer were examined in the same manner as in Example 1. Its results are shown in Table 19.

Example 4

A coating composition for a sealer was prepared in the same manner as in Example 1 except that as rheology control agents, 3% aqueous solution of hydroxyethyl cellulose commercially available from Daicel Chemical Industries, Ltd. under the trade name of SP-850 and a urethane-associated rheology control agent having a content of an active ingredient of 30% commercially available from ADEKA CORPORATION under the trade name of ADEKANOL UH-420 were used, and that the amount of the active ingredient (hydroxyethyl cellulose) was adjusted to 0.2 parts per 100 parts of the nonvolatile component of the resin emulsion, and that the amount of the urethane-associated rheology control agent was adjusted to 0.1 parts per 100 parts of the nonvolatile component of the resin emulsion in Example 1.

Example 5

A coating composition for a sealer was prepared in the same manner as in Example 1 except that as a rheology control agent, a urethane-associated rheology control agent having a content of an active ingredient of 30% commercially available from ADEKA CORPORATION under the trade name of ADEKANOL UH-420 was used, and that the amount of the active ingredient was adjusted to 3.0 parts per 100 parts of the nonvolatile component of the resin emulsion in Example 1. The physical properties of the obtained coating composition for a sealer were examined in the same manner as in Example 1. Its results are shown in Table 19.

Comparative Example 3

A coating composition for a sealer was prepared in the same manner as in Example 1 except that a rheology control agent was not used in Example 1. The physical properties of the obtained coating composition for a sealer were examined in the same manner as in Example 1. Its results are shown in Table 19.

Comparative Example 4

A coating composition for a sealer was prepared in the same manner as in Example 1 except that the resin emulsion obtained in Production Example 2 was used in place of the resin emulsion obtained in Production Example 1, and that the amount of the active ingredient (hydroxyethyl cellulose) was adjusted to the amount as shown in Table 19 in Example 1. The physical properties of the obtained coating composition for a sealer were examined in the same manner as in Example 1. Its results are shown in Table 19.

Incidentally, in Table 19, the content of active ingredient of the rheology control agent means the amount of the active ingredient of the rheology control agent per 100 parts of the nonvolatile component of the resin emulsion. Also, the term "HEC" means an aqueous solution of hydroxyethyl cellulose commercially available from Daicel Chemical Industries, Ltd. under the trade name of SP-850, and the term "Urethane-associated" means the urethane-associated rheology control agent having a content of an active ingredient of 30% commercially available from ADEKA CORPORATION under the trade name of ADEKANOL UH-420. In Table 19, a coating composition for a sealer having at least one evaluation of "x" in the physical properties is unsuitable to be used in a paint sealer.

TABLE 19

| Example and Comparative Example No. | Rheology control agent | | | Physical properties of coating composition for a sealer | | | | | | | | |
|---|---|---|---|---|---|---|---|---|---|---|---|---|
| | Kind | Content of active ingredient (parts) | Viscosity (TI) | Aptitude for coating | Water permeability resistance | Frost damage resistance | Adhesion | Elongation property | | Burden on the environment | Content of pigment (%) |
| | | | | | | | | Film strength | Elongation percentage | | |
| Example | | | | | | | | | | | | |
| 1 | HEC | 0.30 | 5.0 | ○ | ◎ | ◎ | ◎ | ◎ | ◎ | ◎ | 80 |
| 2 | HEC | 0.25 | 4.8 | ○ | ◎ | ◎ | ◎ | ○ | ◎ | ◎ | 75 |
| 3 | HEC | 1.0 | 5.2 | ○ | ○ | ○ | ○ | ○ | ○ | ◎ | 90 |

TABLE 19-continued

| | Rheology control agent | | | Physical properties of coating composition for a sealer | | | | | | | |
|---|---|---|---|---|---|---|---|---|---|---|---|
| Example and Comparative Example No. | Kind | Content of active ingredient (parts) | Viscosity (TI) | Aptitude for coating | Water permeability resistance | Frost damage resistance | Adhesion | Elongation property | | Burden on the environment | Content of pigment (%) |
| | | | | | | | | Film strength | Elongation percentage | | |
| 4 | HEC + Urethane-associated | 0.3 | 4.0 | ○ | ◎ | ◎ | ◎ | ◎ | ◎ | ◎ | 80 |
| 5 | Urethane-associated | 3.0 | 6.0 | ○ | Δ | Δ | ◎ | ◎ | ◎ | ◎ | 80 |
| Comp. Ex. | | | | | | | | | | | |
| 1 | HEC | 0.15 | 5.0 | ○ | ◎ | ◎ | ◎ | X | ◎ | ◎ | 60 |
| 2 | HEC | 1.5 | 4.5 | ○ | X | X | X | Δ | X | ◎ | 95 |
| 3 | — | — | 1.5 | X | ◎ | ◎ | ◎ | ◎ | ◎ | ◎ | 80 |
| 4 | HEC | 0.25 | 5.1 | ○ | ◎ | X | ○ | ◎ | X | X | 80 |

From the results as shown in Table 19, it can be seen that the coating composition for a sealer obtained in each example is excellent in aptitude for coating even when a pigment is used therein in a fixed amount, and forms a coated film which is excellent in water permeability resistance and frost damage resistance.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

INDUSTRIAL APPLICABILITY

The resin emulsion for a sealer and the resin composition according to the first aspect of the present invention are expected to be used in, for example, a resin emulsion for a ceramic-based building material, a resin composition for a ceramic-based building material, paint sealer and the like, as an aqueous one-component resin emulsion. In addition, the coating composition for a sealer of the first aspect of the invention is expected to be used in, for example, coating composition for a ceramic-based building material, a paint sealer and the like, as an aqueous one-component resin emulsion.

The resin emulsion for a sealer and the resin composition according to the second aspect of the present invention are expected to be used in, for example, a resin emulsion for a sealer useful for a sealer which is used on the exterior of a building, a sealer having a microelasticity and the like, a paint, and the like.

The invention claimed is:

1. A sealer comprising a resin emulstion which comprises emulsion particles having an inner layer and an outer layer, wherein the inner layer is formed from a polymer (I) which is prepared by emulsion polymerization of a monomer component A comprising 85 to 100% by weight of styrene and 0 to 15% by weight of a monomer other than the styrene, and the outer layer is formed from a polymer (II) having a glass transition temperature of not more than 40° C., which is prepared by emulsion polymerization of a monomer component B comprising 6 to 25% by weight of a carboxyl group-containing monomer and 75 to 94% by weight of a monomer other than the carboxyl group-containing monomer, the weight ratio of the polymer (I) to the polymer (II) [polymer (I)/polymer (II)] is 25/75 to 75/25, and the total content of the polymer (I) and the polymer (II) in the emulsion particles is 50 to 100% by weight, and wherein the content of styrene is 70 to 85% by weight, and the content of the monomer other than the styrene is 15 to 30% by weight in the total monomer components which are used as a raw material for a polymer constituting the emulsion particles.

2. The sealer according to claim 1, wherein the monomer other than the styrene is at least one monomer selected from the group consisting of an aromatic monomer other than styrene, an alkyl (meth)acrylate, a carboxyl group-containing monomer, an oxo group-containing monomer, a fluorine atom-containing monomer, a nitrogen atom-containing monomer and an epoxy group-containing monomer.

3. The sealer according to claim 1, wherein the monomer other than the carboxyl group-containing monomer is at least one monomer selected from the group consisting of an aromatic monomer, an alkyl (meth)acrylate, a hydroxyl group-containing (meth)acrylate, an oxo group-containing monomer, a fluorine atom-containing monomer, a nitrogen atom-containing monomer and an epoxy group-containing monomer.

4. The sealer according to claim 1, wherein the resin emulsion has a minimum film-forming temperature of −5° to 70° C.

5. The sealer according to claim 1, wherein the amount of styrene based on 300 parts by weight of the monomer component B is not less than 80 parts by weight, and the amount of styrene based on 330 parts by weight of the monomer component B is not more than 210 parts by weight.

6. The sealer according to claim 1, further comprising a pigment.

7. The sealer according to claim 6, wherein the amount of the pigment per 100 parts by weight of the nonvolatile component of the resin emulsion is 190 to 400 parts by weight.

* * * * *